United States Patent
Liu et al.

(10) Patent No.: US 11,706,777 B2
(45) Date of Patent: Jul. 18, 2023

(54) BASE STATION APPARATUS, TERMINAL APPARATUS, AND COMMUNICATION METHOD

(71) Applicants: SHARP KABUSHIKI KAISHA, Sakai (JP); FG Innovation Company Limited, New Territories (HK)

(72) Inventors: Liqing Liu, Sakai (JP); Shohei Yamada, Sakai (JP); Hiroki Takahashi, Sakai (JP); Masayuki Hoshino, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 42 days.

(21) Appl. No.: 17/260,467

(22) PCT Filed: Jul. 17, 2019

(86) PCT No.: PCT/JP2019/028004
§ 371 (c)(1),
(2) Date: Jan. 14, 2021

(87) PCT Pub. No.: WO2020/017525
PCT Pub. Date: Jan. 23, 2020

(65) Prior Publication Data
US 2021/0274538 A1    Sep. 2, 2021

(30) Foreign Application Priority Data

Jul. 17, 2018   (JP) .............................. JP2018-134080

(51) Int. Cl.
*H04W 72/23*    (2023.01)
*H04L 5/00*      (2006.01)
(Continued)

(52) U.S. Cl.
CPC ........... *H04W 72/23* (2023.01); *H04L 5/0098* (2013.01); *H04W 72/1268* (2013.01); *H04W 74/0833* (2013.01)

(58) Field of Classification Search
CPC ......... H04W 72/1289; H04W 72/1268; H04W 72/14; H04W 74/0833; H04L 5/0098
See application file for complete search history.

(56) References Cited

U.S. PATENT DOCUMENTS

2010/0040001 A1   2/2010  Montojo et al.
2019/0132855 A1*  5/2019  Lee ................... H04W 72/1268
2021/0058947 A1*  2/2021  Lin ................... H04W 74/0833

OTHER PUBLICATIONS

NTT DOCOMO, "Revision of SI: Study on New Radio Access Technology", RP-161214, 3GPP TSG RAN Meeting #72, Busan, Korea, Jun. 13-16, 2016.
(Continued)

*Primary Examiner* — Kevin M Cunningham
(74) *Attorney, Agent, or Firm* — ScienBiziP, P.C.

(57) ABSTRACT

A terminal apparatus that communicates with a base station apparatus includes: a reception unit configured to receive a configuration of an initial uplink (UL) bandwidth part (BWP) and a configuration of an additional UL BWP via a radio resource control (RRC) message and receive a random access response (RAR) message including an RAR UL grant; and a transmission unit configured to transmit a physical uplink shared channel (PUSCH) in an active UL BWP, wherein one of the initial UL BWP and the additional UL BWP is activated as the active UL BWP, the PUSCH is scheduled by using the RAR UL grant, a first field included in the RAR UL grant is used to indicate frequency resource allocation of the PUSCH, and whether the first field is to be truncated or whether a bit is to be inserted into the first field is determined based on a bandwidth of the initial UL BWP.

2 Claims, 16 Drawing Sheets

(51) Int. Cl.
H04W 72/1268 (2023.01)
H04W 74/08 (2009.01)

(56) References Cited

OTHER PUBLICATIONS

"3rd Generation Partnership Project; Technical Specification Group Radio Access Network; NR; Medium Access Control (MAC) protocol specification (Release 15)", 3GPP TS 38.321 V15.2.0 (Jun. 2018).

"3rd Generation Partnership Project; Technical Specification Group Radio Access Network; Evolved Universal Terrestrial Radio Access (E-UTRA); Physical layer procedures(Release 15)", 3GPP TS 36.213 V15.1.0 (Mar. 2018).

Sharp, "Remaining issues on Msg3 PUSCH frequency resource allocation", R1-1809110, 3GPP TSG RAN WG1 Meeting #94, Gothenburg, Sweden, Aug. 20-24, 2018.

3GPP TS 38.213 V15.2.0 (Jun. 2018) 3rd Generation Partnership Project; Technical Specification Group Radio Access Network; NR; Physical layer procedures for control (Release 15).

Intel Corporation, "Further considerations on DCI sizes", R1-1804727 3GPP TSG-RAN WG1 Meeting #92bis, Sanya, Hainan, Apr. 16-20, 2018.

* cited by examiner

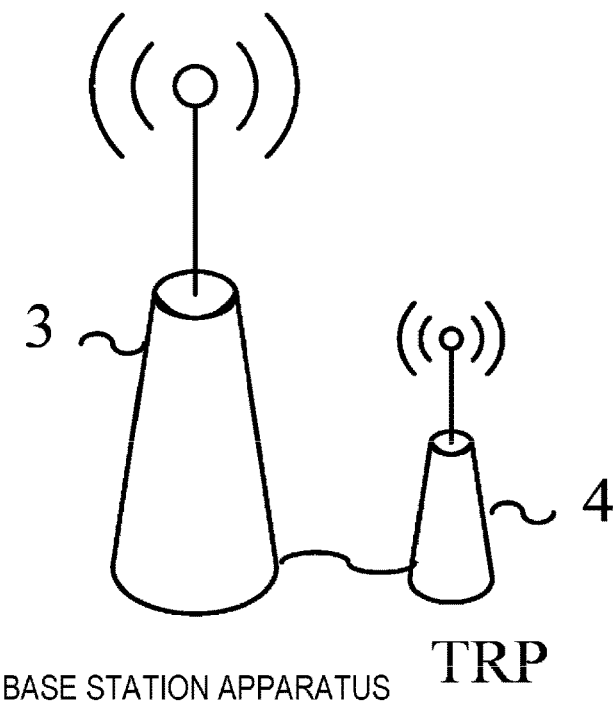
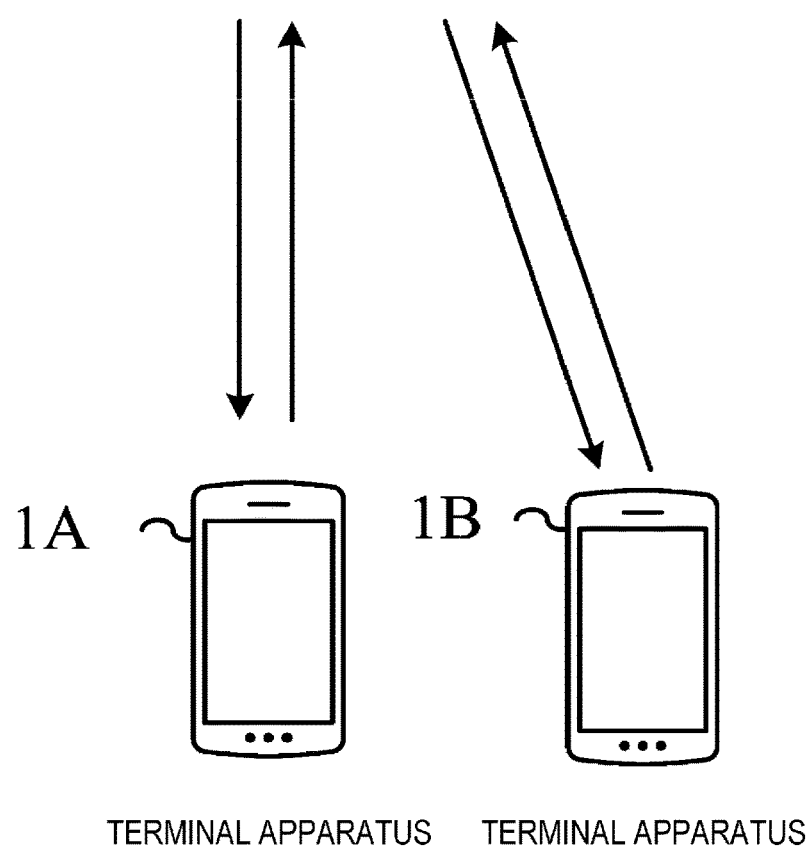
FIG. 1

Random Access Response Grant Content field size

| RAR grant field | Number of bits |
|---|---|
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |

FIG. 9

(A)
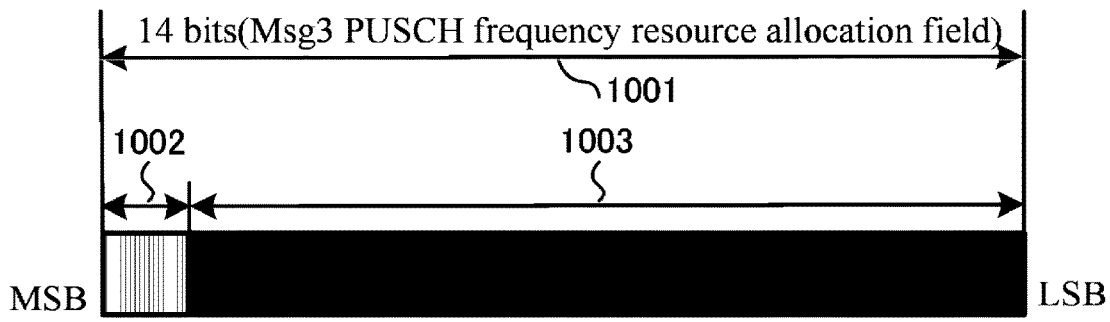
(B) $N^{size}_{BWP} \leq X$
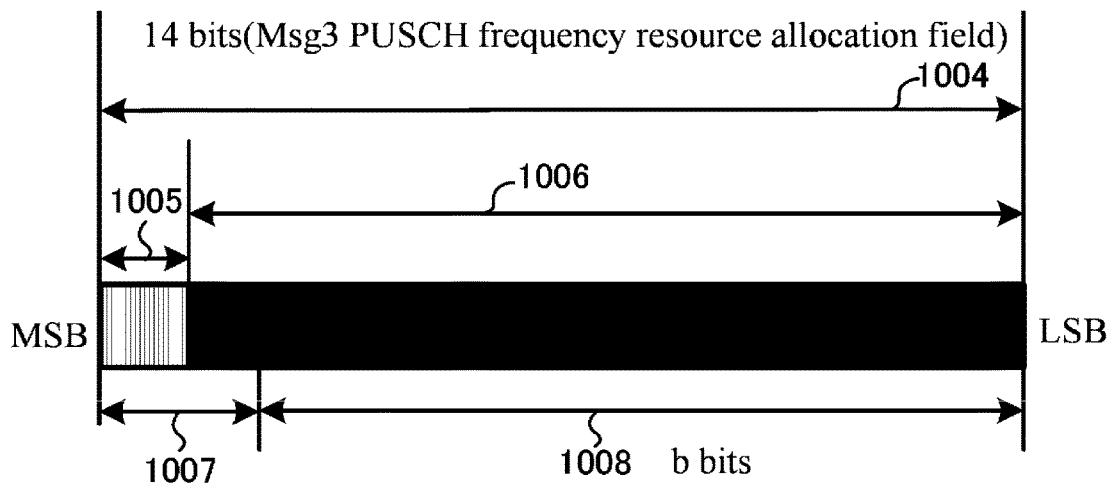
(C) $N^{size}_{BWP} > X$
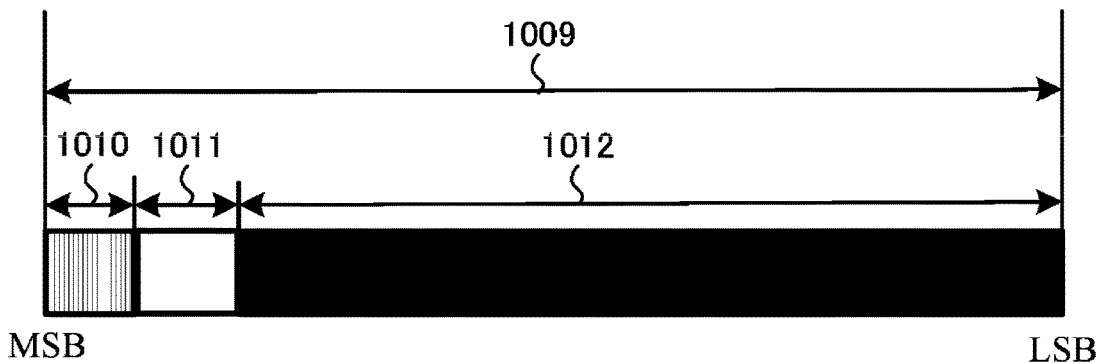
 $N_{UL\_hop}$ hopping bits
FIG. 10

(A)

if $(L_{RBs}-1) \leq \lfloor N_{BWP}^{size}/2 \rfloor$ then $$RIV = N_{BWP}^{size}(L_{RBs}-1) + RB_{start}$$

else $$RIV = N_{BWP}^{size}(N_{BWP}^{size} - L_{RBs} + 1) + (N_{BWP}^{size} - 1 - RB_{start})$$

where $L_{RBs} \geq 1$ and shall not exceed $N_{BWP}^{size} - RB_{start}$.

(B)

if $(L'_{RBs}-1) \leq \lfloor N_{BWP}^{initial}/2 \rfloor$ then $$RIV = N_{BWP}^{initial}(L'_{RBs}-1) + RB'_{start}$$

else $$RIV = N_{BWP}^{initial}(N_{BWP}^{initial} - L'_{RBs} + 1) + (N_{BWP}^{initial} - 1 - RB'_{start})$$

where $L'_{RBs} = L_{RBs}/K$, $RB'_{start} = RB_{start}/K$ and where $L'_{RBs}$ shall not exceed $N_{BWP}^{initial} - RB'_{start}$.

If $N_{BWP}^{active} > N_{BWP}^{initial}$, $K$ is the maximum value from set $\{1, 2, 4, 8\}$ which satisfies $K \leq \lfloor N_{BWP}^{active}/N_{BWP}^{initial} \rfloor$; otherwise $K = 1$.

FIG. 12

BASE STATION APPARATUS, TERMINAL APPARATUS, AND COMMUNICATION METHOD

TECHNICAL FIELD

The present invention relates to a base station apparatus, a terminal apparatus, and a communication method. This application claims priority based on Japanese Patent Application No. 2018-134080 filed on Jul. 17, 2018, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

Fifth generation cellular systems require three anticipated scenarios for services, that is, enhanced Mobile BroadBand (eMBB) which realizes high-speed and high-capacity transmission, Ultra-Reliable and Low Latency Communication (URLLC) which realizes low-latency and high-reliability communication, and massive Machine Type Communication (mMTC) that allows a large number of machine type devices to be connected, such as in Internet of Things (IoT).

CITATION LIST

Non Patent Literature

NPL 1: RP-161214, NTT DOCOMO, "Revision of SI: Study on New Radio Access Technology", June 2016

SUMMARY OF INVENTION

Technical Problem

An object of an aspect of the present invention is to provide a terminal apparatus, a base station apparatus, a communication method, and an integrated circuit that enable efficient communication in a wireless communication system as described above.

Solution to Problem (1) To accomplish the object described above, aspects of the present invention are contrived to provide the following measures. In other words, a terminal apparatus that communicates with a base station apparatus according to an aspect of the present invention includes: a reception unit configured to receive a configuration of an initial uplink (UL) bandwidth part (BWP) and a configuration of an additional UL BWP via a radio resource control (RRC) message and receives a random access response (RAR) message including an RAR UL grant; and a transmission unit configured to transmit a physical uplink shared channel (PUSCH) in an active UL BWP, wherein one of the initial UL BWP and the additional UL BWP is activated as the active UL BWP, the PUSCH is scheduled by using the RAR UL grant, a first field included in the RAR UL grant is used to indicate frequency resource allocation of the PUSCH, and whether the first field is to be truncated or whether a bit is to be inserted into the first field is determined based on a bandwidth of the initial UL BWP.

(2) A base station apparatus that communicates with a terminal apparatus according to an aspect of the present invention includes: a transmission unit configured to transmit a configuration of an initial uplink (UL) bandwidth part (BWP) and a configuration of an additional UL BWP via a radio resource control (RRC) message and transmit a random access response (RAR) message including an RAR UL grant; and a reception unit configured to receive a physical uplink shared channel (PUSCH) in an active UL BWP, wherein one of the initial UL BWP and the additional UL BWP is activated as the active UL BWP, the PUSCH is scheduled by using the RAR UL grant, a first field included in the RAR UL grant is used to indicate frequency resource allocation of the PUSCH, and whether the first field is to be truncated by the terminal apparatus or whether a bit is to be inserted into the first field by the terminal apparatus is determined based on a bandwidth of the initial UL BWP.

(3) A communication method for a terminal apparatus that communicates with a base station apparatus according to an aspect of the present invention includes: receiving a configuration of an initial uplink (UL) bandwidth part (BWP) and a configuration of an additional UL BWP via a radio resource control (RRC) message; receiving a random access response (RAR) message including an RAR UL grant; and transmitting a physical uplink shared channel (PUSCH) in an active UL BWP, wherein one of the initial UL BWP and the additional UL BWP is activated as the active UL BWP, the PUSCH is scheduled by using the RAR UL grant, a first field included in the RAR UL GRANT is used to indicate frequency resource allocation of the PUSCH, and whether the first field is to be truncated or whether a bit is to be inserted into the first field is determined based on a bandwidth of the initial UL BWP.

(4) A communication method performed by a base station apparatus that communicates with a terminal apparatus according to an aspect of the present invention includes: transmitting a configuration of an initial uplink (UL) bandwidth part (BWP) and a configuration of an additional UL BWP via a radio resource control (RRC) message; transmitting a random access response (RAR) message including an RAR UL grant; and receiving a physical uplink shared channel (PUSCH) in an active UL BWP, wherein one of the initial UL BWP and the additional UL BWP is activated as the active UL BWP, the PUSCH is scheduled by using the RAR UL grant, a field included in the RAR UL grant is used to indicate frequency resource allocation of the PUSCH, and whether the first field is to be truncated by the terminal apparatus or whether a bit is to be inserted into the first field by the terminal apparatus is determined based on a bandwidth of the initial UL BWP.

Advantageous Effects of Invention

According to an aspect of the present invention, a base station apparatus and a terminal apparatus can efficiently communicate with each other.

BRIEF DESCRIPTION OF DRAWINGS

FIG. 1 is a diagram illustrating a concept of a radio communication system according to an embodiment of the present invention.

FIG. 9 is a diagram illustrating an example of fields included in an RAR UL grant according to the embodiment of the present invention.

FIG. 10 is a diagram illustrating an example of interpretation of an 'Msg3 PUSCH frequency resource allocation' field according to the present embodiment.

FIG. 12 is a diagram illustrating an example in which an RIV is calculated, according to the embodiment of the present invention.

DESCRIPTION OF EMBODIMENTS

Figure 2:
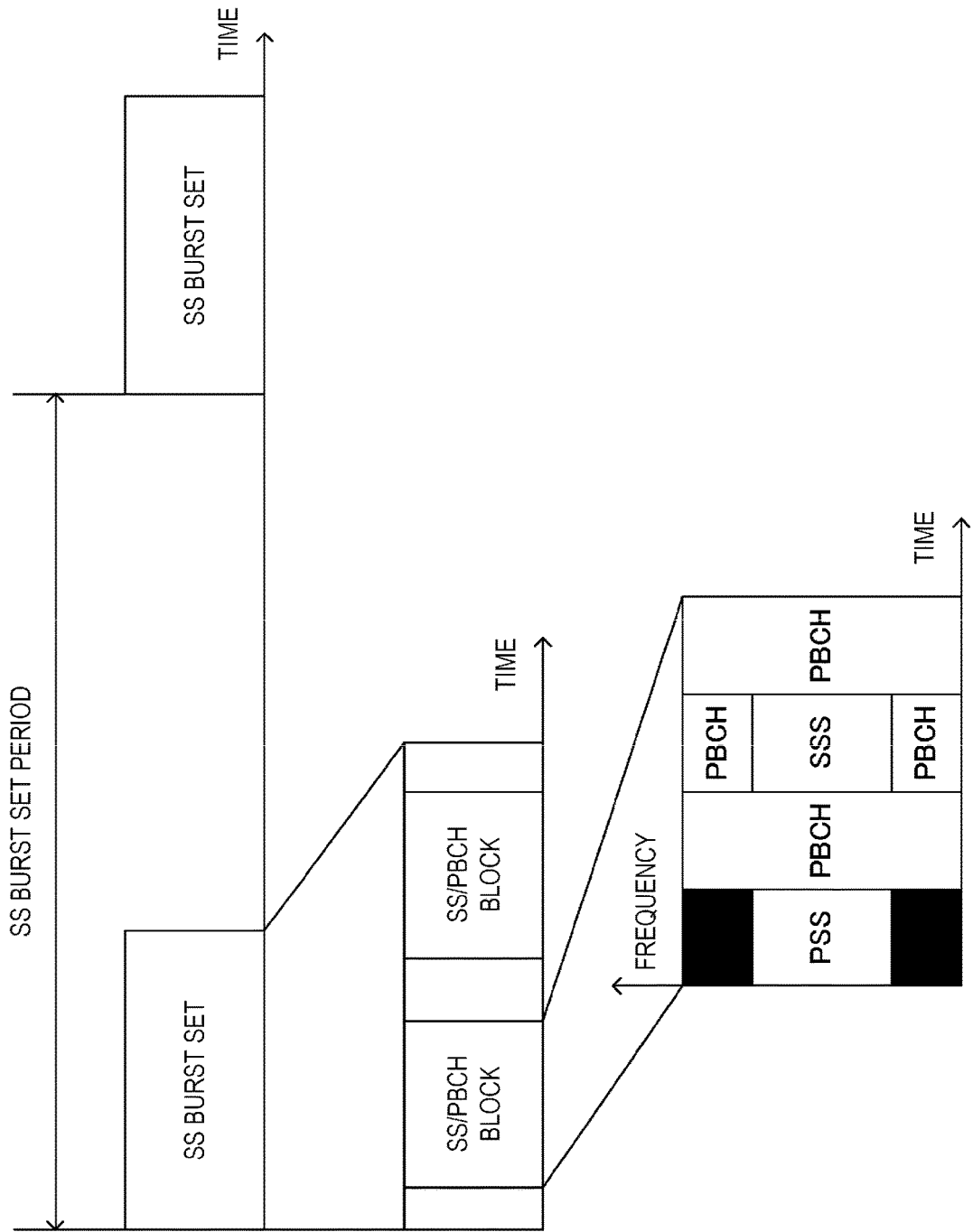
FIG. 2 is a diagram illustrating examples of an SS/PBCH block and an SS burst set according to the embodiment of the present invention.

Embodiments of the present invention will be described below.

FIG. 1 is a conceptual diagram of a radio communication system according to the present embodiment. In FIG. 1, the radio communication system includes a terminal apparatus 1A, a terminal apparatus 1B, and a base station apparatus 3. Hereinafter, the terminal apparatus 1A and the terminal apparatus 1B will also be referred to as a terminal apparatus 1.

The terminal apparatus 1 will also be referred to as a user terminal, a mobile station device, a communication terminal, a mobile device, a terminal, User Equipment (UE), or a Mobile Station (MS). The base station apparatus 3 will also be referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or a gNB. The base station apparatus 3 may include a core network apparatus. Also, the base station apparatus 3 may include one or a plurality of transmission reception points 4. At least a part of functions/processing of the base station apparatus 3 described below may be functions/processing of each of the transmission reception points 4 included in the base station apparatus 3. The base station apparatus 3 may serve the terminal apparatus 1 using a communication range (communication area) controlled by the base station apparatus 3 as one or a plurality of cells. Also, the base station apparatus 3 may serve the terminal apparatus 1 using a communication range (communication area) controlled by one or a plurality of transmission reception points 4 as one or a plurality of cells. Also, one cell may be split into a plurality of beamed areas, and the terminal apparatus 1 may be served in each of the beamed areas. Here, the beamed areas may be identified based on indexes of beams used in beam forming or indexes of precoding.

A radio communication link from the base station apparatus 3 to the terminal apparatus 1 will be referred to as a downlink. A radio communication link from the terminal apparatus 1 to the base station apparatus 3 will be referred to as an uplink.

In FIG. 1, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), and Multi-Carrier Code Division Multiplexing (MC-CDM) are used for the radio communication between the terminal apparatus 1 and the base station apparatus 3.

Also, Universal-Filtered Multi-Carrier (UFMC), Filtered OFDM (F-OFDM), OFDM multiplied by a window function (Windowed OFDM), and Filter-Bank Multi-Carrier (FBMC) may be used for radio communication between the terminal apparatus 1 and the base station apparatus 3 in FIG. 1.

Note that although the present embodiment will be described with OFDM symbols using OFDM as a transmission scheme, cases in which the aforementioned other transmission schemes are used are also included in the present invention.

Also, in the radio communication between the terminal apparatus 1 and the base station apparatus 3, a CP may not be used, or the aforementioned transmission scheme with zero padding may be used instead of the CP in FIG. 1. Moreover, the CP or zero padding may be added both forward and backward.

An aspect of the present embodiment may be operated in carrier aggregation or dual connectivity with a Radio Access Technology (RAT) such as LTE or LTE-A/LTE-A Pro. At this time, the aspect may be used in a part or all of cells or cell groups, carriers or carrier groups (for example, Primary Cells (PCell), secondary cells (SCell), Primary Secondary Cells (PSCell), Master Cell Groups (MCG), Secondary Cell Groups (SCG), or the like). Moreover, the aspect may be used in a stand-alone manner and may be independently operated. In dual connectivity operation, a Special Cell (SpCell) will be referred to as a PCell of an MCG or a PSCell of an SCG in accordance with which of an MCG and an SCG a Medium Access Control (MAC) entity is associated with, respectively. In a case that the dual connectivity operation is not employed, the Special Cell (SpCell) will be referred to as PCell. The Special Cell (SpCell) supports PUCCH transmission and contention based random access.

In the present embodiment, one or a plurality of serving cells may be configured for the terminal apparatus 1. The plurality of configured serving cells may include one primary cell and one or a plurality of secondary cells. The primary cell may be a serving cell on which an initial connection establishment procedure has been performed, a serving cell for which a connection re-establishment procedure has been started, or a cell indicated as a primary cell in a handover procedure. One or a plurality of secondary cells may be configured at or after establishment of Radio Resource Control (RRC) connection. However, the plurality of configured serving cells may include one primary secondary cell. The primary secondary cell may be a secondary cell capable of performing uplink transmission of control information, from among one or a plurality of secondary cells configured for the terminal apparatus 1. Also, two types of serving cell subsets, namely a master cell group and a secondary cell group may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the plurality of cells. Cells to which the TDD scheme is applied and cells to which the FDD scheme is applied may be aggregated. The TDD scheme may be referred to as an unpaired spectrum operation. The FDD scheme may be referred to as a paired spectrum operation.

A carrier corresponding to a serving cell in the downlink will be referred to as a downlink component carrier (or a downlink carrier). A carrier corresponding to a serving cell in the uplink will be referred to as an uplink component carrier (or an uplink carrier). A carrier corresponding to a serving cell in a sidelink will be referred to as a sidelink component carrier (or a sidelink carrier). The downlink component carrier, the uplink component carrier, and/or the sidelink component carrier will be collectively referred to as a component carrier (or a carrier).

Physical channels and physical signals according to the present embodiment will be described.

In FIG. 1, the following physical channels are used for the radio communication between the terminal apparatus 1 and the base station apparatus 3.

Physical Broadcast CHannel (PBCH)
Physical Downlink Control Channel (PDCCH)
Physical Downlink Shared Channel (PDSCH)
Physical Uplink Control CHannel (PUCCH)
Physical Uplink Shared CHannel (PUSCH)
Physical Random Access CHannel (PRACH)

The PBCH is used to provide a notification of essential information blocks (a Master Information Block (MIB), an Essential Information Block (EIB), and a Broadcast Channel (BCH)) which includes important system information needed by the terminal apparatus 1.

Also, the PBCH may be used to provide a notification of a time index in a period of a synchronization signal block (also referred to as an SS/PBCH block). Here, the time index is information indicating an index of a synchronization signal in the cell and the PBCH. In a case that the SS/PBCH block is transmitted using an assumption of three transmission beams (Quasi Co-Location (QCL) regarding transmission filter configuration and reception space parameters), for example, the time index may indicate a time order in a predefined period or a configured period. Also, the terminal apparatus may recognize a difference in time indexes as a difference in transmission beams.

The PDCCH is used to transmit (or carry) Downlink Control Information (DCI) in downlink radio communication (radio communication from the base station apparatus 3 to the terminal apparatus 1). Here, one or a plurality of pieces of DCI (which may be referred to as DCI formats) are defined for the transmission of downlink control information. In other words, a field for the downlink control information is defined as DCI and is mapped to information bits. The PDCCH is transmitted in a PDCCH candidate. The terminal apparatus 1 monitors a set of PDCCH candidates in the serving cell. The monitoring means an attempt to decode the PDCCH in accordance with a certain DCI format.

For example, the following DCI formats may be defined.
DCI format 0_0
DCI format 0_1
DCI Format 1_0
DCI Format 1_1
DCI Format 2_0
DCI Format 2_1
DCI Format 2_2
DCI Format 2_3

The DCI format 0_0 may include information indicating scheduling information of the PUSCH (frequency domain resource allocation and time domain resource allocation).

The DCI format 0_1 may include information indicating scheduling information of the PUSCH (frequency domain resource allocation and time domain resource allocation), information indicating a BandWidth Part (BWP), a Channel State Information (CSI) request, a Sounding Reference Signal (SRS) request, and information regarding an antenna port.

The DCI format 1_0 may include information indicating scheduling information of the PDSCH (frequency domain resource allocation and time domain resource allocation).

The DCI format 1_1 may include information indicating scheduling information of the PDSCH (frequency domain resource allocation and time domain resource allocation), information indicating a BandWidth Part (BWP), a Transmission Configuration Indication (TCI), and information regarding an antenna port.

The DCI format 2_0 is used to notify a slot format of one or a plurality of slots. The slot format is defined by each OFDM symbol in the slot being categorized into any of downlink, flexible, and uplink symbol. In a case that a slot format is 28, for example, DDDDDDDDDDDDFU is applied to fourteen OFDM symbols in the slot for which the slot format 28 has been indicated. Here, D denotes a downlink symbol, F denotes a flexible symbol, and U denotes an uplink symbol. Note that the slot will be described later.

The DCI format 2_1 is used to notify, to the terminal apparatus 1, physical resource blocks and OFDM symbols that may be assumed not to be transmitted. Note that this information may be referred to as a preemption indication (intermittent transmission indication).

The DCI format 2_2 is used to transmit a Transmit Power Control (TPC) command for the PUSCH and the PUSCH.

The DCI format 2_3 is used to transmit a group of TPC commands for sounding reference signals (SRS) transmission performed by one or a plurality of terminal apparatuses 1. An SRS request may be transmitted along with the TPC command. In addition, the SRS request and the TPC command may be defined in the DCI format 2_3 for the uplink with neither the PUSCH nor the PUCCH or for the uplink in which SRS transmission power control is not linked to PUSCH transmission power control.

The DCI for the downlink will also be referred to as a downlink grant or downlink assignment. Here, the DCI for the uplink will also be referred to as an uplink grant or uplink assignment.

A Cyclic Redundancy Check (CRC) parity bit added to a DCI format transmitted by one PDCCH is scrambled with a Cell-Radio Network Temporary Identifier (C-RNTI), a Configured Scheduling-Radio Network Temporary Identifier (CS-RNTI), a Random Access-Radio Network Temporary Identity (RA-RNTI), or a Temporary C-RNTI. The C-RNTI and the CS-RNTI are identifiers for identifying a terminal apparatus within a cell. The Temporary C-RNTI is an identifier for identifying the terminal apparatus 1 that has transmitted a random access preamble during a contention based random access procedure.

The C-RNTI (an identifier (identification information) of the terminal apparatus) is used to control the PDSCH or the PUSCH in one or a plurality of slots. The CS-RNTI is used to periodically allocate the PDSCH or PUSCH resources. The Temporary C-RNTI (TC-RNTI) is used to control PDSCH transmission or PUSCH transmission in one or a plurality of slots. The Temporary C-RNTI is used to schedule re-transmission of a random access message 3 and transmission of a random access message 4. RA-RNTI (random access response identification information) is determined in accordance with position information of a frequency and a time of a physical random access channel through which a random access preamble has been transmitted.

The PUCCH is used to transmit Uplink Control Information (UCI) in uplink radio communication (radio communication from the terminal apparatus 1 to the base station apparatus 3). Here, the uplink control information may include Channel State Information (CSI) used to indicate a downlink channel state. Also, the uplink control information may include a Scheduling Request (SR) used to request a UL-SCH resource. The uplink control information may include a Hybrid Automatic Repeat request ACKnowledgement (HARQ-ACK). The HARQ-ACK may indicate an HARQ-ACK for downlink data (Transport block, Medium Access Control Protocol Data Unit: MAC PDU, Downlink-Shared Channel: DL-SCH).

The PDSCH is used to transmit downlink data (Downlink Shared Channel: DL-SCH) from a medium access (Medium Access Control: MAC) layer. Also, in a case of the downlink, the PDSCH is used to transmit System Information (SI), a Random Access Response (RAR), and the like.

The PUSCH may be used to transmit the HARQ-ACK and/or the CSI along with uplink data (Uplink Shared CHannel: UL-SCH) or uplink data from the MAC layer. Also, the PUSCH may be used to transmit only the CSI or only the HARQ-ACK and the CSI. In other words, the PUSCH may be used to transmit only the UCI.

Here, the base station apparatus 3 and the terminal apparatus 1 exchange (transmit and receive) signals in a higher layer. For example, the base station apparatus 3 and the terminal apparatus 1 may transmit and receive Radio Resource Control (RRC) signaling (also referred to as a Radio Resource Control (RRC) message or Radio Resource Control (RRC) information) in a Radio Resource Control (RRC) layer. Also, the base station apparatus 3 and the terminal apparatus 1 may transmit and receive a Medium Access Control (MAC) element in a MAC layer. Here, the RRC signaling and/or the MAC control element will also be referred to as higher layer signaling. The higher layer here means a higher layer than the physical layer and may thus include one or a plurality of the MAC layer, the RRC layer, the RLC layer, the PDCP layer, a Non Access Stratum (NAS) layer, and the like. For example, the higher layer may include one or a plurality of the RRC layer, the RLC layer, the PDCP layer, the NAS layer, and the like in the processing of the MAC layer.

The PDSCH or the PUSCH may be used to transmit the RRC signaling and the MAC control element. Here, the RRC signaling transmitted from the base station apparatus 3 in the PDSCH may be signaling common to a plurality of terminal apparatuses 1 in a cell. Also, the RRC signaling transmitted from the base station apparatus 3 may be signaling dedicated for a specific terminal apparatus 1 (also referred to as dedicated signaling). In other words, terminal apparatus specific (UE specific) information may be transmitted using signaling dedicated for a specific terminal apparatus 1. Also, the PUSCH may be used to transmit a UE capability in the uplink.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID may be detected using the PSS and the SSS.

The synchronization signal is used by the terminal apparatus 1 to establish synchronization in a frequency domain and a time domain in the downlink. Here, the synchronization signal may be used by the terminal apparatus 1 to select precoding or a beam in precoding or beamforming performed by the base station apparatus 3. Note that the beam may be referred to as a transmission or reception filter configuration, or a space domain transmission filter or space domain reception filter.

The reference signal is used by the terminal apparatus 1 to perform channel compensation on a physical channel. Here, the reference signal may also be used by the terminal apparatus 1 to calculate the downlink CSI. Also, the reference signal may be used for a numerology such as radio parameters or subcarrier spacing or may be used for fine synchronization that allows FFT window synchronization to be achieved.

According to the present embodiment, any one or a plurality of the following downlink reference signals are used.

Demodulation Reference Signal (DMRS)
Channel State Information Reference Signal (CSI-RS)
Phrase Tracking Reference Signal (PTRS)
Tracking Reference Signal (TRS)

The DMRS is used to demodulate a modulated signal. Note that two types of reference signals, namely a reference signal for demodulating the PBCH and a reference signal for demodulating the PDSCH may be defined in the DMRS, or the both may be referred to as the DMRS. The CSI-RS may be used for measurement of Channel State Information (CSI) and beam management, and a periodic, semipersistent, or non-periodic CSI reference signal transmission method is applied thereto. Non-Zero Power (NZP) CSI-RS and Zero Power (ZP) CSI-RS with zero transmission power (or reception power) may be defined for the CSI-RS. Here, the ZP CSI-RS may be defined as a CSI-RS resource with zero transmission power or that is not to be transmitted. The PTRS is used to track a phase in a time axis for the purpose of securing a frequency offset caused by phase noise. The TRS is used to secure Doppler shift during high-speed moving. Note that the TRS may be used as one configuration of the CSI-RS. For example, a radio resource may be configured using one port CSI-RS as the TRS.

In the present embodiment, any one or a plurality of the following uplink reference signals are used.
Demodulation Reference Signal (DMRS)
Phrase Tracking Reference Signal (PTRS)
Sounding Reference Signal (SRS)

The DMRS is used to demodulate a modulated signal. Note that two types of reference signals, namely a reference signal for demodulating the PUCCH and a reference signal for demodulating the PUSCH may be defined in the DMRS, or the both may be referred to as the DMRS. The SRS is used for measurement of uplink channel state information (CSI), channel sounding, and beam management. The PTRS is used to track a phase in a time axis for the purpose of securing a frequency offset caused by phase noise.

The downlink physical channels and/or the downlink physical signals will collectively be referred to as a downlink signal. The uplink physical channels and/or the uplink physical signals will collectively be referred to as an uplink signal. The downlink physical channels and/or the uplink physical channels will collectively be referred to as a physical channel. The downlink physical signals and/or the uplink physical signals will collectively be referred to as a physical signal.

The BCH, the UL-SCH, and the DL-SCH are transport channels. A channel used in the Medium Access Control (MAC) layer will be referred to as a transport channel. A unit of the transport channel used in the MAC layer will also be referred to as a Transport Block (TB) and/or a MAC Protocol Data Unit (PDU). A Hybrid Automatic Repeat reQuest (HARM) is controlled for each transport block in the MAC layer. The transport block is a unit of data that the MAC layer delivers to the physical layer. In the physical layer, the transport block is mapped to a codeword, and coding processing is performed for each codeword.

FIG. 2 is a diagram illustrating examples of an SS/PBCH block (also referred to as a synchronization signal block, an SS block, or SSB) and an SS burst set (also referred to as a synchronization signal burst set) according to the present embodiment. FIG. 2 illustrates an example in which two SS/PBCH blocks are included in the SS burst set periodically transmitted and each SS/PBCH block includes continuous 4 OFDM symbols.

The SS/PBCH block is a unit block including at least synchronization signals (PSS, SSS) and/or the PBCH. Transmission of the signals/channel included in the SS/PBCH block will be expressed as transmission of the SS/PBCH block. In a case that the base station apparatus 3 transmits the synchronization signals and/or the PBCH using one or a plurality of SS/PBCH blocks in the SS burst set, the base station apparatus 3 may use a downlink transmission beam independent for each SS/PBCH block.

In FIG. 2, the PSS, the SSS, and the PBCH are time/frequency-multiplexed in one SS/PBCH block. However, the order in which the PSS, the SSS, and/or the PBCH is multiplexed in the time domain may differ from the one in the example illustrated in FIG. 2.

The SS burst set may be periodically transmitted. For example, a period to be used for an initial access and a period configured for the connected terminal apparatus (Connected or RRC_Connected) may be defined. Also, the period configured for the connected terminal apparatus (Connected or RRC_Connected) may be configured in the RRC layer. In addition, the period configured for the connected terminal (Connected or RRC_Connected) may be a period of a radio resource in the time domain with a potential of transmission, and in practice, the base station apparatus 3 may determine whether to perform transmission. Also, the period used for the initial access may be predefined in specifications or the like.

The SS burst set may be determined based on a System Frame Number (SFN). Also, a start position (boundary) of the SS burst set may be determined based on the SFN and the period.

An SSB index (which may also be referred to as an SSB/PBCH block index) is allocated to the SS/PBCH block in accordance with a temporal position in the SS burst set. The terminal apparatus 1 calculates the SSB index based on information of the PBCH and/or information of the reference signals included in the detected SS/PBCH block.

The same SSB index is allocated to SS/PBCH blocks with the same relative time in each SS burst set among a plurality of SS burst sets. The SS/PBCH blocks with the same relative time in each SS burst set among the plurality of SS burst sets may be assumed to be QCL (or to which the same downlink transmission beam has been applied). Also, antenna ports of the SS/PBCH blocks with the same relative time in each SS burst set among the plurality of SS burst sets may be assumed to be QCL in regard to an average delay, Doppler shift, and a spatial correlation.

SS/PBCH blocks to which the same SSB index is allocated in a period of a certain SS burst set may be assumed to be QCL in regard to an average delay, an average gain, Doppler spread, Doppler shift, and a spatial correlation. Settings corresponding to one or a plurality of SS/PBCH blocks (or which may be reference signals) that are QCL may be referred to as QCL configurations.

The number of SS/PBCH blocks (which may also be referred to as the number of SS blocks or the number of SSBs), may be defined as the number of SS/PBCH blocks in an SS burst, an SS burst set, or an SS/PBCH block period, for example. Also, the number of SS/PBCH blocks may indicate the number of beam groups for selecting a cell in the SS burst, the SS burst set, or the SS/PBCH block period. Here, the beam groups may be defined as the number of different SS/PBCH blocks or the number of different beams included in the SS burst, the SS burst set, or the SS/PBCH block period.

The reference signals described below in the present embodiment include a downlink reference signal, a synchronization signal, an SS/PBCH block, a downlink DM-RS, a CSI-RS, an uplink reference signal, an SRS, and/or an uplink DM-RS. For example, the downlink reference signal, the synchronization signal, and/or the SS/PBCH block may be referred to as reference signals. The reference signals used in the downlink include a downlink reference signal, a synchronization signal, an SS/PBCH block, a downlink DM-RS, a CSI-RS, and the like. The reference signals used in the uplink include an uplink reference signal, an SRS, an uplink DM-RS, and/or the like.

In addition, the reference signal may also be used for Radio Resource Measurement (RRM). The reference signal may also be used for beam management.

The beam management may be a procedure performed by the base station apparatus 3 and/or the terminal apparatus 1 to match directionality between an analog and/or digital beam in a transmission apparatus (the base station apparatus 3 in the case of the downlink, or the terminal apparatus 1 in the case of the uplink) and an analog and/or digital beam of a reception apparatus (the terminal apparatus 1 in the case of the downlink, or the base station apparatus 3 in the case of the uplink) and acquire a beam gain.

Note that the following procedures may be included as a procedure of configuring, configuration, or establishing beam pairing.

Beam selection
Beam refinement
Beam recovery

For example, the beam selection may be a procedure for selecting a beam in communication between the base station apparatus 3 and the terminal apparatus 1. Also, the beam refinement may be a procedure of selecting a beam having a higher gain or changing a beam to an optimum beam between the base station apparatus 3 and the terminal apparatus 1 according to the movement of the terminal apparatus 1. The beam recovery may be a procedure of re-selecting the beam in a case that the quality of a communication link is degraded due to blockage caused by a blocking object, passing of a person, or the like in communication between the base station apparatus 3 and the terminal apparatus 1.

The beam selection and the beam refinement may be included in the beam management. The beam recovery may include the following procedures.

Detection of beam failure
Discovery of new beam
Transmission of beam recovery request
Monitoring of response to beam recovery request For example, a Reference Signal Received Power (RSRP) of the SSS included in the CSI-RS or the SS/PBCH block may be used, or the CSI may be used, in a case that a transmission beam for the base station apparatus 3 is selected in the terminal apparatus 1. In addition, a CSI-RS Resource Index (CRI) may be used as a report to the base station apparatus 3, or an index indicated by a sequence of demodulation reference signals (DMRS) used for demodulating the PBCH and/or the PBCH included in the SS/PBCH block may be used.

Also, the base station apparatus 3 indicates a time index of the CRI or the SS/PBCH in a case that a beam is indicated for the terminal apparatus 1, and the terminal apparatus 1 performs reception based on the indicated time index of the CRI or the SS/PBCH. At this time, the terminal apparatus 1 may configure a space filter based on the indicated time index of the CRI or the SS/PBCH and may perform reception. In addition, the terminal apparatus 1 may perform reception using the assumption of a Quasi Co-Location (QCL). An expression that a certain signal (such as an antenna port, a synchronization signal, or a reference signal) is "QCL" with another signal (such as an antenna port, a synchronization signal, or a reference signal) or an expression that "an assumption of QCL is used" can be interpreted as having a meaning that the certain signal is associated with another signal.

In a case that a Long Term Property of a channel on which a certain symbol in a certain antenna port is carried can be estimated from a channel on which a certain symbol in the other antenna port is carried, it is possible to state that the two antenna ports are QCL. The Long Term Property of the channel includes one or a plurality of delay spread, Doppler spread, Doppler shift, an average gain, and an average delay. In a case that an antenna port 1 and an antenna port 2 are QCL in regard to an average delay, for example, this means that a reception timing for the antenna port 2 can be estimated from a reception timing for the antenna port 1.

The QCL can also be expanded to beam management. For this purpose, spatially expanded QCL may be newly defined. For example, the Long term property of a channel on the assumption of QCL in the space domain may be an arrival angle in a radio link or the channel (such as an Angle of Arrival (AoA) or a Zenith angle of Arrival (ZoA)) and/or an angle spread (for example, Angle Spread of Arrival (ASA) or a Zenith angle Spread of Arrival (ZSA)), a transmission angle (such as AoD or ZoD) or an angle spread of the transmission angle (for example, an Angle Spread of Departure (ASD) or a Zenith angle Spread of Departure (ZSD)), Spatial Correlation, or a reception space parameter.

In a case that the antenna port 1 and the antenna port 2 can be regarded as being QCL in regard to the reception space parameter, for example, this means that a reception beam for receiving a signal from the antenna port 2 can be estimated from a reception beam (reception space filter) for receiving a signal from the antenna port 1.

As QCL types, combinations of long term properties that may be QCL may be defined. For example, the following types may be defined.

Type A: Doppler shift, Doppler spread, average delay, delay spread
Type B: Doppler shift, Doppler spread
Type C: Average delay, Doppler shift
Type D: Receiving space parameter For the aforementioned QCL types, an assumption of QCL between one or two reference signals and the PDCCH or the PDSCH DMRS in the RRC and/or the MAC layer and/or the DCI may be configured and/or indicated as a Transmission Configuration Indication (TCI). In a case that an index #2 of the SS/PBCH block and a QCL type A+QCL type B are configured and/or indicated as one state of the TCI in a case that the terminal apparatus 1 receives the PDCCH, for example, the terminal apparatus 1 may receive the DMRS of the PDCCH by regarding it as Doppler shift, Doppler spread in a case of receiving the index #2 of the SS/PBCH block, an average delay, delay spread, a reception space parameter, and a channel long term property and may perform synchronization and carrier path estimation, in a case that the terminal apparatus 1 receives the PDCCH DMRS. At this time, a reference signal (the SS/PBCH block in the aforementioned example) indicated by the TCI may be referred to as a source reference signal, and a reference signal (the PDCCH DMRS in the aforementioned example) affected by a long term property estimated from the long term property of the channel in a case that the source reference signal is received may be referred to as a target reference signal. Also, one or a plurality of TCI states and a combination of a source reference signal and a QCL type for each state may be configured with the RRC, and the TCI may be indicated in the MAC layer or the DCI for the terminal apparatus 1.

Operations of the base station apparatus 3 and the terminal apparatus 1 equivalent to the beam management may be defined through assumption of QCL in the space domain and with a radio resource (time and/or frequency) as beam management and beam indication/report by this method.

Hereinafter, the subframe will be described. The subframe referred in the present embodiment may also be referred to as a resource unit, a radio frame, a time section, a time interval, or the like.

Figure 3:
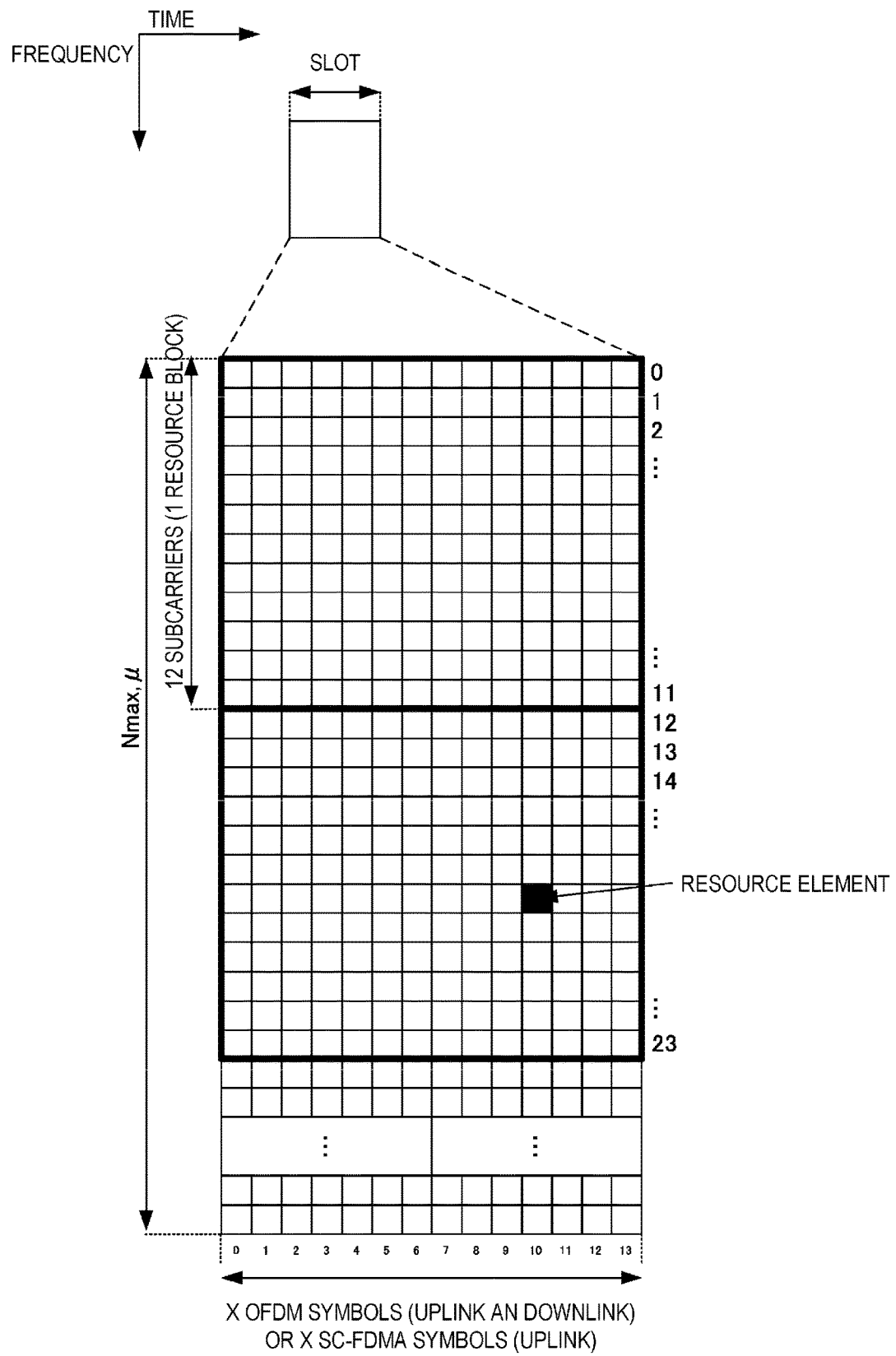
FIG. 3 is a diagram illustrating overview configurations of uplink and downlink slots according to the embodiment of the present invention.

FIG. 3 is a diagram illustrating an example of overview configurations of uplink and downlink slots according to a first embodiment of the present invention. Each of the radio frames is 10 ms in length. Also, each of the radio frames includes ten subframes and W slots. Also, one slot includes X OFDM symbols. In other words, the length of one subframe is 1 ms. For slot, a time length is defined based on subcarrier spacing. For example, in a case of OFDM symbol subcarrier spacing of 15 kHz and a Normal Cyclic Prefix (NCP), X=7 or X=14, which correspond to 0.5 ms and 1 ms, respectively. Also, in a case of subcarrier spacing of 60 kHz, X=7 or X=14, which correspond to 0.125 ms and 0.25 ms, respectively. In addition, in a case that X=14, for example, W=10 in a case that the subcarrier spacing is 15 kHz, and W=40 in a case that the subcarrier spacing is 60 kHz. FIG. 3 illustrates a case in which X=7 as an example. Note that expansion can similarly be performed even in a case that X=14. Also, the uplink slot is similarly defined, and the downlink slot and the uplink slot may be separately defined. Also, a bandwidth of the cell in FIG. 3 may be defined as a BandWidth Part (BWP). Moreover, the slot may be defined as a Transmission Time Interval (TTI). The slot may not be defined as the TTI. The TTI may be a transmission period of the transport block.

A signal or a physical channel transmitted in each slot may be expressed by a resource grid. The resource grid is defined by a plurality of subcarriers and a plurality of OFDM symbols for each numerology (subcarrier spacing and cyclic prefix length) and each carrier. The number of subcarriers configuring one slot depends on each of the downlink and uplink bandwidths of a cell. Each element in the resource grid will be referred to as a resource element. The resource element may be identified using a subcarrier number and an OFDM symbol number.

The resource grid is used to express mapping of resource elements of a certain physical downlink channel (such as a PDSCH) or an uplink channel (such as a PUSCH). In a case that the subcarrier spacing is 15 kHz, for example, the number X of OFDM symbols included in the subframe=14, and in the case of the NCP, one physical resource block is defined by fourteen continuous OFDM symbols in the time domain and 12*Nmax continuous subcarriers in the frequency domain. Nmax is the maximum number of resource blocks determined by the subcarrier spacing configuration μ, which will be described later. In other words, the resource grid includes (14*12*Nmax, μ) resource elements. Extended CP (ECP) is supported only by subcarrier spacing of 60 kHz, one physical resource block is defined by 12 (the number of OFDM symbols included in one slot)*4 (the number of slots included in one subframe)=48 continuous OFDM symbols in the time domain and 12*Nmax, μ continuous subcarriers in the frequency domain, for example. In other words, the resource grid includes (48*12*Nmax, μ) resource elements.

As resource blocks, reference resource blocks, common resource blocks, physical resource blocks, and virtual resource blocks are defined. One resource block is defined as twelve continuous subcarriers in the frequency domain. The reference resource blocks are common to all subcarriers, the resource blocks may be configured with subcarrier spacing of 15 kHz, for example, and may be numbered in an ascending order. A subcarrier index 0 in a reference resource block index 0 may be referred to as a reference point A (point A) (which may simply be referred to as a "reference point"). The common resource blocks are resource blocks numbered in an ascending order from 0 at each subcarrier spacing configuration μ from the reference point A. The aforementioned resource grid is defined by the common resource blocks. The physical resource blocks are resource blocks included in a bandwidth part (BWP), which will be described later, and numbered in an ascending order from 0, and the physical resource blocks are resource blocks included in a bandwidth part (BWP) and numbered in an ascending order from 0. A certain physical uplink channel is first mapped to a virtual resource block. Thereafter, the virtual resource block is mapped to a physical resource block. Hereinafter, the resource block may be a virtual resource block, a physical resource block, a common resource block, or a reference resource block.

Next, the subcarrier spacing configuration μ will be described. As described above, one or a plurality of OFDM numerologies are supported by the NR. For a certain BWP, the subcarrier spacing configuration μ (μ=0, 1, . . . , 5) and the cyclic prefix length are provided in a higher layer relative to a downlink BWP and is provided in a higher layer for an uplink BWP. In a case that μ is provided here, the subcarrier spacing Δf is provided as Δf=2^μ·15 (kHz).

With the subcarrier spacing configuration μ, slots are counted in an ascending order from 0 to N^{subframe, μ}_{slot}−1 in the subframe and are counted in an ascending order from 0 to N"{frame,μ}_{slot}−1 in the frame. based on the slot configuration and the cyclic prefix, N^{slot}_{symb} continuous OFDM symbols are present in a slot. N^{slot}_{symb} is 14. The start of the slot n^{μ}_{s} in a subframe is aligned with the start of the n^{μ}_{s}N^{slot}_{symb}-th OFDM symbol in the same subframe in terms of the time.

Figure 4:
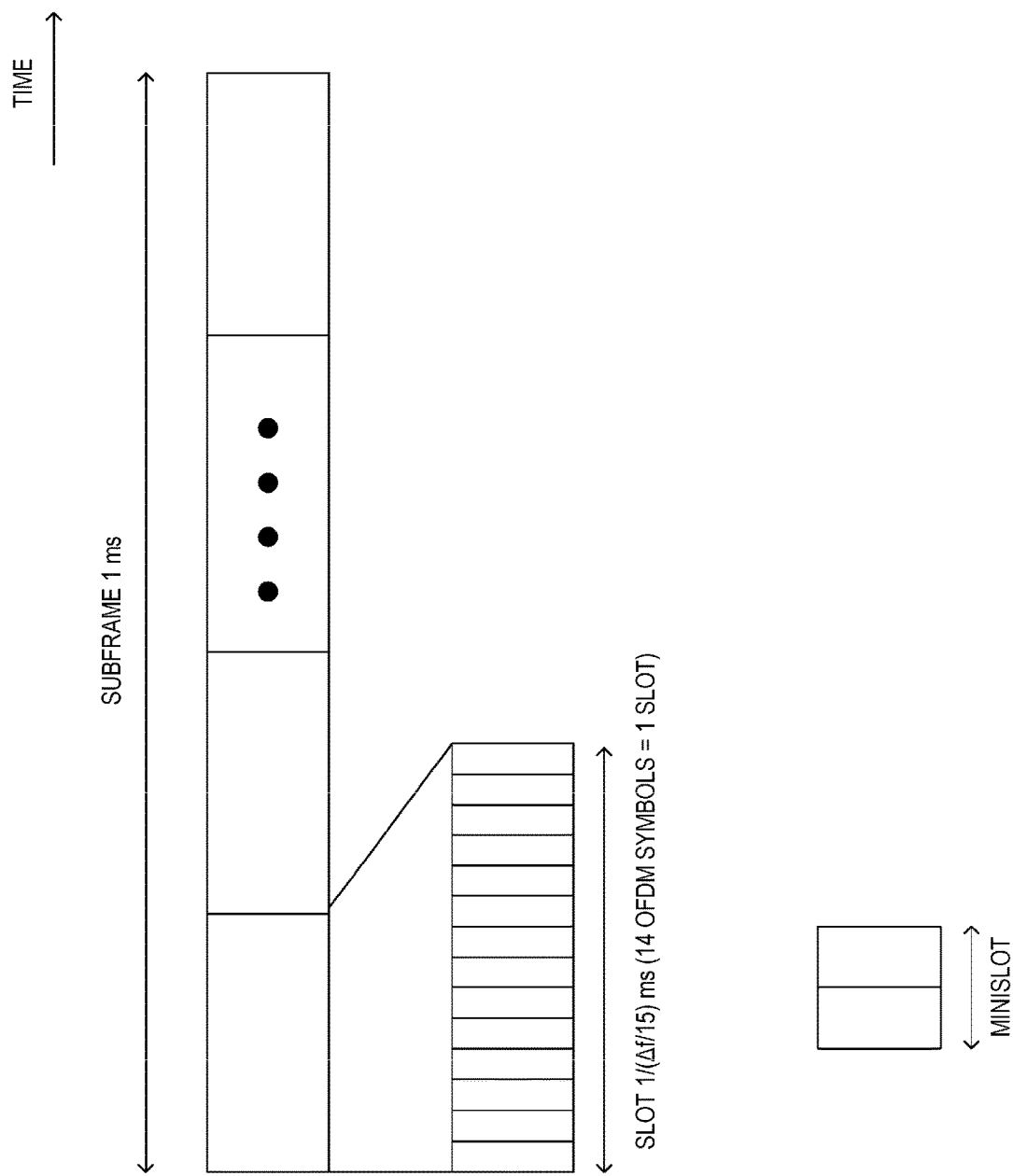
FIG. 4 is a diagram illustrating a relationship among a subframe, a slot, and a mini slot in a time domain according to the embodiment of the present invention.

Next, a subframe, a slot, and a mini-slot will be described. FIG. 4 is a diagram illustrating a relationship among the subframe, the slot, and the mini-slot in the time domain. As illustrated in the drawing, three types of time units are defined. The subframe is 1 ms regardless of the subcarrier spacing, the number of OFDM symbols included in the slot is 7 or 14, and the slot length differs depending on the subcarrier spacing. Here, in a case of the subcarrier spacing of 15 kHz, fourteen OFDM symbols are included in one subframe. The downlink slot may be referred to as a PDSCH mapping type A. The uplink slot may be referred to as a PUSCH mapping type A.

The mini-slot (which may be referred to as a sub-slot) is a time unit including a smaller number of OFDM symbols than the OFDM symbols included in the slot. In the drawing, a case in which the mini-slot includes two OFDM symbols is illustrated as an example. The OFDM symbols in the mini-slot may coincide with the OFDM symbol timing configuring the slot. Note that a minimum unit of scheduling may be a slot or a mini-slot. Moreover, allocating of a mini-slot may be referred to as non-slot-based scheduling. In addition, an operation in which a mini-slot is scheduled may be expressed as an operation in which a resource with fixed data start position in regard to a relative time position with respect to a reference signal is scheduled. The downlink mini-slot may be referred to as a PDSCH mapping type B. The uplink mini-slot may be referred to as a PUSCH mapping type B.

Figure 5:
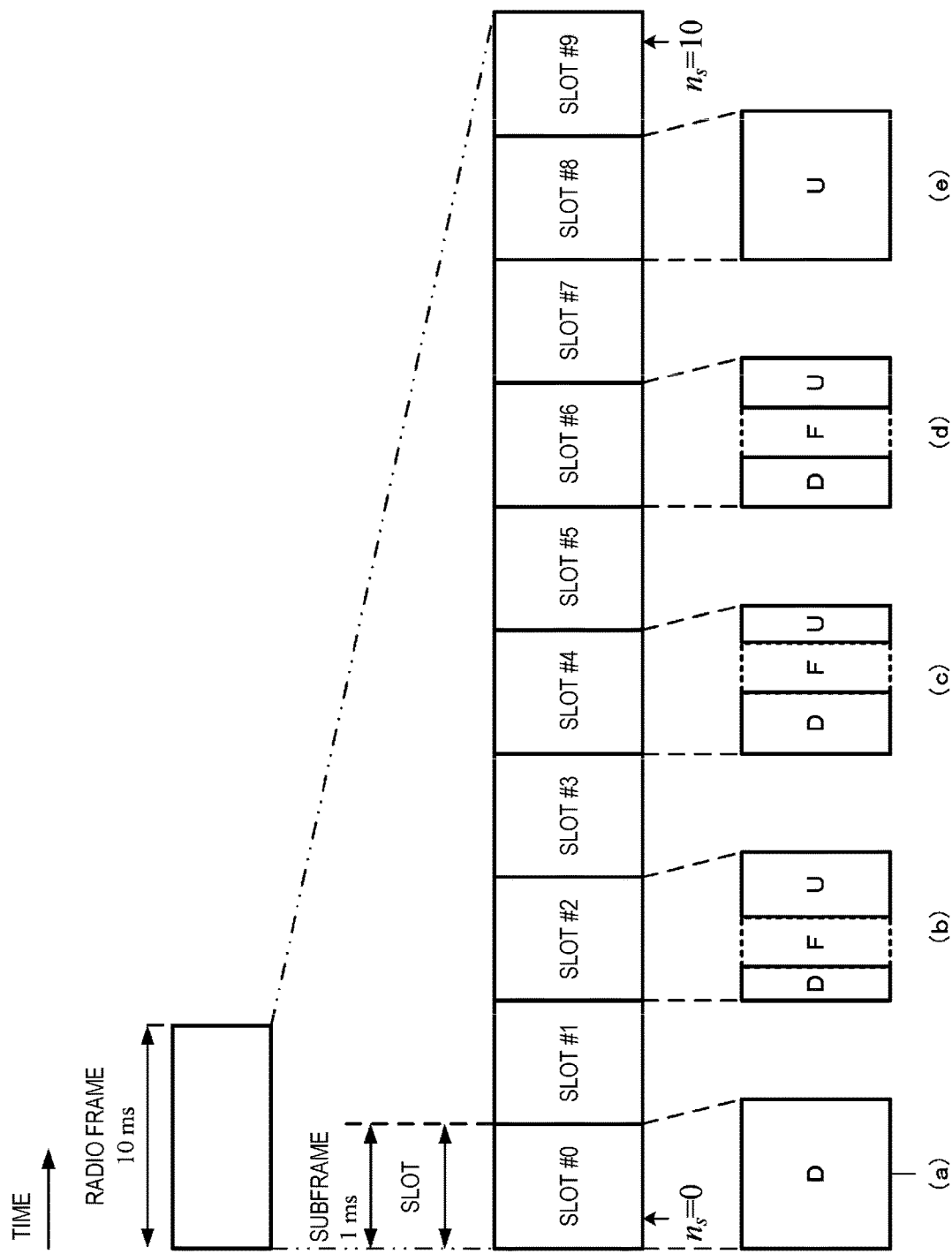
FIG. 5 is a diagram illustrating an example of a slot or a subframe according to the embodiment of the present invention.

FIG. 5 is a diagram illustrating an example of a slot format. Here, a case in which the slot length is 1 ms at a subcarrier spacing of 15 kHz is illustrated as an example. In the drawing, D denotes the downlink while U denotes the uplink. As illustrated in the drawing, a certain time section (for example, a minimum time section that has to be allocated to one UE in a system, for example) may include one or a plurality of:

Downlink symbol
Flexible symbol
Uplink symbol. Note that proportions thereof may be defined in advance as a slot format. Also, the proportions thereof may be defined by the number of downlink OFDM symbols included in a slot or may be defined by a start position and an end position in a slot. Also, the proportions thereof may be defined by uplink OFDM symbols included in a slot, the number of DFT-S-OFDM symbols, or a start position and an end position in a slot. Note that an operation in which a slot is scheduled may be expressed as an operation in which a resource with a fixed slot boundary in terms of relative time position with respect to a reference signal is scheduled.

The terminal apparatus 1 may receive a downlink signal or a downlink channel with a downlink symbol or a flexible symbol. The terminal apparatus 1 may transmit an uplink signal or a downlink channel with an uplink symbol or a flexible symbol.

FIG. 5(a) is an example used entirely for downlink transmission in a certain time section (which may be referred to as a minimum unit of time resources that can be allocated to 1 UE, for example, or may be referred to as a time unit or the like; Also, a plurality of minimum units of time resources may be referred to as a time unit), and in FIG. 5(b), uplink scheduling is performed via a PDCCH, for example, with a first time resource, and an uplink signal is transmitted via a flexible symbol including a PDCCH processing delay, a downlink to uplink switching time, and generation of the transmission signal. FIG. 5(c) is used for PDCCH and/or downlink PDSCH transmission with a first time resource and is used for PUSCH or PUCCH transmission via a processing delay, a downlink to uplink switching time, and a gap for generating a transmission signal. Here, the uplink signal may be used to transmit HARQ-ACK and/or CSI, that is, UCI in one example. FIG. 5(b) is used for PDCCH and/or PDSCH transmission with a first time resource and is used for uplink PUSCH and/or PUCCH transmission via a processing delay, a downlink to uplink switching time, and a gap for generating a transmission signal. Here, the uplink signal may be used to transmit uplink data, that is, UL-SCH in one example. FIG. 5(e) is an example used entirely for uplink transmission (PUSCH or PUCCH).

The aforementioned downlink part and uplink part may include a plurality of OFDM symbols similarly to those in the LTE.

Figure 6:
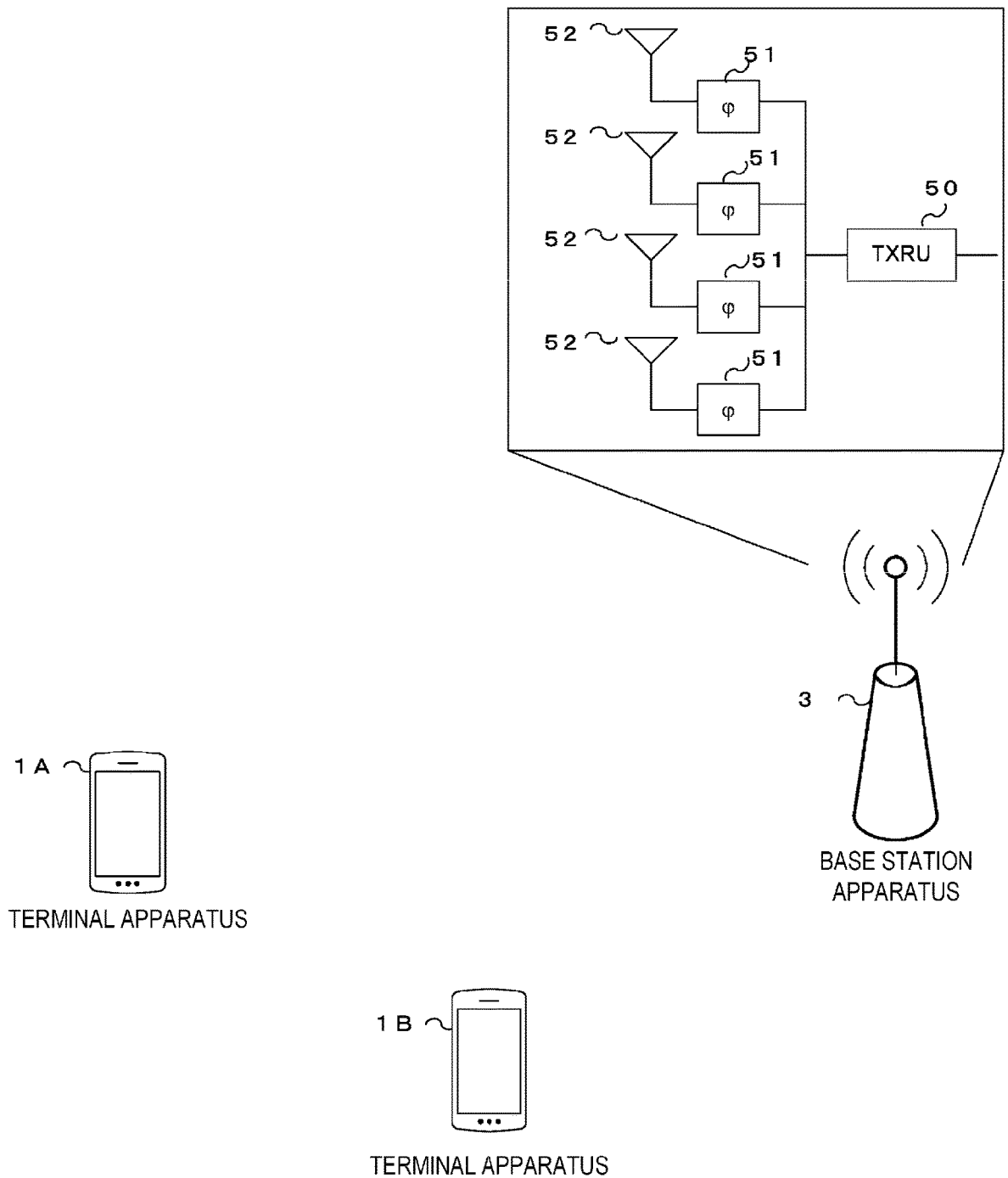
FIG. 6 is a diagram illustrating an example of beam forming according to the embodiment of the present invention.

FIG. 6 is a diagram illustrating an example of beam forming. A plurality of antenna elements are connected to one transceiver unit (TXRU) 50, a phase is controlled by a phase shifter 51 for each antenna element, and a beam can be directed to an arbitrary direction with respect to a transmission signal by transmitting it from each antenna element 52. Typically, the TXRU may be defined as an antenna port, and only the antenna port may be defined for the terminal apparatus 1. Since it is possible to direct directionality to the arbitrary direction by controlling the phase shifter 51, the base station apparatus 3 can communicate with the terminal apparatus 1 using a beam with a high gain.

Hereinafter, a band portion (Bandwidth part) will be described. The BWP will also be referred to as a carrier BWP. The BWP may be configured for each of the downlink and the uplink. The BWP is defined as a group of continuous physical resources selected from continuous subsets in a common resource block. For the terminal apparatus 1, up to four BWPs for each of which one downlink carrier BWP (DL BWP) is activated in a certain time may be configured. For the terminal apparatus 1, up to four BWPs for each of which one uplink carrier BWP (UL BWP) is activated in a certain time may be configured. In a case of carrier aggregation, the BWPs may be configured in each serving cell. At this time, the fact that one BWP has been configured in a certain serving cell may be expressed as a fact that no BWP has been configured. Also, the fact that two or more BWPs have been configured may be expressed as a fact that the BWP has been configured.

MAC Entity Operation

There is always one active (activated) BWP in an activated serving cell. BWP switching for a certain serving cell is used to activate an inactive (deactivated) BWP and deactivate an active (activated) BWP. The BWP switching for a certain serving cell is controlled by a PDCCH indicating downlink allocation or an uplink grant. The BWP switching for a certain serving cell may further be controlled by a BWP inactivity timer, through RRC signaling, or by a MAC entity itself in a case that a random access procedure is initiated. In addition of SpCell (PCell or PSCell) or activation of SCell, one BWP is first active without receiving a PDCCH indicating downlink allocation or an uplink grant. The first active DL BWP and a first active UL BWP may be designated by an RRC message transmitted from the base station apparatus 3 to the terminal apparatus 1. The active BWP for a certain serving cell is designated by an RRC or a PDCCH transmitted from the base station apparatus 3 to the terminal apparatus 1. Also, the first active DL BWP and the first active UL BWP may be included in a message 4. In an unpaired spectrum (such as a TDD band), the DL BWP and the UL BWP are paired, and the BWP switching is common to UL and DL. The MAC entity of the terminal apparatus 1 applies normal processing to an active BWP for each activated serving cell for which the BWP is configured. The normal processing includes transmission of the UL-SCH, transmission of the RACH, monitoring of the PDCCH, transmission of the PUCCH, transmission of the SRS, and reception of the DL-SCH. The MAC entity of the terminal apparatus 1 does not transmit the UL-SCH, does not transmit the RACH, does not monitor the PDCCH, does not transmit the PUCCH, does not transmit the SRS, and does not receive the DL-SCH in an inactive BWP for each activated serving cell for which the BWP is configured. In a case that a certain serving cell is inactivated, the active BWP may not be present (the active BWP may be deactivated, for example).

RRC Operation

A BWP information element (IE) included in an RRC message (broadcasted system information and information transmitted by a dedicated RRC message) is used to configure a BWP. The RRC message transmitted from the base station apparatus 3 is received by the terminal apparatus 1. For each serving cell, a network (such as the base station apparatus 3) configures, for the terminal apparatus 1, at least an initial BWP including at least a downlink BWP and one (in a case that the serving cell is configured in the uplink or the like) or two (in a case that a supplementary uplink is used or the like) uplink BWPs. Further, the network may configure, for a certain serving cell, an additional uplink BWP or downlink BWP. The BWP configuration is categorized into uplink parameters and downlink parameters. Also, the BWP configuration is categorized into common parameters and dedicated parameters. The common parameters (such as a BWP uplink common IE and a BWP downlink common IE) are unique to each cell. The common parameters of an initial BWP of a primary cell are provided by system information as well. The network provides the common parameters to all the other serving cells with dedicated signals. The BWP is identified by a BWP ID. The initial BWP has a BWP ID of 0. The BWP IDs of the other BWP are values from 1 to 4.

The initial DL BWP may be defined by a PRB location for a control resource set (CORESET) for a type 0 PDCCH common search space, the number of continuous PRBs, a subcarrier spacing, and a cyclic prefix. In other words, the initial DL BWP may be configured by pdcch-ConfigSIB1 included in MIB or PDCCH-ConfigCommon included in ServingCellConfigCommon. The information element ServingCellConfigCommon is used to configure cell-specific parameters of a serving cell for the terminal apparatus 1. In this case, the size of the initial DL BWP is $N^{size}_{BWP,0}$. $N^{size}_{BWP,0}$ is a number of resource blocks indicating a bandwidth of the initial DL BWP. Here, the initial DL BWP is an initial DL BWP with the size $N^{size}_{BWP,0}$.

Also, the initial DL BWP may be provided to the terminal apparatus 1 by systemInformationBlockType1 (SIB1) or ServingCellConfigCommon (for example, ServingCellConfigCommonSIB). The information element ServingCellConfigCommonSIB is used to configure cell-specific parameters of the serving cell for the terminal apparatus 1 in the SIB1. In this case, the size of the initial DL BWP is $N^{size}_{BWP,1}$. $N^{size}_{BWP,1}$ may be equal to $N^{size}_{BWP,0}$. $N^{size}_{BWP,1}$ may be different from $N^{size}_{BWP,0}$. Here, the initial DL BWP is an initial DL BWP with the size of $N^{size}_{BWP,1}$.

The initial UL BWP may be provided to the terminal apparatus 1 by systemInformationBlockType1 (SIB1) or initialUplinkBWP. The information element initialUplinkBWP is used to configure the initial UL BWP.

In the present embodiment, the initial DL BWP may be the initial DL BWP with $N^{size}_{BWP,0}$ or may be the initial DL BWP with $N^{size}_{BWP,1}$.

One primary cell and up to fifteen secondary cells may be configured for the terminal apparatus 1.

Figure 14:
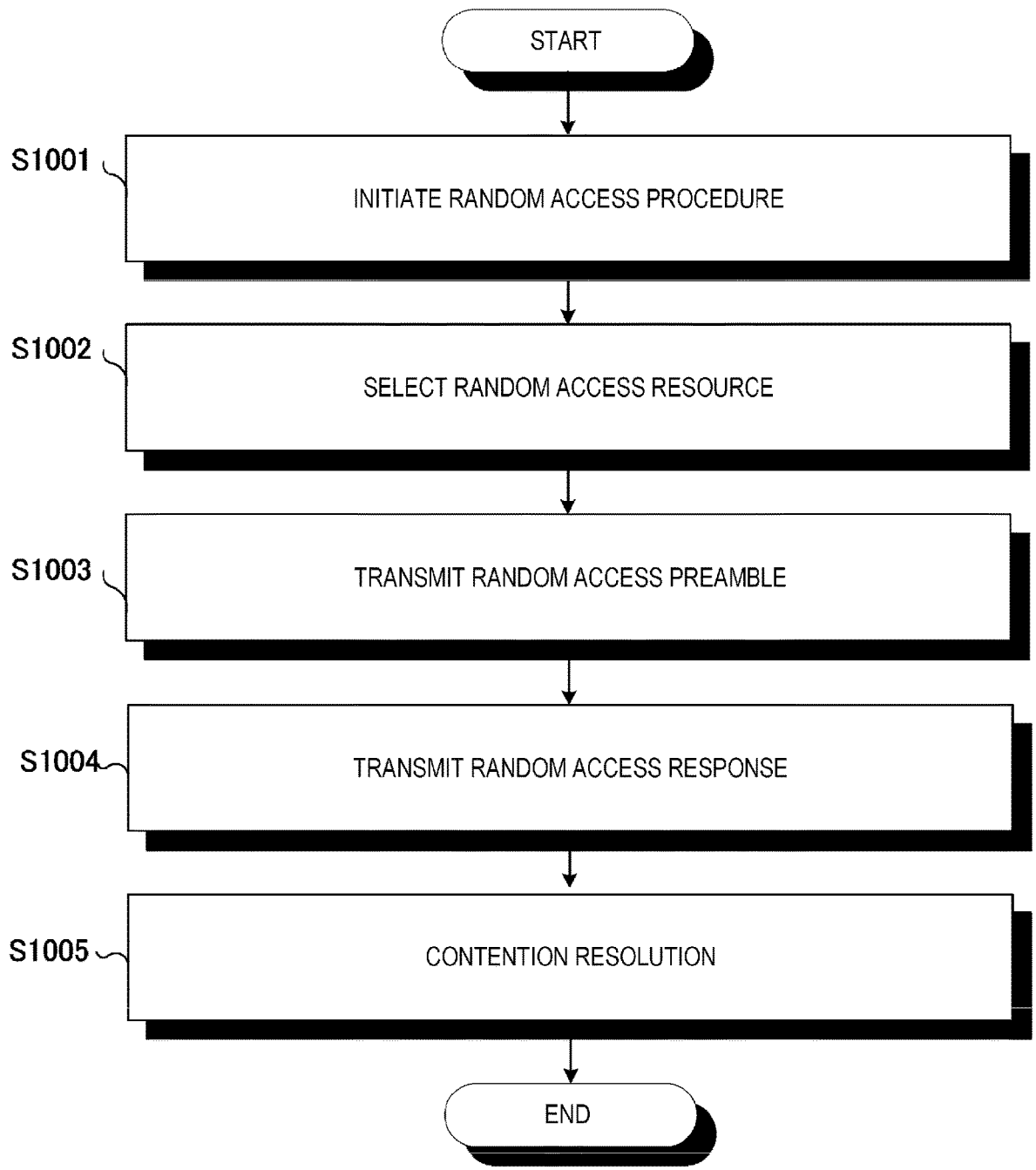
FIG. 14 is a flow diagram illustrating an example of a random access procedure of a MAC entity according to the embodiment of the present invention.

FIG. 14 is a flow diagram illustrating an example of a random access procedure of the MAC entity according to the present embodiment.

Random access procedure initialization (S1001)

In FIG. 14, S1001 is a procedure regarding random access procedure initialization. In S1001, the random access procedure is initiated by a PDCCH order, a notification of a beam failure from the MAC entity itself or a lower layer, the RRC or the like. The random access procedure in the SCell is initiated only by the PDCCH order including ra-PreambleIndex that is not set in 0b000000.

In S1001, the terminal apparatus 1 receives random access configuration information via a higher layer before the random access procedure is initiated. The random access configuration information may include the following information or one or a plurality of elements of information for determining/configuration the following information.

prach-ConfigIndex: a set of one or a plurality of time/frequency resources that are available for transmitting a random access preamble (also referred to as a random access channel occasion, a PRACH occasion, or a RACH occasion)

preambleReceivedTargetPower: initial power of the preamble (this may be a target reception power)

rsrp-ThresholdSSB: a threshold value of a reference signal reception power (RSRP) for selecting an SS/PBCH block (this may be an associated random access preamble and/or a PRACH occasion)

rsrp-ThresholdCSI-RS: a threshold value of a reference signal reception power (RSRP) for selecting CSI-RS (this may be an associated random access preamble and/or a PRACH occasion)

rsrp-ThresholdSSB-SUL: a threshold value of a reference signal reception power (RSRP) for selection between a Normal Uplink (NUL) carrier and a Supplementary Uplink (SUL) carrier powerControlOffset: a power offset between rsrp-ThresholdSSB and rsrp-ThresholdCSI-RS in a case that the random access procedure is initiated for beam failure recovery powerRampingStep: power ramping step (power ramping factor) This indicates a step of a transmission power ramped up based on a preamble transmission counter PREAMBLE_TRANSMISSION_COUNTER.

ra-PreambleIndex: one or a plurality of random access preamble that are available or one or a plurality of random access preambles that are available in the plurality of random access preamble groups ra-ssb-OccasionMaskIndex: information for determining the PRACH occasion allocated to the SS/PBCH block with which the MAC entity transmits the random access preamble ra-OccasionList: information for determining the PRACH occasion allocated to the CSI-RS with which the MAC entity may transmit the random access preamble preamTransMax: the maximum number of times the preamble is transmitted ssb-perRACH-OccasionAndCB-PreamblesPerSSB (SpCell only): parameters indicating the number of SS/PBCH blocks mapped in each PRACH occasion and the number of random access preambles mapped in each SS/PBCH block ra-ResponseWindow: a time window for monitoring a random access response (SpCell only)

ra-ContentionResolutionTimer: collision resolution (contention resolution) timer numberOfRA-PreamblesGroupA: the number of random access preambles in a random access preamble group A for each SS/PBCH block PREAMBLE_TRANSMISSION_COUNTER: a preamble transmission counter DELTA_PREAMBLE: a power offset value based on a random access preamble format PREAMBLE_POWER_RAMPING_COUNTER: a preamble power ramping counter PREAMBLE_RECEIVED_TARGET_POWER: an initial random access preamble power; This indicates an initial transmission power for random access preamble transmission PREAMBLE_BACKOFF: this is used to adjust a timing of the random access preamble transmission In a case that the random access procedure is initiated for a certain serving cell, the MAC entity clears an Msg3 buffer, sets a state variable PREAMBLE_TRANSMISSION_COUNTER to 1, sets a state variable PREAMBLE_POWER_RAMPING_COUNTER to 1, and sets a state variable PREAMBLE_BACKOFF to 0ms. In a case that a carrier to be used for the random access procedure is explicitly notified, the MAC entity selects the carrier designated by the notification to perform the random access procedure and sets a state variable PCMAX to a maximum transmission power value of the carrier designated by the notification. In a case that the carrier to be used for the random access procedure is not explicitly notified, an SUL carrier is configured for the serving cell, and a downlink pathloss reference RSRP is smaller than rsrp-ThresholdSSB-SUL, the MAC entity selects the SUL carrier to perform the random access procedure and sets the state variable PCMAX to the maximum transmission power value of the SUL carrier. Otherwise, the MAC entity selects a NUL carrier to perform the random access procedure and sets the state variable PCMAX to the maximum transmission power value of the NUL carrier.

Random Access Procedure Initialization (S1002)

S1002 is a random access resource selection (random access resource selection). Hereinafter, a random access resource (including time/frequency resources and/or a preamble index) selection procedure in the MAC layer of the terminal apparatus 1 will be described.

The terminal apparatus 1 sets a value for a preamble index (which may be referred to as PREAMBLE_INDEX) of a random access preamble to be transmitted in the following procedure.

In a case that (1) the random access procedure is initiated in response to a notification of a beam failure from the lower layer, (2) a random access resource (which may be a PRACH occasion) for a non-contention-based random access for a beam failure recovery request associated with SS/PBCH blocks (which will also be referred to as SSBs) or the CSI-RS has been provided with an RRC parameter, and (3) the RSRP of one or more SS/PBCH blocks or the CSI-RS exceeds a predetermined threshold value, the terminal apparatus 1 (MAC entity) selects the SS/PBCH blocks or the CSI-RS with RSRP exceeding the predetermined threshold value. In a case that there is no ra-PreambleIndex, for which the CSI-RS has been selected, and which is associated with the selected CSI-RS, the MAC entity may set ra-PreambleIndex associated with the selected SS/PBCH blocks to the preamble index (PREAMBLE_INDEX). Otherwise, the MAC entity sets ra-PreambleIndex associated with the selected SS/PBCH blocks or the CSI-RS to the preamble index.

In a case that (1) ra-PreambleIndex is provided with the PDCCH or the RRC, (2) the value of ra-PreambleIndex is not a value indicating a contention-based random access procedure (0b000000, for example), and (3) the SS/PBCH blocks or the CSI-RS and the random access resource for the non-contention-based random access are not associated with the RRC, the terminal apparatus 1 sets signaled ra-PreambleIndex to the preamble index. 0bxxxxxx means a bit sequence allocated in a 6-bit information field.

In a case that (1) a random access resource for the non-contention-based random access associated with the SS/PBCH blocks have been provided from the RRC, and (2) one or more SS/PBCH blocks with RSRP exceeding the predetermined threshold value are available from among the associated SS/PBCH blocks, the terminal apparatus 1 selects one of the SS/PBCH blocks with RSRP exceeding the predetermined threshold value and sets ra-PreambleIndex associated with the selected SS/PBCH block to the preamble index.

In a case that (1) the CSI-RS and the random access resource for the non-contention-based random access have been associated with the RRC, and (2) one or more CSI-RSs with RSRP exceeding the predetermined threshold value is available from among the associated CSI-RSs, the terminal apparatus 1 selects one of the CSI-RSs with RSRP exceeding the predetermined threshold value and sets ra-PreambleIndex associated with the selected CSI-RS to the preamble index.

The terminal apparatus 1 performs a contention-based random access procedure in a case that any of the aforementioned conditions is met. In the contention-based random access procedure, the terminal apparatus 1 selects SS/PBCH blocks that have SS/PBCH block RSRP exceeding a configured threshold value and performs selection of a preamble group. In a case that a relationship between the SS/PBCH blocks and random access preambles has been configured, the terminal apparatus 1 randomly selects ra-PreambleIndex from one or a plurality of random access preambles associated with the selected SS/PBCH blocks and the selected preamble group and sets selected ra-PreambleIndex to the preamble index.

In a case that the MAC entity selects one SS/PBCH block and association between PRACH occasions and the SS/PBCH block has been configured, the MAC entity may determine a next available PRACH occasion from among the PRACH occasions associated with the selected SS/PBCH block. However, in a case that the terminal apparatus 1 selects one CSI-RS and association between PRACH occasions and the CSI-RS has been configured, the terminal apparatus 1 may determine a next available PRACH occasion from among the PRACH occasions associated with the selected CSI-RS.

The available PRACH occasion may be specified based on mask index information, SSB index information, resource configuration configured with the RRC parameter, and/or a selected reference signal (SS/PBCH block or CSI-RS). The resource configuration configured with the RRC parameter includes resource configuration for each SS/PBCH block and/or resource configuration for each CSI-RS.

The base station apparatus 3 may transmit, to the terminal apparatus 1, the resource configuration for each SS/PBCH block and/or the resource configuration for each CSI-RS in an RRC message. The terminal apparatus 1 receives, from the base station apparatus 3, the resource configuration for each SS/PBCH block and/or the resource configuration for each CSI-RS in the RRC message. The base station apparatus 3 may transmit, to the terminal apparatus 1, mask index information and/or SSB index information. The terminal apparatus 1 acquires, from the base station apparatus 3, the mask index information and/or the SSB index information. The terminal apparatus 1 may select a reference signal (SS/PBCH block or CSI-RS) based on certain conditions. The terminal apparatus 1 may specify the next available PRACH occasion based on the mask index information, the SSB index information, the resource configuration configured with the RRC parameter, and the selected reference signal (SS/PBCH block or CSI-RS). The MAC entity of the terminal apparatus 1 may indicate, to a physical layer, to transmit the random access preamble using the selected PRACH occasion.

The mask index information is information indicating the index of the PRACH occasion that is available for transmitting the random access preamble. The mask index information may be information indicating some PRACH occasions in a group of one or a plurality of PRACH occasions defined by prach-ConfigurationIndex. The mask index information may be information indicating some PRACH occasions in a group of PRACH occasions to which specific SSB indexes specified by the SSB index information have been mapped.

The SSB index information is information indicating an SSB index corresponding to any one of one or a plurality of SS/PBCH blocks transmitted by the base station apparatus 3. The terminal apparatus 1 that has received a message 0 specifies the group of PRACH occasions to which the SSB indexes indicated by the SSB index information have been mapped. The SSB index mapped to each PRACH occasion is determined by a PRACH configuration index, higher layer parameter SB-perRACH-Occasion, and a higher layer parameter cb-preamblePerSSB.

Random Access Preamble Transmission (S1003)

S1003 is a procedure regarding random access preamble transmission. In a case that (1) the state variable PREAMBLE_TRANSMISSION_COUNTER is greater than 1, (2) a notification of a stopped power ramp counter has not been received from the higher layer, and (3) the selected SS/PBCH block has not been changed, the MAC entity increments the state variable PREAMBLE_POWER_RAMPING_COUNTER by one for each random access preamble.

Next, the MAC entity selects a value of DELTA_PREAMBLE and sets the state variable PREAMBLE_RECEIVED_TARGET_POWER to a predetermined value. The predetermined value is calculated by preambleReceivedTargetPower+DELTA_PREAMBLE+(PREAMBLE_POWER_RAMPING_COUNTER−1)*powerRampingStep.

Next, in a case other than the non-contention-based random access preamble, the MAC entity calculates RA-RNTI associated with the PRACH occasion in which the random access preamble is transmitted for a beam failure recovery request. This Ra-RNTI is calculated by RA-RNTI=1+s_id+14×t_id+14×80×f_id+14×80×8×ul_carrier_id. Here, s_id is an index of the first OFDM symbol in the transmitted PRACH and is a value of 0 to 13. t_id is an index of the first slot of the PRACH in the system frame and is a value of 0 to 79. f_id is an index of the PRACH in the frequency domain and is a value of 0 to 7. ul_carrier_id is an uplink carrier used for Msg1 transmission. ul_carrier_id for the NUL carrier is 0 while ul_carrier_id for the SUL carrier is 1.

The MAC entity indicates, to the physical layer, to transmit the random access preamble using the selected PRACH.

Random Access Response Reception (S1004)

S1004 is a procedure regarding random access response reception. Once the random access preamble is transmitted, the MAC entity performs the following operations regardless of possible occurrence of a measurement gap. Here, the random access response may be a MAC PDU for a random access response.

The MAC PDU (MAC PDU of the random access response) includes one or a plurality of MAC subPDUs and possible padding. Each MAC subPDU includes any of the following elements.

MAC subheader including only Backoff Indicator
MAC subheader indicating only RAPID
MAC subheader and MAC payload for Random Access Response (MAC RAR) indicating RAPID MAC subPDU including only Backoff Indicator is allocated at the head of MAC PDU. Padding is allocated at the end of MAC PDU. MAC subPDU including only RAPID and MAC subPDU including RAPID and MAC RAR can be allocated anywhere between MAC subPDU including only Backoff Indicator and the padding.

MAC RAR has a fixed size and includes reserved bits set to 0, transmission timing adjustment information (Timing Advance (TA) command), a UL grant (RAR UL grant) and TEMPORARY_C-RNTI. Hereinafter, the RAR message may be MAC RAR. The RAR message may be a random access response.

In S1004, in a case that the MAC entity transmits a non-contention-based random access preamble for a beam failure recovery request, then the MAC entity starts a random access response window (ra-ResponseWindow) in the first PDCCH occasion after the end of the random access preamble transmission. Then, the MAC entity monitors the PDCCH of the SpCell identified by the C-RNTI for a response to the beam failure recovery request in a case that the random access response window is running. Here, a period (window size) of the random access response window is provided by ra-ResponseWindow included in a higher layer parameter BeamFailureRecoveryConfig. Otherwise, the MAC entity starts the random access response window (ra-ResponseWindow) in the first PDCCH occasion after the end of the random access preamble transmission. Here, the period (window size) of the random access response window is provided by ra-ResponseWindow included in the higher layer parameter RACH-ConfigCommon. Also, the MAC entity monitors the PDCCH of the SpCell identified by RA-RNTI for a random access response in a case that the random access response window is running. Here, the information element BeamFailureRecoveryConfig is used to configure a RACH resource and a candidate beam for a beam failure recovery for the terminal apparatus 1 in a case that a beam failure has been detected. The information element RACH-ConfigCommon is used to designate a cell-specific random access parameter.

In a case that (1) a reception notification of the PDCCH transmission has been received from the lower layer, (2) the PDCCH transmission has been scrambled with C-RNTI, and (3) the MAC entity has transmitted a non-contention-based random access preamble for a beam failure recovery request, the MAC entity may regard the random access procedure as having successfully been completed.

Next, in a case that (1) downlink assignment has been received by the PDCCH of RA-RNTI, and (2) the received transport block has successfully been decoded, the MAC entity performs the following operations.

In a case that the random access response includes MAC subPDU including Backoff Indicator, the MAC entity configures PREAMBLE_BACKOFF to a value of a BI field included in MAC subPDU. Otherwise, the MAC entity sets PREAMBLE_BACKOFF to 0ms.

In a case that the random access response includes MAC subPDU including a random access preamble identifier corresponding to transmitted PREAMBLE_INDEX, the MAC entity may regard the random access response as having successfully been received.

In a case that (1) the random access response is considered to be successfully received, and (2) the random access response includes MAC subPDU including only RAPID, the MAC entity considers the random access procedure to be successfully completed and indicates, to the higher layer, reception of a positive response (acknowledgement) to a system information (SI) request. Here, in a case that the condition (2) is not met, the MAC entity applies the following operation A to the serving cell in which the random access preamble is to be transmitted.

Start of Operation A

The MAC entity processes the received transmission timing adjustment information (Timing Advance Command) and indicates, for the lower layer, the amounts of preambleReceivedTargetPower and power ramping applied to the latest random access preamble transmission. Here, the transmission timing adjustment information is used to adjust a transmission timing deviation between the terminal apparatus 1 and the base station apparatus 3 from the received random access preamble.

In a case that the serving cell for the random access procedure is the SCell only for the SRS, the MAC entity may ignore the received UL grant. Otherwise, the MAC entity processes the value of the received UL grant and indicates the processed value for the lower layer.

In a case that the random access preamble is not selected from the range of contention-based random access preambles by the MAC entity, the MAC entity may regard the random access procedure as having successfully been completed.

End of Operation A

In a case that the random access preamble is selected from the range of the contention-based random access preambles by the MAC entity, the MAC entity sets TEMPORARY_C-RNTI to a value of Temporary C-RNTI field included in the received random access response. Subsequently, in a case that the random access response has successfully been received for the first time in the random access procedure, and in a case that no transmission has been performed for common control channel (CCCH) logical channel, the MAC entity notifies a inclusion of C-RNTI MAC CE in the next uplink transmission to a predetermined entity (Multiplexing and assembly entity), acquires MAC PDU for transmission from the predetermined entity (Multiplexing and assembly entity), and stores the acquired MAC PDU in the Msg3 buffer. In a case that transmission is performed for the CCCH logical channel, the MAC entity acquires the MAC PDU for transmission from the predetermined entity (Multiplexing and assembly entity) and stores the acquired MAC PDU in the Msg3 buffer.

In a case that at least one of the following conditions (3) and (4) is met, the MAC entity regards the random access response as not having successfully been received and increments the preamble transmission counter (PREAMBLE_TRANSMISSION_COUNTER) by one. In a case that the value of the preamble transmission counter reaches a predetermined value (the maximum number of times the preamble is transmitted+1), and the random access preamble is transmitted by SpCell, the MAC entity indicates a random access problem to the higher layer. Then, in a case that the random access procedure is initiated for an SI request, the MAC entity regards the random access procedure as not having successfully been completed.

In a case that the value of the preamble transmission counter reaches the predetermined value (the maximum number of times the preamble is transmitted+1) and the random access preamble is transmitted by the SCell, the MAC entity regards the random access procedure as not having successfully been completed.

The condition (3) is that the period of the random access response window configured by RACH-ConfigCommon has been expired and a random access response including a random access preamble identifier that coincides with the transmitted preamble index has not been received. The condition (4) is that the period of the random access response window configured by BeamFailureRecoveryConfig has been expired and the PDCCH scrambled with C-RNTI has not been received.

In a case that the random access procedure has not been completed, and in a case that the random access preamble has been selected from the range of the contention-based random access preambles by the MAC itself in the random access procedure, the MAC entity selects a random backoff time between 0 and PREAMBLE_BACKOFF, delays the next random access preamble transmission with the selected backoff time, and then executes S1002. In the case in which the random access procedure has not been completed, and in a case that the random access preamble has not been selected from the range of the contention-based random access preambles by the MAC itself in the random access procedure, the MAC entity executes S1002.

In a case that the random access response including the random access preamble identifier that coincides with the transmitted preamble index has successfully been received, the MAC entity may stop the random access response window.

The terminal apparatus 1 transmits the message 3 in the PUSCH based on the UL grant.

Collision Resolution (S1005)

S1005 is a procedure for collision resolution (contention resolution).

Once Msg3 is transmitted, the MAC entity starts the collision resolution timer and restarts the collision resolution timer in a case that each HARQ is retransmitted. The MAC entity monitors the PDCCH in a case that the collision resolution timer is running, regardless of possible occurrence of a measurement gap.

In a case that a reception notification of PDCCH is received from the lower layer and C-RNTI MAC CE is included in Msg3, and in a case that at least one of the following conditions (5) to (7) is satisfied, the MAC entity regards the contention resolution as being successfully performed, stops the collision resolution timer, discards TEMPORARY_C-RNTI, and regards the random access procedure as having successfully been completed.

The condition (5) is that the random access procedure is initiated by a MAC sublayer or an RRC sublayer, PDCCH transmission is scrambled with C-RNTI, and the PDCCH transmission includes an uplink grant for initial transmission. The condition (6) is that the random access procedure is initiated by a PDCCH order, and the PDCCH transmission is scrambled with C-RNTI. The condition (7) is that the random access procedure is initiated for beam failure recovery, and the PDCCH transmission is scrambled with C-RNTI.

In a case that CCCH SDU (UE contention resolution identity) is included in Msg3, and the PDCCH transmission is scrambled with TEMPORARY_C-RNTI, and in a case that the MAC PDU is successfully be decoded, then the MAC entity stops the collision resolution timer. Subsequently, in a case that the successfully decoded MAC PDU includes UE collision resolution identity (UE contention resolution identity) MAC CE, and the UE collision resolution identity in the MAC CE is matched with the CCCH SDU transmitted in Msg3, the MAC entity regards the collision resolution as being successfully performed and ends disassembly and demultiplexing of the MAC PDU. Then, in a case that the random access procedure is initiated by an SI request, the MAC entity indicates reception of a positive response to the SI request for the higher layer. In a case that the random access procedure is not initiated by the SI request, the MAC entity sets the C-RNTI to the value of TEMPORARY_C-RNTI. Subsequently, the MAC entity discards TEMPORARY_C-RNTI and regards the random access procedure as being successfully completed.

In a case that the UE collision resolution identity in the MAC CE is not matched with the CCCH SDU transmitted in Msg3, the MAC entity discards TEMPORARY_C-RNTI, regards the collision resolution as not being successfully performed, and discards the MAC PDU that has successfully been decoded.

In a case that the collision resolution timer is expired, the MAC entity discards TEMPORARY_C-RNTI and regards the contention resolution as not being successfully performed. In a case that the contention resolution is regarded as not being successfully performed, the MAC entity flush a HARQ buffer used to transmit the MAC PDU in the Msg3 buffer, and increments a preamble transmission counter (PREAMBLE_TRANSMISSION_COUNTER) by one. In a case that the value of the preamble transmission counter reaches a predetermined value (the maximum number of times the preamble is transmitted+1), then the MAC entity indicates a random access problem for the higher layer. Then, in a case that the random access procedure is initiated for an SI request, the MAC entity regards the random access procedure as not having successfully been completed.

In a case that the random access procedure has not been completed, the MAC entity selects a random backoff time between 0 and PREAMBLE_BACKOFF, delays the next random access preamble transmission with the selected backoff time, and executes S1002.

In a case that the random access procedure is completed, then the MAC entity discards the non-contention-based random access resource explicitly signaled for the non-contention-based random access procedure other than the non-contention-based random access procedure for a beam failure recovery request and flushes the HARQ buffer used to transmit the MAC PDU in the Msg3 buffer.

Hereinafter, the control resource set (CORESET) according to the present embodiment will be described.

The control resource set (CORESET) is time and frequency resources for searching for downlink control information. CORESET configuration information includes CORESET identifiers (ControlResourceSetId, CORESET-ID) and information specifying CORESET frequency resource. The information element ControlResourceSetId (CORESET identifier) is used to specify a control resource set in a certain serving cell. The CORESET identifier is used among BWPs in a certain serving cell. The CORESET identifier is unique among the BWPs in the serving cell. The number of CORESETS in each BWP is limited to three including an initial CORESET. The value of the CORESET identifier in a certain serving cell is a value of 0 to 11.

The control resource set specified by the identifier 0 (ControlResourceSetId 0) of the CORESET will be referred to as CORESET#0. CORESET#0 may be configured by pdcch-ConfigSIB1 included in MIB or PDCCH-Config-Common included in ServingCellConfigCommon. In other words, the configuration information of CORESET#0 may be pdcc-ConfigSIB1 included in MIB or PDCCH-Config-Common included in ServingCellConfigCommon. The configuration information of CORESET#0 may be configured by controlResourceSetZero included in PDCCH-ConfigSIB1 or PDCCH-ConfigCommon. In other words, an information element controlResourceSetZero is used to indicate CORESET#0 (common CORESET) of the initial DL BWP. The CORESET indicated by pdcch-ConfigSIB1 is CORESET#0. The information element pdcch-ConfigSIB1 in the MIB or the dedicated configuration is used to configure the initial DL BWP. Although information that explicitly specifies a CORESET identifier and a frequency resource (for example, the number of continuous resource blocks) and a time resource (the number of continuous symbols) of the CORESET is not included in the CORESET configuration information pdcch-ConfigSIB1 for CORESET#0, the frequency resource (for example, the number of continuous resource blocks) and the time resource (the number of continuous symbols) of the CORESET for CORESET#0 can be explicitly specified by the information included in pdcch-ConfigSIB1. The information element PDCCH-ConfigCommon is used to configure a cell-specific PDCCH parameter provided by the SIB. Also, PDCCH-ConfigCommon may be provided at the time of handover and PSCell and/or SCell addition. The configuration information of CORESET#0 is included in the configuration of the initial BWP. In other words, the configuration information of CORESET#0 may not be included in the configuration of BWPs other than the initial BWP. controlResourceSetZero corresponds to 4 bits (for example, MSB 4 bits; 4 bits of the highest bits) in pdcch-ConfigSIB1. CORESET#0 is a control resource set for the type 0 PDCCH common search space.

Configuration information of an additional common control resource set (CORESET) may be configured by commonControlResourceSet included in PDCCH-ConfigCommon. The configuration information of the additional common CORESET may be used to designate the additional common CORESET used for the random access procedure. The configuration information of the additional common CORESET may be included in configuration of each BWP. The identifier of the CORESET indicated by commonControlResourceSet is a value other than 0.

The common CORESET may be a CORESET (for example, the additional common CORESET) used for the random access procedure. Also, a CORESET configured by CORESET#0 and/or the configuration information of the additional common CORESET may be included in the common CORESET in the present embodiment. In other words, the common CORESET may include CORESET#0 and/or the additional common CORESET. CORESET#0 may be referred to as common CORESET#0. The configuration information of the common CORESET may be referred to (acquired) by the terminal apparatus 1 and for the BWPs other than the BWP for which the common CORESET has been configured.

Configuration information of one or a plurality of CORESETs may be configured by PDCCH-Config. The information element PDCCH-Config is used to configure UE-specific PDCCH parameters (for example, a CORESET, a search space, and the like) for a certain BWP. The PDCCH-Config may be included in the configuration of each BWP.

In other words, the configuration information of the common CORESET indicated by the MIB is pdcch-ConfigSIB1, the configuration information of the common CORESET indicated by PDCCH-ConfigCommon is controlResourceSetZero, and the configuration information of the common CORESET (additional common CORESET) indicated by PDCCH-ConfigCommon is commonControlResourceSet. In addition, the configuration information of one or a plurality of CORESETs (UE specifically configured Control Resource Sets, UE-specific CORESET) indicated by PDCCH-Config is controlResourceSetToAddModList.

The search space is defined to search for PDCCH candidates. searchSpaceType included in the configuration information of the search space indicates which of a Common Search Space (CSS) and a UE-specific Search Space (USS) the search space is. The UE-specific search space is derived at least from the value of C-RNTI set by the terminal apparatus 1. In other words, the UE-specific search space is individually derived from each terminal apparatus 1. The common search space is a search space common to a plurality of terminal apparatuses 1 and includes a Control Channel Element (CCE) of an index defined in advance. The CCE includes a plurality of resource elements. Information of the DCI format monitored in the search space is included in the configuration information of the search space.

An identifier of the CORESET specified by the configuration information of the CORESET is included in the configuration information of the search space. The CORESET specified by the identifier of the CORESET included in the configuration information of the search space is associated with the search space. In other words, the CORESET associated with the search space is the CORESET specified by the identifier of the CORESET included in the search space. The DCI format indicate by the configuration information of the search space is monitored by the associated CORESET. Each search space is associated with a single CORESET. For example, the configuration information of the search space for the random access procedure may be configured by ra-SearchSpace. In other words, the DCI format to which the CRC scrambled with RA-RNTI or TC-RNTI is added is monitored by the CORESET associated with ra-SearchSpace.

As described above, the configuration information of CORESET#0 is included in the configuration of the initial DL BWP. The configuration information of CORESET#0 may not be included in the configuration of the BWPs (additional BWPs) other than the initial DLBWP. In a case that the BWPs (additional BWPs) other than the initial DL BWP refers to (or acquires) the configuration information of CORESET#0, it may be necessary to satisfy at least that CORESET#0 and the SS block be included in the additional BWPs in the frequency domain and that the same subcarrier spacing is used. In other words, it may be necessary to satisfy at least that the bandwidth of the initial DL BWP and the SS block are included in the additional BWPs in the frequency domain and that the same subcarrier spacing is used in a case that the BWPs (additional BWPs) other than the initial BWP refers to (or acquires) the configuration information of CORESET#0. At this time, the search space (for example, ra-SearchSpace) configured for the additional BWPs can refer to (or acquire) the configuration information of CORESET#0 by indicating the identifier 0 of CORESET#0. Also, in a case that any of the conditions that the bandwidth of the initial DL BWP is included in an additional DL BWP in the frequency domain, that the SS block is included in the additional DL BWP, and that the same subcarrier spacing is used is not satisfied, the terminal apparatus 1 may not expect that the additional DL BWP refers to the configuration information of CORESET#0. In other words, the base station apparatus 3 may not configure that the additional DL BWP refers to the configuration information of CORESET#0 for the terminal apparatus 1 in this case. Here, the initial DL BWP may be an initial DL BWP with the size $N^{size}_{BWP,0}$.

In a case that a certain (additional) DL BWP refers to (or acquires) the configuration information of the CORESET of another BWP, it may be necessary to satisfy at least that in the frequency domain the CORESET (or the bandwidth of the BWP) and/or the SS block included in (associated with) the BWP is included in the additional BWP and the same subcarrier spacing is used. In other words, in a case that any of the conditions that the CORESET (or the bandwidth of the BWP) is included in the additional DL BWP in the frequency domain, that the SS block included in (associated with) the BWP is included in the additional DL BWP, and that the same subcarrier spacing is used is not satisfied, the terminal apparatus 1 may not expect that the additional DL BWP refers to the configuration information of the CORESET configured for the BWP.

The terminal apparatus 1 monitors a set of PDCCH candidates in one or a plurality of CORESETs allocated in each active serving cell configured to monitor the PDCCH. The set of PDCCH candidates corresponds to one or a plurality of search space sets. The monitoring means that each PDCCH candidate is decoded in accordance with one or a plurality of DCI formats to be monitored. The set of PDCCH candidates monitored by the terminal apparatus 1 is defined by PDCCH search space sets. One search space set is a common search space set or a UE-specific search space set. In the above description, the search space set has been referred to as the search space, the common search space set has been referred to as the common search space, and the UE-specific search space set has been referred to as the UE-specific search space. The terminal apparatus 1 monitors the PDCCH candidates with the following one or a plurality of search space sets.

Type0-PDCCH common search space set: this search space set is configured by searchSpaceZero indicated by the MIB or searchSpaceSIB1 indicated by PDCCH-ConfigCommon that is a parameter of the higher layer. The search space is for the monitoring of the DCI format of the CRC scrambled with the SI-RNRI in the primary cell.

Type0A-PDCCH common search space set: the search space set is configured by searchSpace-OSI indicated by PDCCH-ConfigCommon that is a parameter of the higher layer. The search space is for the monitoring of the DCI format of the CRC scrambled with the SI-RNRI in the primary cell.

Type1-PDCCH common search space set: this search space set is configured by a search space (ra-SearchSpace) for the random access procedure indicated by the PDCCH-ConfigCommon that is a parameter of the higher layer. The search space is for the monitoring of the DCI format of the CRC scrambled with the RA-RNRI or TC-RNTI in the primary cell. The Type1-PDCCH common search space set is a search space set for the random access procedure.

Type2-PDCCH common search space set: this search space set is configured by a search space (paging-SearchSpace) for paging procedure indicated by PDCCH-ConfigCommon that is a parameter of the higher layer. This search space is for the monitoring of the DCI format of the CRC scrambled with the P-RNTI in the primary cell.

Type3-PDCCH common search space set: this search space set is configured by a SearchSpace of a common search space type indicated by PDCCH-Config that is a parameter of the higher layer. The search space is for the monitoring of the DCI format of the CRC scrambled with the INT-RNTI, the SFI-RNTI, the TPC-PUSCH-RNTI, the TPC-PUCCH-RNTI, or the TPC-SRS-RNTI. For the primary cell, the search space is for the monitoring of the DCI format of the CRC scrambled with the C-RNTI or the CS-RNTI(s).

UE-specific search space set: this search space set is configured by SearchSpace of a UE-specific search space type indicated by PDCCH-Config that is a parameter of the higher layer. The search space is for the monitoring of the DCI format of the CRC scrambled with the C-RNTI or the CS-RNTI(s).

In a case that one or a plurality of search space sets are provided to the terminal apparatus 1 by the corresponding higher layer parameter (searchSpaceZero, searchSpaceSIB1, searchSpaceOtherSystemInformation, paging-SearchSpace, ra-SearchSpace, or the like), and the C-RNTI or the CS-RNTI is provided by the terminal apparatus 1, the terminal apparatus 1 may monitor the PDCCH candidates for the DCI format 0_0 and the DCI format 1_0 having the C-RNTI or the CS-RNTI with the one or the plurality of search space sets.

The configuration information of BWPs is categorized into configuration information of the DL BWP and configuration information of the UL BWP. The configuration information of BWPs includes information elements bwp-Id (BWP identifiers). The BWP identifier included in the configuration information of the DL BWP is used to specify (refer to) the DL BWP in a certain serving cell. The BWP identifier included in the configuration information of the UL BWP is used to specify (refer to) the UL BWP in a certain serving cell. The BWP identifier is applied to each of the DL BWP and the UL BWP. For example, the BWP identifier corresponding to the DL BWP may be referred to as a DL BWP index. The BWP identifier corresponding to the UL BWP may be referred to as a UL BWP index. The initial DL BWP is referred to by the identifier 0 of the DL BWP. The initial UL BWP is referred to by the identifier 0 of the UL BWP. Each of other DL BWPs and other UL BWPs may be referred to by the BWP identifiers 1 to maxNrofBWPs. In other words, the BWP identifier set to 0 (bwp-Id=0) is associated with the initial BWP and cannot be used for other BWPs. maxNrofBWPs is the maximum number of the BWPs per serving cell and is 4. In other words, the values of the other BWP identifiers are values of 1 to 4. The configuration information of other higher layers is associated with specific BWPs using BWP identifiers. The fact that the DL BWP and the UL BWP have the same BWP identifier means that the DL BWP and the UL BWP have been paired.

Figure 7:
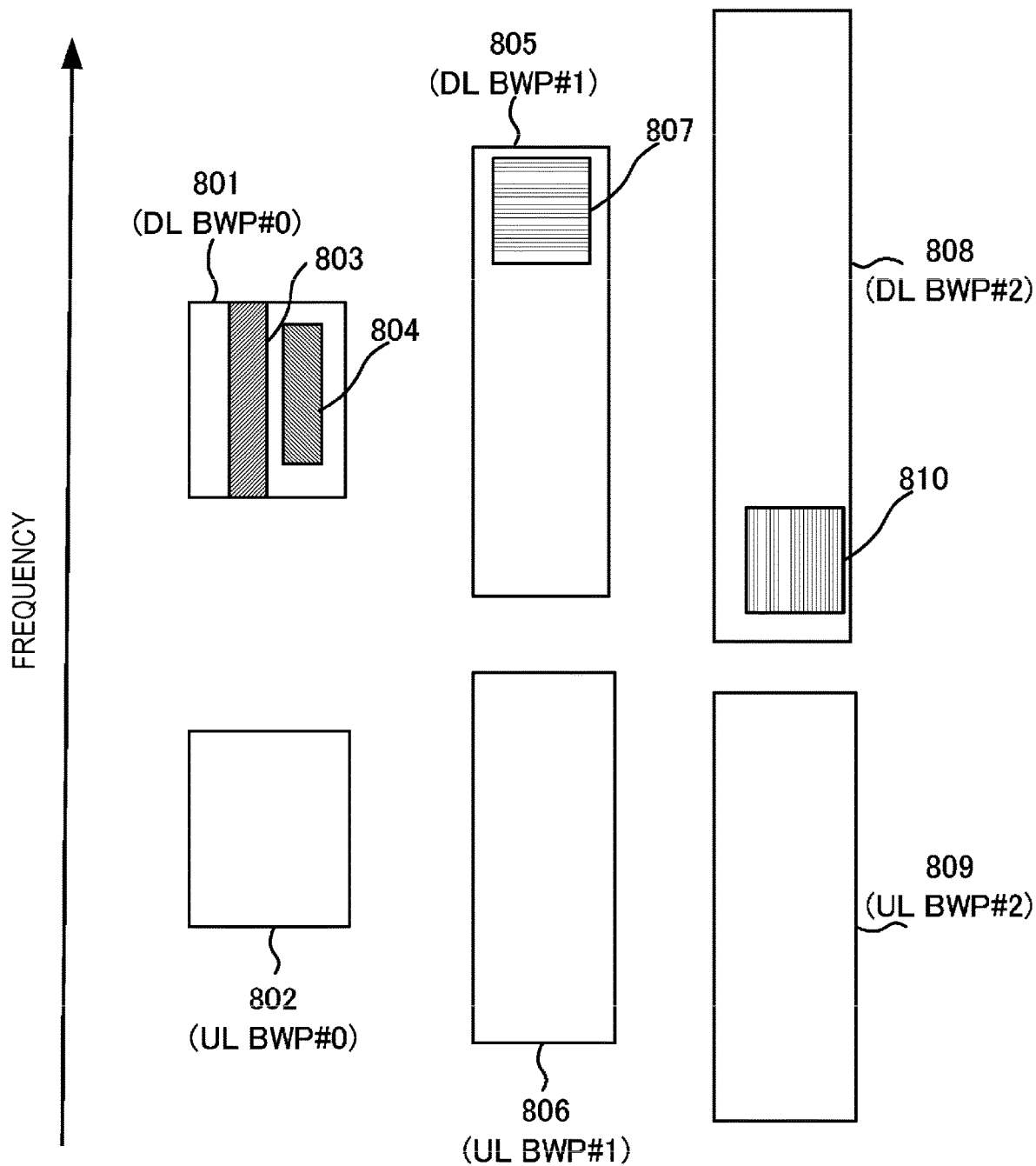
FIG. 7 is a diagram illustrating an example of BWP configuration according to the embodiment of the present invention.

FIG. 7 is a diagram illustrating an example of BWP configuration according to the embodiment of the present invention.

For each serving cell, one initial BWP including at least one DL BWP and one UL BWP is configured. Also, an additional BWP (an additional UL BWP and/or an additional DL BWP) may be configured for each serving cell. A maximum of four additional BWPs may be configured. However, the number of DL BWPs that becomes active is one, and the number of UL BWPs that becomes active is one, in one serving cell.

In FIG. 7, one initial BWP (BWP#0) and two additional BWPs (BWP#1 and BWP#2) are configured for the terminal apparatus 1 in a certain serving cell. 801 is an initial DL BWP (DL BWP#0). 802 is an initial UL BWP (UL BWP#0). 805 is an additional DL BWP (DL BWP#1). 806 is an additional UL BWP (UL BWP#1). 808 is an additional DL BWP (DL BWP#2). 809 is an additional UL BWP (UL BWP#2). Hereinafter, it is assumed that DL BWP#1 has been activated and UL BWP#0 has been activated. In other words, DL BWP#0 and UL BWP#1 are inactive BWPs. DL BWP#2 and UL BWP#2 are inactive BWPs. In this case, activated DL BWP#1 may be referred to as an active DL BWP (active DL BWP, currently active DL BWP). Activated initial UL BWP#0 may be referred to as an initial active UL BWP. The terminal apparatus 1 executes downlink reception using active DL BWP#1 and executes uplink transmission using initial active UL BWP.

803 is CORESET#0 configured for the initial DL BWP. 804 is the additional common CORESET configured for the initial DL BWP. 807 is the CORESET configured for the additional BWP#1. 810 is the CORESET configured for the additional BWP#2. 807 and 810 may be referred to as UE-specific CORESETs (UE specifically configured Control Resource Sets). As described above, the configuration information of CORESET#0 (803) may be configured by pdcch-ConfigSIB1 or PDCCH-ConfigCommon. The configuration information of the additional common CORESET (804) may be configured by commonControlResourceSet included in PDCCH-ConfigCommon. The configuration information of CORESETs (807 and 810) may be configured by controlResourceSetToAddModList included in PDCCH-Config. The value of the CORESET identifier of 803 is provided by 0. The value of the CORESET identifier of 804 may be provided by 1. The value of the CORESET identifier of 807 may be provided by 3. The value of the CORESET identifier of 810 may be provided by 6. The value of the CORESET identifier included in ra-searchspace is set to 1 for DL BWP#0, and the value of the CORESET identifier included in ra-searchspace is set to 6 for DL BWP#2.

In FIG. 7, ra-searchspace is configured for each of DL BWP#0, DL BWP#1, and DL BWP#2. As described above, the configuration information of the search space for the random access procedure may be configured by ra-SearchSpace. In a first example, a CORESET identifier included in ra-searchspace configured for a certain DL BWP may be set to a value of a CORESET identifier specifying configuration information of a CORESET configured for the DL BWP or may be set to a value of the CORESET identifier included in ra-SearchSpace configured for the initial BWP. In other words, ra-searchspace configured for a certain DL BWP may indicate a CORESET identifier specifying configuration information of a CORESET configured for the DL BWP or may indicate a CORESET identifier included in ra-SearchSpace configured for the initial BWP. In other words, for ra-searchspace configured for a certain DL BWP, common and UE-specific CORESET identifiers configured for DL BWPs other than the DL BWP and the initial DL BWP may not be indicated. In other words, the base station apparatus 3 may transmit an RRC message such that for ra-searchspace configured for a certain DL BWP, the common and UE-specific CORESET identifiers configured for DL BWPs other than the DL BWP and the initial DL BWP are not indicated. For example, the value of the CORESET identifier included in ra-searchspace may be set to 1 or 3 for DL BWP#1. The value of the CORESET identifier included in ra-searchspace is not set to 6 for DL BWP#1. In a case that the value of the CORESET identifier included in ra-searchspace is set to 1 for DL BWP#1, the terminal apparatus 1 monitors the DCI format included in ra-searchspace using active DL BWP#1 based on the configuration information of CORESET#1 (804) specified by the CORESET identifier 1. In a case that the value of the CORESET identifier included in ra-searchspace is set to 3 for DL BWP#1, the terminal apparatus 1 monitors the DCI format included in ra-searchspace using active DL BWP#1 based on the configuration information of CORESET#3 (807) specified by the CORESET identifier 3. In other words, ra-searchspace configured for a certain DL BWP may indicate a CORESET identifier specifying the configuration information of the common CORESET. For example, the value of the CORESET identifier included in ra-searchspace may be set to 1 for DL BWP#1. In other words, in a case that CORESET#1 has been configured for the initial DL BWP, CORESET#0 cannot be called as ra-searchspace. In a case that CORESET#1 has not been configured for the initial DL BWP, CORESET#0 can be called as ra-searchspace. However, even in a case that CORESET#1 has been configured for the initial DL BWP, CORESET#0 can be called as ra-searchspace by the DL BW as expansion of the first example.

Also, in a second example, a CORESET identifier included in ra-searchspace configured for a certain DL BWP may be set to a value of a CORESET identifier specifying configuration information of the common CORESET configured for the DL BWP or may be set to a value of a common CORESET identifier for a random access procedure configured for another BWP. In other words, ra-searchspace configured for a certain DL BWP may indicate a CORESET identifier specifying the configuration information of the common CORESET configured for the DL BWP or may indicate the common CORESET identifier for the random access procedure configured for another BWP. For example, the value of the CORESET identifier included in ra-searchspace may be set to 1, may be set to 3, or may be set to 6 for DL BWP#1. In other words, in a case that CORESET#1 has been configured for the initial DL BWP, CORESET#0 cannot be called as ra-searchspace of the DL BWP. In a case that CORESET#1 has not been configured for the initial DL BWP, CORESET#0 can be called as ra-searchspace of the DL BWP.

In a third example, the CORESET identifier included in ra-searchspace configured for a certain DL BWP may be set to values of all common CORESET identifiers configured for the terminal apparatus 1. In other words, ra-searchspace configured for a certain DL BWP may indicate CORESET identifiers specifying configuration information of all the common CORESET configured for the serving cell. For example, the value of the CORESET identifier included in ra-searchspace may be set to 0, 1, 3, or 6 for DL BWP#1.

The value may be set to the value of the CORESET identifier specifying the configuration information of CORESET configured for the DL BWP or may be set to the value of the CORESET identifier configured for another BWP. In other words, ra-searchspace configured for a certain DL BWP may indicate the CORESET identifier specifying the configuration information of the CORESET configured for the DL BWP or may indicate the identifier of the common CORESET configured for another BWP. For example, the value of the CORESET identifier included in ra-searchspace may be set to 0, may be set to 1, may be set to 3, or may be set to 6 for DL BWP#1.

A random access procedure according to the present embodiment will be described. The random access procedure is categorized into two procedures, namely a Contention-Based (CB) procedure and a non-contention based (non-CB) (which may be referred to as a Contention Free (CF) procedure. The contention-based random access will also be referred to as CBRA while the non-contention-based random access will also be referred to as CFRA.

The random access procedure may have (i) transmission of a random access preamble (message 1, Msg1) in the PRACH, (ii) reception of random access response (RAR) message accompanying PDCCH/PDSCH (message 2, Msg2), and if applicable, (iii) transmission of a message 3 PUSCH (Msg3 PUSCH), and (iv) reception of the PDSCH for collision resolution.

The contention-based random access procedure is initiated by a PDCCH order, a notification of a beam failure from the MAC entity or the lower layer, RRC, or the like. In a case that the beam failure notification is provided from the physical layer of the terminal apparatus 1 to the MAC entity of the terminal apparatus 1, and in a case that a certain condition is met, the MAC entity of the terminal apparatus 1 initiates the random access procedure. The procedure in which in a case that the beam failure notification is provided from the physical layer of the terminal apparatus 1 to the MAC entity of the terminal apparatus 1, whether or not a certain condition is met is determined, and the random access procedure is then initiated may be referred to as a beam failure recover procedure. The random access procedure is a random access procedure for a beam failure recovery request. The random access procedure initiated by the MAC entity includes a random access procedure initiated by a scheduling request procedure. The random access procedure for the beam failure recovery request may be or may not be considered as a random access procedure initiated by the MAC entity. Since there is a case in which different procedures are performed in the random access procedure for the beam failure recovery request and in the random access procedure initiated by a scheduling request procedure, the random access procedure for the beam failure recovery request and the scheduling request may be distinguished. The random access procedure for the beam failure recovery request and the scheduling request procedure may be the random access procedure initiated by the MAC entity. In a certain embodiment, the random access procedure initiated by the scheduling request procedure may be referred to as the random access procedure initiated by the MAC entity, and the random access procedure for the beam failure recovery request may be referred to as the random access procedure in response to a notification of a beam failure from the lower layer. Hereinafter, the initialization of the random access procedure performed in the case in which the notification of the beam failure has been received from the lower layer may mean the initialization of the random access procedure for the beam failure recovery request.

The terminal apparatus 1 performs the contention-based random access procedure at the time of an initial access from a state in which no connection (communication) is established with the base station apparatus 3 and/or at the time of a scheduling request in a case that the terminal apparatus 1 is connected to the base station apparatus 3, and uplink data that can be transmitted or sidelink data that can be transmitted occurs in the terminal apparatus 1. However, the applications of the contention-based random access are not limited thereto.

The fact that uplink data that can be transmitted has occurred in the terminal apparatus 1 may include that a buffer status report corresponding to the uplink data that can be transmitted has been triggered. The fact that the uplink data that can be transmitted has occurred in the terminal apparatus 1 may include that a scheduling request triggered based on the occurrence of the uplink data that can be transmitted is being suspended.

The fact that the sidelink data that can be transmitted has occurred in the terminal apparatus 1 may include that a buffer status report corresponding to the sidelink data that can be transmitted has been triggered. The fact that the sidelink data that can be transmitted has occurred in the terminal apparatus 1 may include that a scheduling request triggered based on the occurrence of the sidelink data that can be transmitted is being suspended.

The non-contention-based random access procedure may be initiated in a case that the terminal apparatus 1 receives information indicating initialization of the random access procedure from the base station apparatus 3. The non-contention-based random access procedure may be initiated in a case that the MAC layer of the terminal apparatus 1 receives a notification of a beam failure from the lower layer.

The non-contention-based random access may be used to quickly establish uplink synchronization between the terminal apparatus 1 and the base station apparatus 3 in a case that handover or a transmission timing of the mobile station apparatus is not effective though the base station apparatus 3 and the terminal apparatus 1 are being connected to each other. The non-contention-based random access may be used to transmit the beam failure recovery request in a case that a beam failure occurs in the terminal apparatus 1. However, applications of the non-contention-based random access are not limited thereto.

However, the information indicating the initialization of the random access procedure may be referred to as a message 0, Msg. 0, an NR-PDCCH order, a PDCCH order, or the like.

However, in a case that the random access preamble index indicated by the message 0 is a predetermined value (for example, in a case that all the bits indicating the index are 0), the terminal apparatus 1 may perform the contention-based random access procedure of randomly selecting and transmitting one out of a set of preambles that the terminal apparatus 1 can use.

However, information that is common in a cell may be included in the random access configuration information, and dedicated information that differs for each terminal apparatus 1 may be included therein.

However, a part of the random access configuration information may be associated with all SS/PBCH blocks in an SS burst set. However, a part of the random access configuration information may be associated with all of one or a plurality of CSI-RSs set. However, a part of the random access configuration information may be associated with one downlink transmission beam (or a beam index).

However, a part of the random access configuration information may be associated with one SS/PBCH block in the SS burst set. However, a part of the random access configuration information may be associated with one CSI-RS set or one of a plurality of CSI-RSs set. However, a part of the random access configuration information may be associated with one downlink transmission beam (or a beam index). However, index information (which may be an SSB index, a beam index, or a QCL configuration index, for example) for specifying the corresponding one SS/PBCH block, one CSI-RS, and/or one downlink transmission beam may be included in the information associated with the one SS/PBCH block, the one CSI-RS, and/or the one downlink transmission beam.

Hereinafter, a PRACH occasion will be described.

A set of one or a plurality of PRACH occasions that can be used to transmit the random access preamble may be specified by a higher layer parameter prach-ConfigIndex provided by the higher layer (higher layer signal). The set of one or a plurality of PRACH occasions that can be used to transmit the random access preamble is specified in accordance with a PRACH configuration (physical random access channel configuration) index provided by prach-ConfigIndex and a predefined table (also referred to as a random access channel configuration (PRACH config) table). However, the specified one or plurality of PRACH occasions may be a group of PRACH occasions associated with each of one or a plurality of SS/PBCH blocks transmitted by the base station apparatus 3.

However, the PRACH configuration index may be used to configure a period at which the set of PRACH occasions indicated by the random access configuration table is temporally repeated (PRACH configuration period (physical random access channel configuration period: PRACH configuration period)), a subcarrier index that can transmit the random access preamble, a resource block index, a subframe number, a slot number, a system frame number, a symbol number, and/or a format of the preamble.

However, the number of SS/PBCH blocks mapped in each PRACH occasion may be indicated by a higher layer parameter SSB-perRACH-Occasion provided by the higher layer. In a case that SSB-perRACH-Occasion is a value that is smaller than 1, one SS/PBCH block is mapped to a plurality of continuous PRACH occasions.

However, the number of random access preambles mapped to each SS/PBCH block may be indicated by a higher layer parameter cb-preamblePerSSB provided by the higher layer. The number of random access preambles mapped to each SS/PBCH block in each PRACH occasion may be calculated from SSB-perRACH-Occasion and cb-preamblePerSSB. The index of the random access preamble mapped to each SS/PBCH block in each PRACH occasion may be specified from SB-perRACH-Occasion, cb-preamblePerSSB, and SSB indexes.

The SSB indexes may be mapped in the PRACH occasion in accordance with the following rules.

(1) First, the SSB indexes are mapped in an ascending order of the preamble indexes for one PRACH occasion. In a case that the number of preambles of PRACH occasions is 64, and the number of random access preambles mapped to each SS/PBCH block in each PRACH occasion is 32, for example, the SSB indexes mapped to a certain PRACH occasion are n and n+1.

(2) Second, the SSB indexes are mapped in an ascending order of frequency resource indexes for a plurality of frequency multiplexed PRACH occasions. In a case that two PRACH occasions have been frequency multiplexed, and the SSB indexes mapped to the PRACH occasion with a smaller frequency resource index are n and n+1, for example, the SSB indexes mapped to the PRACH occasion with a larger frequency resource index are n+2 and n+3.

(3) Third, the SSB indexes are mapped in an ascending order of time resource indexes to a plurality of time multiplexed PRACH occasions in a PRACH slot. In a case that two PRACH occasions have further been multiplexed in the time direction in the PRACH slot in addition to the aforementioned example (2), for example, the SSB indexes mapped to these PRACH occasions are n+4, n+5, n+6, and n+7.

(4) Fourth, the SSB indexes are mapped in an ascending order of the indexes to a plurality of PRACH slots. In a case that RACH occasions are present in the next PRACH slot in addition to the aforementioned example (3), for example, the SSB indexes mapped are n+8, n+9, . . . . However, in a case that n+x is greater than the maximum value of the SSB indexes in the aforementioned examples, the values of the SSB indexes are returned to 0.

Figure 13:
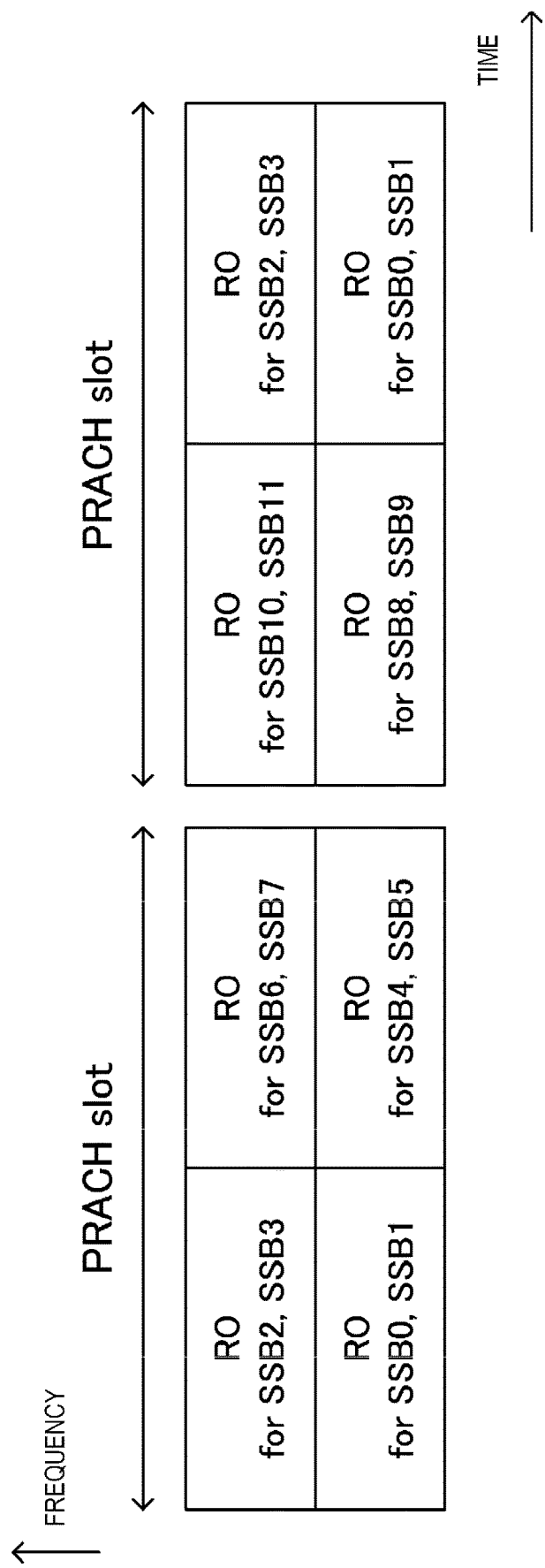
FIG. 13 is a diagram illustrating an example of allocation of SSB indexes to PRACH occasions according to the present embodiment.

FIG. 13 is a diagram illustrating an example of allocation of SSB indexes to PRACH occasions according to the embodiment of the present invention. FIG. 13 illustrates an example of a case in which two PRACH slots are present in a certain time period, two PRACH occasions (RO) in the time direction and two PRACH occasions (RO) in the frequency direction are present in one PRACH slot, and SSB indexes 0 to 11 are present. Two SSB indexes are mapped to one PRACH occasion, the SSB indexes are mapped in accordance with the aforementioned rules (1) to (4), and the SSB indexes are mapped from the SSB index 0 again from the seventh PRACH occasion.

In a case that although the SSB indexes are mapped to each PRACH occasion, all the SSB indexes (all SS/PBCH blocks transmitted by the base station apparatus 3) are not mapped even in a case that all the PRACH occasions in a PRACH configuration period specified by prach-ConfigIndex are used, the SSB indexes may be mapped over a plurality of PRACH configuration periods. However, the entire number of SS/PBCH blocks transmitted by the base station apparatus 3 may be indicated by a higher layer parameter. The period at which the PRACH configuration period is repeated a predetermined number of times such that all the SSB indexes are mapped at least once will be referred to as an association period. As the number of times the PRACH configuration period configuring the association period is repeated, a minimum value that satisfies the aforementioned conditions in a predefined set of a plurality of values may be used. The predefined set of a plurality of values may be defined for each PRACH configuration period. However, in a case that all the SSB indexes are mapped to the PRACH occasions in the association period, and the number of remaining PRACH occasions is greater than the number of SS/PBCH blocks, the SSB indexes may be mapped again. However, in a case that all the SSB indexes are mapped to the PRACH occasions in the association period, and the number of remaining PRACH occasions is smaller than the number of SS/PBCH blocks, the SSB indexes may not be mapped to the remaining PRACH occasions. A cycle at which the PRACH occasions are allocated to all the SSB indexes once will be referred to as an SSB index allocation cycle. In a case that SSB-per-RACH-Occasion is equal to or greater than 1, each of the SSB indexes is mapped to one PRACH occasion in one SSB index allocation cycle. In a case that SSB-perRACH-Occasion is a value that is smaller than 1, each SSB index is mapped to 1/SSB-perRACH-Occasion PRACH occasions in one SSB index allocation cycle. The terminal apparatus 1 may specify the association period based on the PRACH configuration period indicated by the PRACH configuration index and the number of SS/PBCH blocks specified by the higher parameter provided by the higher layer (higher layer signal).

Each of one or a plurality of random access preamble groups included in random access configuration information may be associated for each reference signal (for example, an SS/PBCH block, a CSI-RS, or a downlink transmission beam). The terminal apparatus 1 may select a random access preamble group based on the received reference signal (for example, the SS/PBCH block, the CSI-RS, or the downlink transmission beam).

However, the random access preamble group associated with each SS/PBCH block may be specified by one or a plurality of parameters notified from the higher layer. The one parameter or one of the plurality of parameters may be one index (for example, a start index) of one or a plurality of available preambles. The one parameter or the one of the plurality of parameters may be the number of preambles that can be used for a contention-based random access per SS/PBCH block. The one parameter or the one of the plurality of parameters may be a total of the number of preambles that can be used for the contention-based random access per SS/PBCH block and the number of preambles that can be used for the non-contention-based random access. The one parameter or the one of the plurality of parameters may be the number of SS/PBCH blocks associated with one PRACH occasion.

However, the terminal apparatus 1 may receive one or a plurality of downlink signals, each of which is transmitted using one downlink transmission beam, receive random access configuration information associated with one of the downlink signals, and perform the random access procedure based on the received random access configuration information. The terminal apparatus 1 may receive one or a plurality of SS/PBCH blocks in the SS burst set, receive random access configuration information associated with one of the SS/PBCH blocks, and perform the random access procedure based on the received random access configuration information. The terminal apparatus 1 may receive one or a plurality of CRI-RSs, receive random access configuration information associated with one of the CRI-RSs, and perform the random access procedure based on the received random access configuration information.

One or a plurality of pieces of random access configuration information may include one random access channel configuration (RACH-Config) and/or one physical random access channel configuration (PRACH-Config).

Parameters related to the random access for each reference signal may be included in the random access channel configuration.

Parameters (such as an index of PRACH configuration, a PRACH occasion, and the like) related to the physical random access channel for each reference signal may be included in the physical random access channel configuration.

One piece of random access configuration information may indicate parameters related to a random access corresponding to one reference signal, and a plurality of pieces of random access configuration information may indicate parameters related to a plurality of random accesses corresponding to a plurality of reference signals.

One piece of random access configuration information may indicate parameters related to a physical random access corresponding to one reference signal, and may indicate parameters related to a plurality of random accesses corresponding to a plurality of reference signals.

Random access configuration information corresponding to a reference signal (random access channel configuration corresponding to the reference signal, physical random access channel configuration corresponding to the reference signal) may be selected in response to selection of the corresponding reference signal.

However, the terminal apparatus 1 may receive one or a plurality of pieces of random access configuration information from a base station apparatus 3 that transmits the random access preamble and/or a base station apparatus 3 that is different from the transmission reception points 4 and/or the transmission reception points 4. For example, the terminal apparatus 1 may transmit the random access preamble to a second base station apparatus 3 based on at least one piece of random access configuration information received from a first base station apparatus 3.

However, the base station apparatus 3 may determine the downlink transmission beam to be applied in a case that the downlink signal is transmitted to the terminal apparatus 1, by receiving the random access preamble transmitted by the terminal apparatus 1. The terminal apparatus 1 may transmit the random access preamble using a PRACH occasion indicated by the random access configuration information associated with a certain downlink transmission beam. The base station apparatus 3 may determine the downlink transmission beam to be applied in a case that the downlink signal is transmitted to the terminal apparatus 1, based on the random access preamble received from the terminal apparatus 1 and/or the PRACH occasion in which the random access preamble is received.

The base station apparatus 3 transmits an RRC parameter including one or a plurality of pieces of random access configuration information (which may include random access resources) as an RRC message to the terminal apparatus 1.

The terminal apparatus 1 may select one or a plurality of available random access preambles and/or one or a plurality of available PRACH occasions used for the random access procedure based on properties of a transmission path with the base station apparatus 3. The terminal apparatus 1 may select one or a plurality of available random access preambles and/or one or a plurality of PRACH occasions used for the random access procedure based on properties of the transmission path (which may be a reference signal reception power (RSRP), for example) measured by a reference signal (an SS/PBCH bock and/or a CSI-RS, for example) received from the base station apparatus 3.

In the present embodiment, an uplink resource allocation type 0 and an uplink resource allocation type 1 are supported for uplink resource allocation. In the uplink resource allocation type 0 (uplink type 0 resource allocation), resource block assignment information includes a bit map indicating Resource Block Groups (RBGs) allocated to the terminal apparatus 1. The resource block groups are sets of continuous virtual resource blocks and may be defined from parameters of the higher layer.

Hereinafter, the uplink resource allocation type 1 (uplink type 1 resource allocation) will be described.

The resource block assignment information indicates sets of non-interleave virtual resource blocks continuously allocated with an active BWP with a size $N^{size}_{BWP}$ to the scheduled terminal apparatus 1. Here, the size $N^{size}_{BWP}$ is the number of resource blocks indicating the bandwidth of the active UL BWP. In a case that the DCI format 0_0 has been detected in the type 0-PDCCH common search space set of CORESET#0, the size $N^{size}_{BWP}$ indicates the bandwidth of the initial UL BWP.

The uplink type 1 resource assignment field includes a start resource block ($RB_{start}$, start virtual resource block) and a Resource Indication Value (RIV) corresponding to the number ($L_{RBs}$) of the resource blocks continuously allocated. In other words, the resource indication value RIV is indicated in the resource assignment field. $RB_{start}$ indicates a start position of the allocated resource blocks. $L_{RBs}$ indicates the number (the length, the size) of the resource blocks of the allocated resources. The resource indication value RIV indicates the resources allocated to a corresponding UL BWP as a target. The UL BWP as a target may be the UL BWP to which the resource assignment (resource assignment field) is applied. The terminal apparatus 1 fixes the UL BWP to which the resource assignment is applied first and then determines resource allocation in the fixed UL BWP. In other words, the value of RIV is calculated by the size ($N^{size}_{BWP}$) of the UL BWP to which the resource assignment is applied, the start resource block ($RB_{start}$), and the number ($L_{RBs}$) of resource blocks continuously allocated. In other words, the terminal apparatus 1 calculates the start position of the resource blocks allocated with the UL BWP and the number of resource blocks continuously allocated, based on the value of the RIV and $N^{size}_{BWP}$ indicated in the resource assignment field. In other words, the terminal apparatus 1 interprets bits of the resource assignment field for the UL BWP to which the resource assignment is applied. The base station apparatus 3 determines resource assignment in the UL BWP applied to the terminal apparatus 1, generates RIV based on the size of the applied UL BWP, and transmits resource assignment including a bit sequence indicating the RIV to the terminal apparatus 1.

The terminal apparatus 1 specifies the resource block allocation in the frequency direction (in the PUSCH) of the applied UL BWP, based on the bit sequence in the resource assignment field.

FIG. 12 is a diagram illustrating an example in which an RIV is calculated.

In FIG. 12(A), $N^{size}_{BWP}$ is the number of resource blocks indicating the bandwidth of the active UL BWP. The value of RIV is calculated based on the number $N^{size}_{BWP}$ of the resource blocks indicating the bandwidth of the initial BWP, the start position $RB_{start}$ of the resource blocks, and the number of $L_{RBs}$ of the resource blocks continuously allocated. $RB_{start}$ is the start position of the resource blocks for the active UL BWP. $L_{RBs}$ is the number of resource blocks continuously allocated to the active BWP. In this manner, the resources allocated to the active BWP is specified by the start position $RB_{start}$ of the resource blocks and the number $L_{RBs}$ of the resource blocks continuously allocated. In a case that the DCI format has been detected in a common search space set (the type 1-PDCCH common search space set), the number of resource blocks indicating the bandwidth of the initial UL BWP is used for $N^{size}_{BWP}$ in FIG. 12(A).

In FIG. 12(B), $N^{initial}_{BWP}$ is the number of resource blocks indicating the bandwidth of the initial BWP (UL BWP). $N^{active}_{BWP}$ is the number of resource blocks indicating the bandwidth of the active BWP (UL BWP). The value of RIV is calculated based on the number $N^{initial}_{BWP}$ of the resource blocks that indicates the bandwidth of the initial BWP, the start position RB' start of the resource blocks, and the number $L'_{RBs}$ of the resource blocks continuously allocated. RB' start is the start position of the resource blocks for the initial BWP. $L'_{RBs}$ is the number of resource blocks continuously allocated to the initial BWP. Multiplication of $RB'_{start}$ and a coefficient K is $RB_{start}$. Multiplication of $L'_{RBs}$ and a coefficient K is $L_{RBs}$. The value of the coefficient K is calculated based on the bandwidth of the initial BWP and the bandwidth of the active BWP. In a case that $N^{active}_{BWP}$ is greater than $N^{initial}_{BWP}$, the value of K is a maximum value that satisfies K<=Floor($N^{active}_{BWP}/N^{initial}_{BWP}$) in a set {1,2, 4,8}. Here, the function Floor(A) outputs the maximum number that does not exceed A. In a case that $N^{active}_{BWP}$ is equal to or less than $N^{initial}_{BWP}$, the value of K is 1. In this manner, the resources allocated to the active BWP is specified by the start position $RB_{start}$ of the resource blocks and the number $L_{RBs}$ of the resource blocks continuously allocated.

The resource specification method in FIG. 12(B) may be used for a case in which although the size of the DCI format in USS (or the size of the frequency domain resource assignment field included in the DCI format) is derived by the initial BWP, the size is applied to the active BWP. The DCI format may be the DCI format 0_0 and/or the DCI format 0_1.

Figure 11:
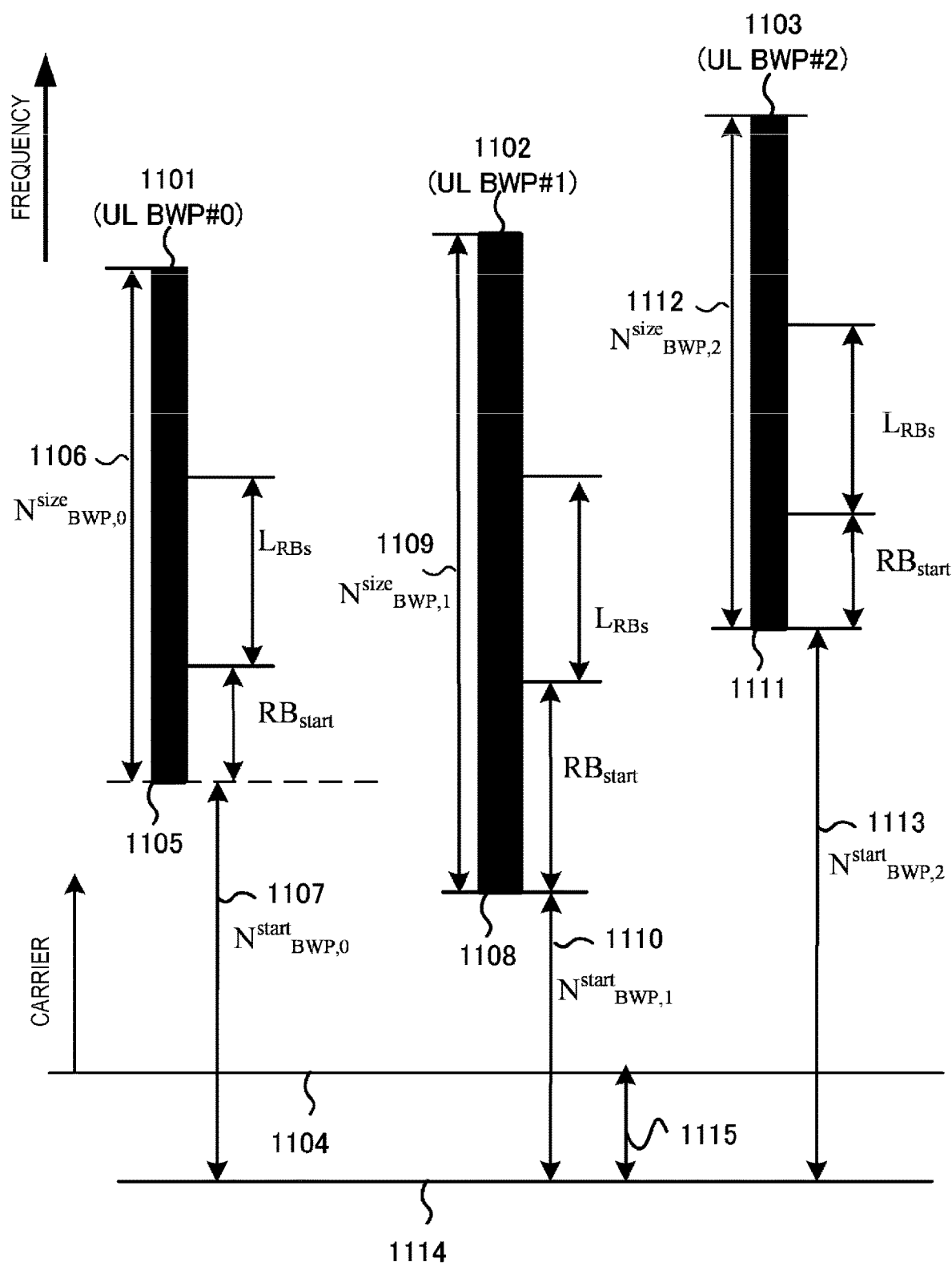
FIG. 11 is a diagram illustrating an example for explaining an uplink resource allocation type 1 for BWPs according to the present embodiment.

FIG. 11 is a diagram illustrating an example for explaining the uplink resource allocation type 1 for BWPs.

In FIG. 11, one initial UL BWP (1101) and two additional UL BWPs (1102 and 1103) are configured for the terminal apparatus 1. As described above, common resource blocks $n_{PRB}$ are resource blocks numbered in an ascending order from 0 at each subcarrier spacing configuration μ from a point A. In other words, 1114 is a common resource block (common resource block 0) to which the number 0 is applied. In the subcarrier spacing configuration the center of the subcarrier index 0 of the common resource block 0 (common resource block index 0, $n_{CRB}$#0) coincides with the point A. 1104 is the start position of the carrier in the subcarrier spacing configuration μ and is provided from a parameter OffsetToCarrier of the higher layer. In other words, the parameter OffsetToCarrier of the higher layer is an offset between the point A and the lowest available subcarrier of the carrier in the frequency domain. The offset (1115) indicates the number of resource blocks in the subcarrier spacing configuration μ. In other words, in a case that the subcarrier spacing configuration differs, the bandwidth of the offset in the frequency domain differs. In the subcarrier spacing configuration 1104 may be the position of the resource block at which the carrier starts. Physical resource blocks are resource blocks numbered in an ascending order from 0 for each BWP. In the subcarrier spacing configuration μ of each BWP index i, a relationship between a physical resource block $n_{PRB}$ of the BWP index i and the common resource block $n_{CRB}$ is provided by (Expression 3) $n_{CRB}=n_{PRB}+N^{start}_{BWP,i}$. In the subcarrier spacing configuration of each BWP, $N^{start}_{BWP,i}$ is the number of common resource blocks at which the BWP index i is started with respect to the common resource block index 0. $N^{size}_{BWP,i}$ is the number of resource blocks indicating the bandwidth of the BWP of the index i in the subcarrier spacing configuration μ of the BWP index i.

The position and the bandwidth of the BWP in the frequency domain are provided by a parameter locationAndBandwidth of the higher layer. Specifically, the first physical resource block (physical resource block index 0) of the BWP index i and the number of continuous physical resource blocks are provided by the parameter locationAndBandwidth of the higher layer. The value indicated by the parameter locationAndBandwidth of the higher layer is interpreted as the value of RIV for the carrier. As in FIG. 12(A), $N^{size}_{BWP}$ is set to 275. Also, $RB_{start}$ and $L_{RBs}$ identified by the value of RIV indicate the first physical resource block (physical resource block index 0) of the BWP and the number of continuous physical resource blocks indicating the bandwidth of the BWP. The first physical resource block of BWP index i is a physical resource block offset with respect to the physical resource block (1104) indicated by a parameter OffsetToCarrier of the higher layer. The number of resource blocks indicating the bandwidth of the BWP index i is $N^{size}_{BWP,i}$. $N^{start}_{BWP,i}$ of the BWP index i is provided from the first physical resource block of the BWP index i and the offset indicated by the parameter OffsetToCarrier of the higher layer.

In other words, 1105 is the physical resource block index 0 ($n_{PRB}$#0) in UL BWP#0 (1101) in the subcarrier spacing configuration of UL BWP#0, in FIG. 11. A relationship between the physical resource block and the common resource block in UL BWP#0 is provided by $n_{CRB}=n_{PRB}+N^{start}_{BWP,0}$. In the subcarrier spacing configuration of UL BWP#0, $N^{start}_{BWP,0}$ (1107) is the common resource block at which UL BWP#0 is started with respect to the common resource block index 0. $N^{size}_{BWP,0}$ (1106) is the number of resource blocks indicating the bandwidth of UL BWP#0 in the subcarrier spacing configuration of UL BWP#0.

In FIG. 11, 1108 is the physical resource block index 0 ($n_{PRB}$#0) in UL BWP#1 (1102) in the subcarrier spacing configuration of UL BWP#1. A relationship between the physical resource block and the common resource block in UL BWP#1 is provided by $n_{CRB}=n_{PRB}+N^{start}_{BWP,1}$. In the subcarrier spacing configuration of UL BWP#1, $N^{start}_{BWP,1}$ (1110) is a common resource block at which UL BWP#1 for the common resource block index 0 is started. $N^{size}_{BWP,1}$ (1109) is the number of resource blocks indicating the bandwidth of UL BWP#0 in the subcarrier spacing configuration of UL BWP#1.

In FIG. 11, 1111 is the physical resource block index 0 ($n_{PRB}$#0) in UL BWP#2 in the subcarrier spacing configuration of UL BWP#2 (1102). A relationship between the physical resource block and the common resource block in UL BWP#2 is provided by $n_{CRB}=n_{PRB}+N^{start}_{BWP,2}$. In the subcarrier spacing configuration of UL BWP#2, $N^{start}_{BWP,2}$ (1113) is a common resource block at which UL BWP#2 is started with respect to the common resource block index 0. $N^{size}_{BWP,2}$ (1112) is the number of resource blocks indicating the bandwidth of UL BWP#2 in the subcarrier spacing configuration of UL BWP#2.

As can be seen from FIG. 11, the start position (starting common resource block, $N^{start}_{BWP}$) and the number of resource blocks ($N^{size}_{BWP}$) differ for each BWP configured for the terminal apparatus 1. The terminal apparatus 1 needs to determine the UL BWP to which the resource assignment is applied in a case that the terminal apparatus 1 interprets the RIV indicated by the bits of the resource assignment field. In other words, the terminal apparatus 1 can determine the UL BWP to which the resource assignment is applied, interpret the RIV based on $N^{size}_{BWP,i}$ of the determined UL BWP, and calculate the start resource block ($RB_{start}$) and the number of resource blocks ($L_{RBs}$) continuously allocated. Calculated $RB_{start}$ indicates the position at which the resources allocated are started with reference to the physical resource block index 0 of the UL BWP to which the resource assignment is applied. In a case that the resource assignment is applied to different UL BWPs even in a case that the calculated value of $RB_{start}$ is the same, the positions of the starting common resource blocks differ.

Also, in a case that the size $N^{size}_{BWP}$ of the UL BWP to which the resource assignment is applied differs, the number of bits of the resource assignment indicating the value of RIV also differs. The bits of the resource block assignment field that can indicate the value of RIV is provided by $\text{Ceiling}(\log_2(N^{size}_{BWP}(N^{size}_{BWP}+1)/2))$.

Figure 8:
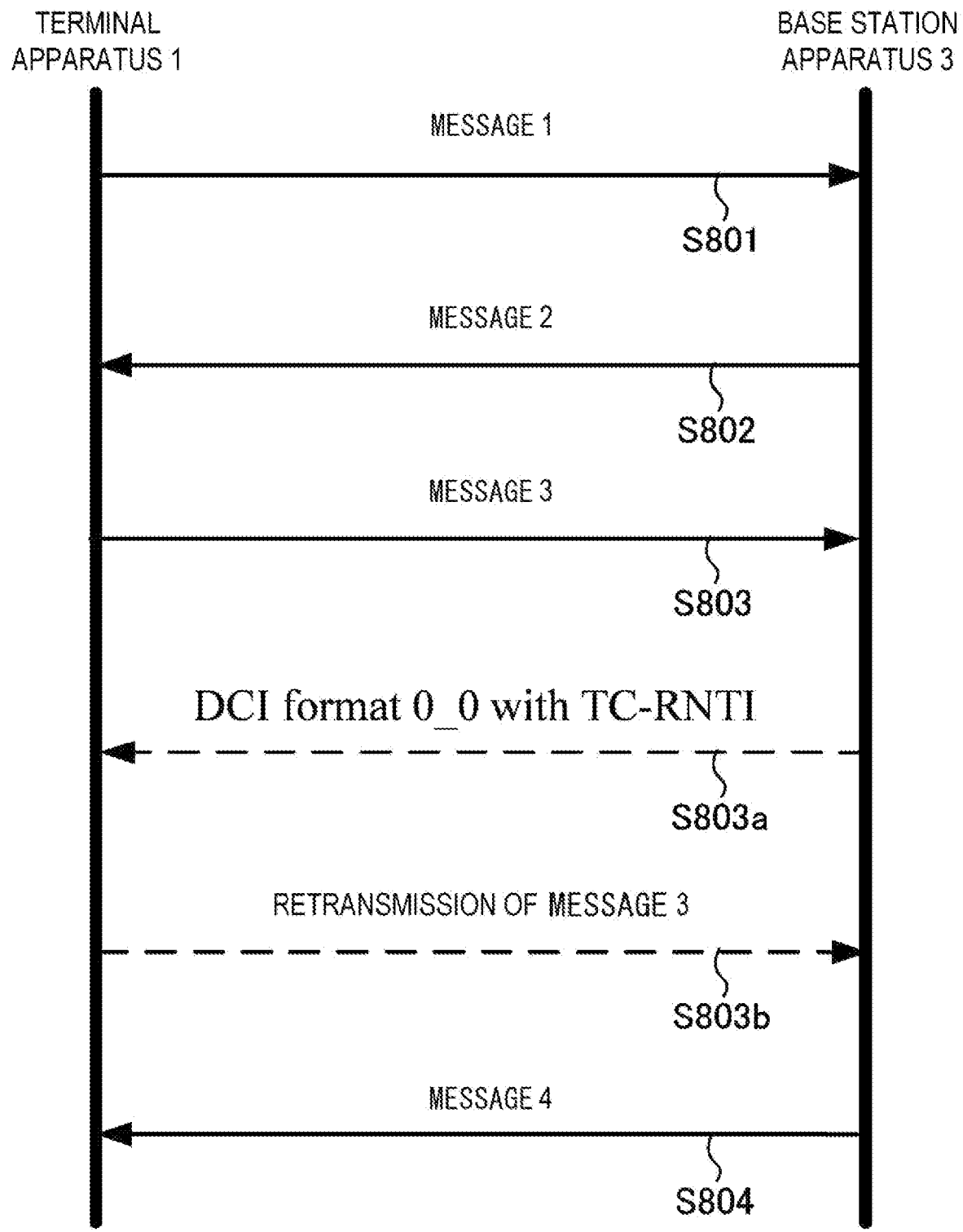
FIG. 8 is a diagram illustrating an example of a random access procedure of a terminal apparatus 1 according to the embodiment of the present invention.

FIG. 8 is a diagram illustrating an example of a random access procedure of the terminal apparatus 1 according to the present embodiment.

Message 1 (S801)

In S801, the terminal apparatus 1 transmits a random access preamble to the base station apparatus 3 via a PRACH. The transmitted random access preamble may be referred to as a message 1 (Msg1). The transmission of the random access preamble will also be referred to as PRACH transmission. The random access preamble is configured to notify information to the base station apparatus 3 using one sequence among a plurality of sequences. For example, sixty four types (the numbers of random access preamble indexes range from 1 to 64) of sequences are prepared. In a case that sixty four types of sequences are prepared, it is possible to indicate 6-bit information (which may be ra-PreambleIndex or a preamble index) for the base station apparatus 3. The information may be indicated as a random access preamble identifier (Random Access Preamble Identifier, RAPID).

In a case of a contention-based random access procedure, an index of a random access preamble is randomly selected by the terminal apparatus 1 itself. In the contention-based random access procedure, the terminal apparatus 1 selects SS/PBCH blocks that have SS/PBCH block RSRP exceeding a configured threshold value and performs selection of a preamble group. In a case that a relationship between the SS/PBCH block and the random access preamble has been configured, the terminal apparatus 1 randomly selects ra-PreambleIndex from one or a plurality of random access preambles associated with the selected SS/PBCH block and the selected preamble group and sets selected ra-PreambleIndex to the preamble index (PREAMBLE_INDEX). Also, the selected SS/PBCH block and the selected preamble group may be split into two subgroups based on the transmission size of the message 3, for example. The terminal apparatus 1 may randomly select a preamble index from the subgroup corresponding to a small transmission size of the message 3 in a case that the transmission size of the message 3 is small, or may randomly select a preamble index from the subgroup corresponding to a large transmission size of the message 3 in a case that the transmission size of the message 3 is large. The index in the case in which the message size is small is typically selected in a case that properties of the transmission path are poor (or the distance between the terminal apparatus 1 and the base station apparatus 3 is far), and the index in the case in which the message size is large is selected in a case that the properties of the transmission path are good (or the distance between the terminal apparatus 1 and the base station apparatus 3 is close).

In a case of the non-contention-based random access procedure, an index of the random access preamble is selected based on information received by the terminal apparatus 1 from the base station apparatus 3. Here, the information received by the terminal apparatus 1 from the base station apparatus 3 may be included in the PDCCH. In a case that all the values of bits of the information received from the base station apparatus 3 are 0, the contention-based random access procedure is executed by the terminal apparatus 1, and the index of the random access preamble is selected by the terminal apparatus 1 itself.

Message 2 (S802)

Next, the base station apparatus 3 that has received the message 1 generates a RAR message including an uplink grant (Random Access Response Grant, RAR UL grant) for indicating transmission for the terminal apparatus 1 and transmits a random access response including the generated RAR message to the terminal apparatus 1 in DL-SCH in S802. In other words, the base station apparatus 3 transmits, in the PDSCH in a primary cell, the random access response including the RAR message corresponding to the random access preamble transmitted in S801. The PDSCH corresponds to a PDCCH including RA-RNTI. This Ra-RNTI is calculated by RA-RNTI=1+s_id+14×t_id+14×80×f_id+14×80×8×ul_carrier_id. Here, s_id is an index of the first OFDM symbol in the transmitted PRACH and is a value of 0 to 13. t_id is an index of the first slot of the PRACH in the system frame and is a value of 0 to 79. fid is an index of the PRACH in the frequency domain and is a value of 0 to 7. ul_carrier_id is an uplink carrier used for Msg1 transmission. ul_carrier_id for the NUL carrier is 0 while ul_carrier_id for the SUL carrier is 1.

The random access response may be referred to as a message 2 or Msg2. Also, the base station apparatus 3 includes, in the message 2, a random access preamble identifier corresponding to the received random access preamble and an RAR message (MAC RAR) corresponding to the identifier. The base station apparatus 3 calculates a deviation in transmission timing between the terminal apparatus 1 and the base station apparatus 3 from the received random access preamble and includes, in the RAR message, transmission timing adjustment information (Timing Advance (TA) command) for adjusting the deviation. The RAR message includes at least a random access response grant field mapped to the uplink grant, a Temporary Cell Radio Network Temporary Identifier (C-RNTI) field to which Temporary C-RNTI is mapped, and a Timing Advance (TA) command. The terminal apparatus 1 adjusts the timing of the PUSCH transmission based on the TA command. The timing of the PUSCH transmission may be adjusted for each cell group. The base station apparatus 3 includes, in the message 2, the random access preamble identifier corresponding to the received random access preamble.

In order to respond to PRACH transmission, the terminal apparatus 1 detects (monitors) the DCI format 1_0 to which a CRC parity bit scrambled with the corresponding RA-RNTI is added, during a time period of a random access response window. The time period of the random access response window (window size) is provided by a higher layer parameter ra-ResponseWindow. The window size is the number of slots based on the subcarrier spacing of the Type1-PDCCH common search space.

In a case that the terminal apparatus 1 detects the DCI format 1_0 to which the CRC scrambled with RA-RNTI is added and the PDSCH including one DL-SCH transport block in the time period of the window, then the terminal apparatus 1 passes the transport block to the higher layer. The higher layer analyzes the transport block for the random access preamble identifier (RAPID) related to the PRACH transmission. In a case that the higher layer identifies RAPID included in the RAR message of the DL-SCH transport block, the higher layer indicates the uplink grant for the physical layer. The identification means that RAPID included in the received random access response and RAPID corresponding to the transmitted random access preamble are the same. The uplink grant will be referred to as a random access response uplink grant (RAR UL grant) in the physical layer. In other words, the terminal apparatus 1 can specify the RAR message (MAC RAR) directed to the apparatus itself from the base station apparatus 3, by monitoring the random access response (message 2) corresponding to the random access preamble identifier.

(i) In a case that the terminal apparatus 1 does not detect the DCI format 1_0 to which CRC scrambled with RA-RNTI is added in the time period of the window, or (ii) in a case that the terminal apparatus 1 does not properly receive the DL-SCH transport block in the PDSCH in the time period of the window, or (iii) in a case that the higher layer does not identify RAPID related to the PRACH transmission, the higher layer provides an indication to transmit the PRACH to the physical layer.

In a case that the random access preamble identifier corresponding to the transmitted random access preamble is included in the received random access response, and the random access preamble has been selected based on the information received by the terminal apparatus 1 from the base station apparatus 3, the terminal apparatus 1 regards the non-contention-based random access procedure as having successfully been completed and transmits the PUSCH based on the uplink grant included in the random access response.

In a case that the random access preamble identifier corresponding to the transmitted random access preamble is included in the received random access response, and the random access preamble has been selected by the terminal apparatus 1 itself, TC-RNTI is set to the value of the TC-RNTI field included in the received random access response, and the random access message 3 is transmitted in the PUSCH based on the uplink grant included in the random access response. The PUSCH corresponding to the uplink grant included in the random access response is transmitted in a serving cell in which the corresponding preamble has been transmitted in the PRACH.

The RAR uplink (UL) grant is used to schedule the PUSCH transmission (Msg3 PUSCH). The terminal apparatus 1 performs the transmission of the message 3 based on the RAR UL grant. FIG. 9 is a diagram illustrating an example of fields included in the RAR UL grant.

In a case that the value of a frequency hopping flag is 0 in FIG. 9, the terminal apparatus 1 transmits Msg3 PUSCH with no frequency hopping. In a case that the value of the frequency hopping flag is 1, the terminal apparatus 1 transmits Msg3 PUSCH that accompanies the frequency hopping.

The 'Msg3 PUSCH time resource allocation' field is used to indicate resource allocation in the time domain for the Msg3 PUSCH.

The 'MCS' field is used to determine an MCS index for the Msg3 PUSCH.

The 'TPC command for Msg3 PUSCH' field is used for configuration of a transmission power of the Msg3 PUSCH.

In the contention-based random access procedure, the 'CSI request' field is reserved. In the non-contention-based random access procedure, the 'CSI request' field is used to determine whether or not an aperiodic CSI report is included in the PUSCH transmission.

Hereinafter, interpretation of the 'Msg3 PUSCH frequency resource allocation' field will be described. The field is used for resource allocation for the PUSCH transmission of the message 3. The 'Msg3 PUSCH frequency resource allocation' (Msg3 PUSCH frequency resource assignment) field may be referred to as fixed size resource block assignment. In other words, the Msg3 PUSCH frequency resource assignment has a fixed number of bits regardless of the bandwidth of the UL BWP configured for the terminal apparatus 1. The terminal apparatus 1 truncates or inserts bits with respect to the Msg3 PUSCH frequency resource assignment based on the number ($N^{size}_{BWP}$) of the resource blocks indicating the bandwidth of the UL BWP to which the resource assignment is applied. In addition, the terminal apparatus 1 can adapt the bits to the bandwidth of the UL BWP to which the resource assignment is applied by truncating or inserting the bits with respect to the Msg3 PUSCH frequency resource assignment. $N^{size}_{BWP}$ is the number of resource blocks indicating the bandwidth of the UL BWP to which the resource assignment is applied. In S802 described below, the UL BWP to which the resource assignment is applied is the UL BWP to which the Msg3 PUSCH frequency resource assignment is applied.

FIG. 10 is a diagram illustrating an example of interpretation of the "Msg3 PUSCH frequency resource allocation" field according to the present embodiment.

1001 in FIG. 10(A) denotes the 'Msg3 PUSCH frequency resource allocation" field having specific 14 bits. 1002 denotes $N_{UL,hop}$ hopping bits. 1003 denotes bits remaining after excluding the $N_{UL,hop}$ hopping bits from 1001 and is (14−$N_{UL,hop}$) bits. In other words, 14 bits in 1001 include 1002 and 1003. The bit number of $N_{UL,hop}$ hopping bits is provided based on the value indicated in the "Frequency hopping flag" field and/or the bandwidth of $N^{size}_{BWP}$. For example, the bit number of the $N_{UL,hop}$ example may be 1 bit in a case that the size of $N^{size}_{BWP}$ is smaller than a predetermined value of the number of resource blocks. The bit number of the $N_{UL,hop}$ example may be 2 bits in a case that the size of $N^{size}_{BWP}$ is equal to or greater than the predetermined value of the number of resource blocks. The predetermined value of the number of resource blocks may be fifty. Description of $N^{size}_{BWP}$ will be given later.

As described above, $N_{UL,hop}$ hoping bits are 0 bits in a case that the value of the frequency hopping flag is 0. In this case, 1003 is 1001 and has 14 bits. In a case that the value of the frequency hopping flag is 1, the bit number of the $N_{UL,hop}$ hoping bits may be provided as 1 bit or 2 bit based on whether the value of $N^{size}_{BWP}$ has exceeded a predetermined value Y of the number of resource blocks. In a case that $N^{size}_{BWP}$ is smaller than the predetermined value Y of the number of resource blocks, $N_{UL,hop}$ hoping bits may be provided as 1 bit. In a case that $N^{size}_{BWP}$ is equal to or greater than the predetermined value Y of the number of resource blocks, the $N_{UL,hop}$ hoping bits may be provided as 2 bits. In other words, 1003 has 12 bits or 13 bits.

FIG. 10(B) is an example illustrating an example in which bits of the 'Msg3 PUSCH frequency resource allocation' field are truncated in a case that $N^{size}_{BWP}$ is smaller than or equal to a predetermined value X of the number of resource blocks.

In FIG. 10(B), the terminal apparatus 1 truncates the bits of the Msg3 PUSCH frequency resource assignment by b bits from the least significant bit (LSB) in a case that $N^{size}_{BWP}$ is smaller than or equal to the predetermined value X of the number of resource blocks. In other words, b bits are the number of bits to be truncated. The value of b is calculated by (Expression 1) b=Ceiling($\log_2$($N^{size}_{BWP}$ ($N^{size}_{BWP}$+1)/2)). Here, the function Ceiling(A) outputs a minimum integer that is not less than A. The Msg3 PUSCH frequency resource assignment to be truncated may be referred to as resource block assignment to be truncated. The terminal apparatus 1 may interpret the resource block assignment to be truncated in accordance with a typical rule for the DCI format 0_0.

In FIG. 10(B), 1004 denotes Msg3 PUSCH frequency resource assignment having 14 bits. 1005 denotes $N_{UL,hop}$ hopping bits. 1006 denotes bits other than the $N_{UL,hop}$ hopping bits in the Msg3 PUSCH frequency resource assignment. 1008 denotes the resource block assignment to be truncated. The bit number of 1008 is b bits. The bit number of 1007 is 14−b.

FIG. 10(C) is a diagram illustrating an example in which bits of the 'Msg3 PUSCH frequency resource allocation' field are inserted in a case that the bandwidth of $N^{size}_{BWP}$ is greater than the predetermined value X of the number of resource blocks.

In FIG. 10(C), 1009 denotes Msg3 PUSCH frequency resource assignment having 14 bits. 1010 denotes $N_{UL,hop}$ hopping bits. 1012 denotes bits remaining after excluding $N_{UL,hop}$ hopping bits from the Msg3 PUSCH frequency resource assignment. The bit number of 1012 is (14−$N_{UL,hop}$) bits. In a case that $N^{size}_{BWP}$ is greater than the predetermined value X of the number of resource blocks, the terminal apparatus 1 inserts b most significant (MSB) bits set to the value '0' after the $N_{UL,hop}$ hopping bits in the Msg3 PUSCH frequency resource assignment. In other words, b bits represent the number of bits to be inserted. The value of b is calculated by (Expression 2) b=(Ceiling($\log_2$ ($N^{size}_{BWP}$($N^{size}_{BWP}$+1)/2))−Z). The value of Z may be 14. The Msg3 PUSCH frequency resource assignment into which the b bits are inserted may be referred to as a resource block assignment to be expanded. The terminal apparatus 1 may interpret the resource block assignment to be expanded in accordance with a typical rule for the DCI format 0_0. In FIG. 10(C), the bit number of 1011 is b bits. 1009 denotes the expanded resource block assignment. The bit number of 1009 is a sum of 14 bits of the Msg3 PUSCH frequency resource assignment and b bits.

As described above, an initial BWP including at least one DL BWP and one UL BWP is configured for the terminal apparatus 1. Further, a maximum of four additional BWPs are configured for the terminal apparatus 1. Also, the size ($N^{size}_{BWP}$) of each UL BWP configured for the terminal apparatus 1 may be different. The size $N^{size}_{BWP}$ of the UL BWP is the number of resource blocks indicating the bandwidth of the corresponding UL BWP. In a case that resource allocation is specified, the terminal apparatus 1 fixes the UL BWP to which the resource assignment is applied first and then determines resource allocation in the fixed UL BWP.

The terminal apparatus 1 determines the UL BWP to which the resource assignment is applied in a case that bits are truncated or inserted with respect to the Msg3 PUSCH frequency resource assignment. In other words, the terminal apparatus 1 determines $N^{size}_{BWP}$ indicating the bandwidth of the UL BWP used in a case that bits are truncated or inserted with respect to the Msg3 PUSCH frequency resource assignment, based on the UL BWP to which the resource assignment is applied.

Hereinafter, the determination method of $N^{size}_{BWP}$ indicating the bandwidth of the UL BWP (UL BWP as a target of interpretation) to which the resource assignment in the present embodiment will be described. The base station apparatus 3 determines $N^{size}_{BWP}$ in the random access procedure, generates the RIV using the determined $N^{size}_{BWP}$, fixes the bit sequence to be included in the field of the frequency resource assignment, and transmits the PUSCH frequency resource assignment to the terminal apparatus 1.

As described above, the terminal apparatus 1 monitors the DCI format to which the CRC scrambled with RA-RNTI or TC-RNTI is added in the search space (type1-PDCCH common search space set) for the random access procedure. The terminal apparatus 1 receives a random access response by monitoring the DCI format to which the CRC scrambled with the RA-RNTI is applied in the search space set. The configuration information of the CORESET for the type1-PDCCH common search space set is indicated for the terminal apparatus 1.

According to an aspect of the present embodiment, in the contention-based random access procedure, the terminal apparatus 1 may determine, as a UL BWP to which the resource assignment is applied, a UL BWP with the same BWP identifier as that of the DL BWP for which the configuration information of the CORESET associated with the search space (type1-PDCCH common search space set) for the random access procedure has been configured. In other words, in the contention-based random access procedure, $N^{size}_{BWP}$ is the number of resource blocks indicating the bandwidth of the UL BWP with the same BWP identifier as the DL BWP for which the configuration information of the CORESET associated with the type1-PDCCH common search space set has been configured. Also, bits are truncated or inserted with respect to the Msg3 PUSCH frequency resource assignment using the terminal apparatus 1, the determined $N^{size}_{BWP}$. Bits of the resource block assignment to be truncated or of the resource block assignment to be expanded indicates the value of RIV. The terminal apparatus 1 can calculate $RB_{start}$ and $L_{RBs}$ using determined $N^{size}_{BWP}$ as $N^{size}_{BWP}$ in FIG. 12(A). $RB_{start}$ calculated from the value of RIV indicates the start position of the resource allocated with reference to the physical resource block index 0 of the UL BWP to which the resource assignment is applied. In other words, numbering of the resource allocation indicated by the RAR UL grant starts in an ascending order from the physical resource block index 0 (the lowest number of the physical resource block of the UL BWP to which the resource assignment is applied) corresponding to the UL BWP to which the resource assignment is applied.

According to an aspect of the present embodiment, in the contention-based random access procedure, the terminal apparatus 1 determines either the initial UL BWP or the active UL BWP as the UL BWP to which the resource assignment is applied, based on whether the DL BWP for which the configuration information of the CORESET associated with the type1-PDCCH common search space set has been configured is the initial DL BWP. In a case that the DL BWP for which the configuration information of the CORESET associated with the type1-PDCCH common search space set has been configured is the initial DL BWP, for example, the terminal apparatus 1 may determine the initial UL BWP as the UL BWP to which the resource assignment is applied. Also, in a case that the DL BWP for which the configuration information of the CORESET associated with the type1-PDCCH common search space set has been configured is not the initial DL BWP, the terminal apparatus 1 may determine the active UL BWP as the UL BWP to which the resource assignment is applied. $N^{size}_{BWP}$ is the number of resource blocks indicating the bandwidth of the UL BWP. In addition, bits are truncated or inserted with respect to the Msg3 PUSCH frequency resource assignment using $N^{size}_{BWP}$ that is the bandwidth of the UL BWP determined to be the UL BWP to which the terminal apparatus 1, the resource assignment are applied.

According to an aspect of the present embodiment, in the contention-based random access procedure, the terminal apparatus 1 determines either the initial UL BWP or the active UL BWP as the UL BWP to which the resource assignment is applied, based on whether the CORESET associated with the type1-PDCCH common search space set is the common CORESET. In a case that the CORESET associated with the type1-PDCCH common search space set is the common CORESET, for example, the terminal apparatus 1 may determine the initial UL BWP as the UL BWP to which the resource assignment is applied. In a case that the CORESET associated with the type1-PDCCH common search space set is not the common CORESET, the terminal apparatus 1 may determine the active UL BWP as the UL BWP to which the resource assignment is applied. $N^{size}_{BWP}$ is the number of resource blocks indicating the bandwidth of the UL BWP to which the resource assignment is applied. Also, bits are truncated or inserted with respect to the Msg3 PUSCH frequency resource assignment using the terminal apparatus 1, the determined $N^{size}_{BWP}$.

According to an expansion of the aforementioned aspect, in the contention-based random access procedure, the terminal apparatus 1 determines either the initial UL BWP or the active UL BWP as the UL BWP to which the resource assignment is applied, based on whether the CORESET associated with the type1-PDCCH common search space set is CORESET#0. In a case that the CORESET associated with the type1-PDCCH common search space set is CORESET#0, for example, the terminal apparatus 1 may determine the initial UL BWP as the UL BWP to which the resource assignment is applied. In a case that the CORESET associated with the type1-PDCCH common search space set is not CORESET#0, the terminal apparatus 1 may determine the active UL BWP as the UL BWP to which the resource assignment is applied. In a case that the CORESET associated with the type1-PDCCH common search space set is an additional common CORESET, the terminal apparatus 1 may determine the UL BWP with the same BWP identifier as the DL BWP for which the additional common CORESET has been configured as the UL BWP to which the resource assignment is applied. In other words, in a case that the terminal apparatus 1, the additional common CORESET have been configured for the initial DL BWP, the initial UL BWP may be determined to be the UL BWP to which the resource assignment is applied. In a case that the terminal apparatus 1, the additional common CORESET have been configured for the additional DL BWP, the UL BWP with the same BWP identifier as the additional DL BWP may be determined to be the UL BWP to which the resource assignment is applied.

According to an aspect of the present embodiment, in the contention-based random access procedure, the terminal apparatus 1 may always determine the initial UL BWP as the UL BWP to which the resource assignment is applied. In other words, $N^{size}_{BWP}$ is the number of resource blocks indicating the bandwidth of the initial UL BWP in the contention-based random access procedure. Also, bits are truncated or inserted with respect to the Msg3 PUSCH frequency resource assignment using the terminal apparatus 1, the determined $N^{size}_{BWP}$. Bits of the resource block assignment to be truncated or of the resource block assignment to be expanded indicates the value of RIV. The terminal apparatus 1 fixes that the RIV is to be generated using determined $N^{size}_{BWP}$ as $N^{size}_{BWP}$ in FIG. 12(A). The RIV is generated from $RB_{start}$ and $L_{RBs}$, and the terminal apparatus 1 acquires $RB_{start}$ and $L_{RBs}$ from the RIV. $RB_{start}$ indicates the start position of the resource allocated with reference to the physical resource block index 0 corresponding to the initial UL BWP. In other words, numbering of the resource allocation indicated by the RAR UL grant starts from the physical resource block index 0 (the lowest number of the physical resource block of the UL BWP to which the resource assignment is applied) corresponding to the initial UL BWP.

According to an aspect of the present embodiment, in the non-contention-based random access procedure, the terminal apparatus 1 may always determine the active UL BWP as the UL BWP to which the resource assignment is applied. In other words, in the non-contention-based random access procedure, $N^{size}_{BWP}$ is the number of resource blocks indicating the bandwidth of the active UL BWP. Also, bits are truncated or inserted with respect to the Msg3 PUSCH frequency resource assignment using the terminal apparatus 1, the determined $N^{size}_{BWP}$. Bits of the resource block assignment to be truncated or of the resource block assignment to be expanded indicates the value of RIV. The terminal apparatus 1 fixes that the RIV is to be generated using determined $N^{size}_{BWP}$ as $N^{size}_{BWP}$ in FIG. 12(A). The RIV is generated from $RB_{start}$ and $L_{RBs}$, and the terminal apparatus 1 acquires $RB_{start}$ and $L_{RBs}$ from the RIV. $RB_{start}$ indicates the start position of the allocation resource with reference to the physical resource block index 0 corresponding to the active UL BWP. In other words, numbering of the resource allocation indicated by the RAR UL grant starts from the physical resource block index 0 (the lowest number of the physical resource block of the UL BWP to which the resource assignment is applied) corresponding to the active UL BWP.

In view of the example described above, in the contention-based random access procedure, the size of the initial UL BWP is used for $N^{size}_{BWP}$ in FIG. 12(A) for a case in which the DCI format 1_0 that schedules the PDSCH (DL-SCH transport block) including the RAR UL grant indicating resource block assignment information is detected in the common search space (for example, the type1-PDCCH common search space) in CORESET#0 (or the additional common CORESET configured for the initial DL BWP). Here, the DCI format 1_0 is the DCI format 1_0 to which the CRC parity bit scrambled with corresponding RA-RNTI.

According to the aforementioned aspect, in the non-contention-based random access procedure, the terminal apparatus 1 determines the active UL BWP as the UL BWP to which the resource assignment is applied, regardless of whether the CORESET associated with the type1-PDCCH common search space set is the common CORESET. Also, in the non-contention-based random access procedure, the terminal apparatus 1 determines the active UL BWP as the UL BWP to which the resource assignment is applied, regardless of whether the DL BWP for which configuration information of the CORESET associated with the type1-PDCCH common search space set has been configured is the initial DL BWP.

In other words, the terminal apparatus 1 determines either the initial UL BWP or the active UL BWP as the UL BWP ($N^{size}_{BWP}$) to which the resource assignment is applied, based on which of the contention-based random access procedure and the non-contention-based random access procedure the random access procedure is. In a case that the random access procedure is the contention-based random access procedure, for example, the terminal apparatus 1 may determine the initial UL BWP as the UL BWP to which the resource assignment is applied. Also, $N^{size}_{BWP}$ is the number of resource blocks indicating the bandwidth of the initial UL BWP. In a case that the random access procedure is the non-contention-based random access procedure, the terminal apparatus 1 may determine the active UL BWP as the UL BWP to which the resource assignment is applied. $N^{size}_{BWP}$ is the number of resource blocks indicating the bandwidth of the active UL BWP.

The bit number of $N_{UL,hop}$ hopping bits may be provided by 1 bit or 2 bits, based on whether the size ($N^{size}_{BWP}$) of the UL BWP to which the resource assignment is applied has exceeded the predetermined value Y of the number of resource blocks. In other words, $N^{size}_{BWP}$ may be $N^{size}_{BWP}$ indicating the bandwidth of the UL BWP, to which the resource assignment is applied, which is determined according to the aforementioned aspect. In other words, in a case that $N^{size}_{BWP}$ is smaller than the predetermined value Y of the number of resource blocks, $N_{UL,hop}$ hopping bits may be provided as 1 bit. The second hop frequency offset for PUSCH transmission of the message 3 is $Floor(N^{size}_{BWP}/2)$ or $Floor(N^{size}_{BWP}/4)$. In a case that $N^{size}_{BWP}$ is equal to or greater than the predetermined value Y of the number of resource blocks, $N_{UL,hop}$ hopping bits may be provided as 2 bits. The second hop frequency offset for PUSCH transmission of the message 3 is $Floor(N^{size}_{BWP}/2)$, $Floor(N^{size}_{BWP}/4)$, or $-Floor(N^{size}_{BWP}/4)$.

As described above, resource block numbering (RB indexing) of the resource allocation (uplink type0 and/or type1 resource allocation) is determined in the UL BWP, which indicates the resource allocation, to which the resource assignment is applied. Specifically, in a case that a bandwidth part (BWP) indicator field has not been configured in the DCI format, the RB numbering of the resource allocation is determined in the active BWP of the terminal apparatus 1. However, even in a case that the bandwidth part (BWP) indicator field has not been configured in the DCI format, the RB numbering of the resource allocation is determined in the initial UL BWP for the DCI format 0_0 detected in an arbitrary common search space set in CORESET#0 (or the additional common CORESET configured for the initial DL BWP). In other words, even in the case in which the bandwidth part (BWP) indicator field has not been configured in the DCI format, the RB numbering of the resource allocation is determined in the initial UL BWP for the DCI format 0_0 detected in the arbitrary common search space set in the CORESET configured for the initial DL BWP. Also, even in the case in which the bandwidth part (BWP) indicator field has not been configured in the DCI format, the RB numbering of the resource allocation is determined in the active BWP for the DCI format 0_0 detected in an arbitrary common search space set in the CORESET configured for the active BWP.

In a case that the bandwidth part (BWP) indicator field has been configured in the DCI format, the RB numbering of the resource allocation is determined in the BWP indicated in the BWP indicator field. However, even in the case in which the bandwidth part (BWP) indicator field has been configured in the DCI format, the RB numbering of the resource allocation is determined in the initial UL BWP for the DCI format 0_0 detected in an arbitrary common search space set in CORESET#0 (or the additional common CORESET configured for the initial DL BWP). The terminal apparatus 1 fixes the UL BWP to which the resource assignment is applied first and then determines resource allocation in the fixed UL BWP at the time of detection of the PDCCH for the terminal apparatus 1.

The RB numbering of the uplink type1 resource allocation may be determined in the active BWP of the terminal apparatus 1 for the RAR UL grant. In the contention-based random access procedure, the RB numbering of the resource allocation indicated by the RAR UL grant is determined in the initial UL BWP of the terminal apparatus 1. In other words, in the contention-based random access procedure, the RB numbering of the resource allocation in the frequency direction in the PUSCH scheduled by the RAR UL grant (MAC RAR) is determined in the initial UL BWP of the terminal apparatus 1. Also, in the non-contention-based random access procedure, the RB numbering of the resource allocation indicated by the RAR UL grant is determined in the active UL BWP of the terminal apparatus 1. In other words, in the non-contention-based random access procedure, the RB numbering of the resource allocation in the frequency direction in the PUSCH scheduled by the RAR UL GRANT (MAC RAR) is determined in the active UL BWP of the terminal apparatus 1.

Also, in the contention-based random access procedure, the RB numbering of the resource allocation indicated by the RAR UL grant may be determined in the initial UL BWP of the terminal apparatus 1 in a case that the DCI format 1_0 that schedules the PDSCH (DL-SCH transport block) including the RAR UL grant is detected in the common search space (for example, the type1-PDCCH common search space) in CORESET#0. Here, the DCI format 1_0 is the DCI format 1_0 to which the CRC parity bit scrambled with corresponding RA-RNTI. Also, in the contention-based random access procedure, the RB numbering of the resource allocation indicated by the RAR UL grant may be determined in the active UL BWP of the terminal apparatus 1 in a case that the DCI format 1_0 that schedules the PDSCH (DL-SCH transport block) including the RAR UL grant is detected in the common search space (for example, the type1-PDCCH common search space) in the additional common CORESET (or the CORESET other than CORESET#0). However, the RB numbering of the resource allocation indicated by the RAR UL grant may be determined in the initial UL BWP of the terminal apparatus 1 in a case that the DCI format 1_0 that schedules the PDSCH (DL-SCH transport block) including the RAR UL grant is detected in the common search space (for example, the type1-PDCCH common search space) in the additional common CORESET configured for the initial DL BWP.

Also, the RB numbering of the resource allocation is determined by the UL BWP to which the RAR UL grant (the resource block assignment included in the RAR UL grant) is applied for the DCI format 0_0 that schedules retransmission of the Msg3 PUSCH. The DCI format 0_0 that schedules the retransmission of the Msg3 PUSCH is scrambled with TC-RNTI. The DCI format 0_0 does not include the BWP indicator field.

Message 3 (S803)

The terminal apparatus 1 performs PUSCH transmission of the message 3 based on the RAR UL grant included in the RAR message received in S802. In the PUSCH corresponding to the transmission of the message 3, a corresponding preamble is transmitted in the serving cell transmitted in the PRACH. Specifically, the PUSCH corresponding to the transmission of the message 3 is transmitted in the active UL BWP.

Retransmission of Message 3 (S803a)

Retransmission of the message 3 is scheduled by the DCI format 0_0 to which the CRC parity bit scrambled with TC-RNTI included in the RAR message is added. In other words, the PUSCH retransmission of the transport block transmitted in the PUSCH corresponding to the RAR UL grant included in the RAR message is scheduled by the DCI format 0_0 to which the CRC parity bit scrambled with TC-RNTI is added. The DCI format 0_0 is transmitted in the PDCCH of the type1-PDCCH common search space set. In other words, the terminal apparatus 1 may monitor the DCI format 0_0 that schedules the retransmission of the message 3 after transmitting the message 3 in S803. In S803a, in a case that the terminal apparatus 1 detects the DCI format 0_0 that schedules the retransmission of the message 3, then S803b is executed.

A frequency domain resource assignment field is included in the DCI format 0_0 that schedules the retransmission of the message 3. The bits of the field are provided based on the initial UL BWP. Specifically, the number of bits of the field is calculated by (Expression 4) Ceiling($\log_2(N^{UL,BWP}_{RB} (N^{UL,BWP}_{RB}+1)/2)$). Here, $N^{UL,BWP}_{RB}$ is the number of resource blocks indicating the bandwidth of the initial UL BWP. In other words, regardless of which of one or a plurality of UL BWP configured for the terminal apparatus 1 the resource for retransmitting the message 3 is tried to be scheduled with, the number of bits of the frequency domain resource assignment field is a fixed value (same value) based on the bandwidth of the initial UL BWP.

In one example, $N^{UL,BWP}_{RB}$ may be provided based on the type of the random access procedure. For example, $N^{UL,BWP}_{RB}$ is the number of resource blocks indicating the bandwidth of the initial UL BWP in the contention-based random access procedure. For example, $N^{UL,BWP}_{RB}$ is the number of resource blocks indicating the bandwidth of the active UL BWP in the non-contention-based random access procedure.

The terminal apparatus 1 needs to perform interpretation to adapt the bits of the frequency domain resource assignment field based on the initial UL BWP to the bandwidth of the UL BWP to which the frequency domain resource assignment (frequency domain resource assignment field) is applied. As described above, the terminal apparatus 1 determines the UL BWP to which the Msg3 PUSCH frequency resource assignment is applied in a case that the terminal apparatus 1 truncates or inserts bits for the Msg3 PUSCH frequency resource assignment. Here, the UL BWP to which the frequency domain resource assignment field included in the DCI format 0_0 is applied may be determined by the same determination method as that described above for the UL BWP to which the Msg3 PUSCH frequency resource assignment is applied. In other words, the UL BWP to which the frequency domain resource assignment included in the DCI format 0_0 is applied may be the UL BWP to which the Msg3 PUSCH frequency resource assignment is applied. In other words, the terminal apparatus 1 may specify resource block allocation in the frequency direction in the PUSCH for the UL BWP to which the Msg3 PUSCH frequency resource assignment is applied, based on the value of the RIV indicated in the frequency domain resource assignment field.

In a case that the UL BWP to which the Msg3 PUSCH frequency resource assignment is applied is the initial UL BWP (or the initial active UL BWP), for example, the UL BWP to which the frequency domain resource assignment field included in the DCI format 0_0 is applied is the initial UL BWP. The base station apparatus 3 generates the RIV using the size of the initial UL BWP to which the resource assignment is applied, fixes the bit sequence to be included in the field of the frequency resource assignment, and transmits the bit sequence to the terminal apparatus 1. Then, the terminal apparatus 1 specifies the resource allocation in the frequency direction in the PUSCH of the physical resource block of the UL BWP (initial UL BWP) to which the resource assignment is applied, regardless of which of the UL BWPs the actually activated UL BWP is. The terminal apparatus 1 can specify $RB_{start}$ and $L_{RBs}$ corresponding to the physical resource block of the initial BWP using FIG. 12(A). Here, $N^{size}_{BWP}$ in FIG. 12(A) is a resource block indicating the bandwidth of the initial UL BWP. In other words, the value of the RIV indicated in the frequency domain resource assignment field is provided based on the size of the initial UL BWP to which the resource assignment is applied and $RB_{start}$ and $L_{RBs}$ corresponding to the resource block of the initial UL BWP. $RB_{start}$ is the number of resource blocks indicating the start position of the resource allocation with reference to the physical resource block index 0 of the initial BWP UL. $L_{RBs}$ cannot exceed the number of resource blocks indicating the bandwidth of the initial UL BWP. In other words, the numbering of the resources indicated in the frequency domain resource assignment field starts from the smallest number of the physical resource block of the initial UL BWP.

In view of the example described above, the size of the initial UL BWP is used for $N^{size}_{BWP}$ in FIG. 12(A) for a case in which the DCI format 0_0 is detected in the type-1 PDCCH common search space set in the CORESET#0 or the additional common CORESET configured for the initial DL BWP. Here, the DCI format 0_0 may be monitored by the CSS. In other words, the terminal apparatus 1 specifies resource block allocation in the frequency direction of the initial UL BWP even in a case that the activated UL BWP (the UL BWP with which uplink data is transmitted) is not the initial UL BWP. The value of the resource block offset between the physical resource block index 0 of the initial UL BWP and the physical resource block index 0 of the active UL BWP is provided by a higher layer parameter locationAndBandwidth configured for each BWP. Also, the size of the initial UL BWP is used for $N^{size}_{BWP}$ in FIG. 12(A) for a case in which the DCI format 0_0 is detected in an arbitrary common search space set in CORESET#0 or the additional common CORESET configured for the initial DL BWP.

In a case that the UL BWP to which the Msg3 PUSCH frequency resource assignment is applied is the active UL BWP, for example, the UL BWP to which the frequency domain resource assignment field included in the DCI format 0_0 is applied is the active UL BWP. The base station apparatus 3 generates the RIV using the size of the active UL BWP to which the resource assignment is applied, fixes the bit sequence to be included in the field of the frequency resource assignment, and transmits the bit sequence to the terminal apparatus 1. Then, the terminal apparatus 1 specifies resource allocation in the frequency direction in the PUSCH of the active UL BWP to which the frequency domain resource assignment is applied. In a case that the active UL BWP is not the initial active UL BWP, the terminal apparatus 1 can specify $RB_{start}$ and $L_{RBs}$ corresponding to the physical resource block of the active UL BWP by using the method of FIG. 12(B). In this case, $N^{initial}_{BWP}$ in FIG. 12(B) is the number of resource blocks indicating the bandwidth of the initial UL BWP. $N^{active}_{BWP}$ is the number of resource blocks indicating the bandwidth of the active UL BWP. The value of the RIV is provided based on the number $N^{initial}_{BWP}$ of resource blocks indicating the bandwidth of the initial BWP, the start position $RB'_{start}$ of the resource blocks, and the number of $L'_{RBs}$ of the resource blocks continuously allocated. $RB_{start}$ is the number of resource blocks indicating the start position of the resource allocation with reference to the physical resource block index 0 of the active UL BWP. In other words, numbering of the resources indicated in the frequency domain resource assignment field is started from the lowest number of the physical resource block of the active UL BWP.

In the view of the example described above, the method in FIG. 12(B) may be applied to the case in which although the size of the DCI format 0_0 in the CSS (the arbitrary common search space set or the type-1 PDCCH common search space set) (or the size of the frequency domain resource assignment field included in the DCI format) is derived from the size of the initial UL BWP, the UL BWP to which the resource assignment of the Msg3 PUSCH frequency resource assignment field is applied is the active UL BWP. In other words, the method in FIG. 12(B) may be applied to the case in which although the size of the DCI format 0_0 in the CSS (or the size of the frequency domain resource assignment field included in the DCI format) is derived from the size of the initial UL BWP, the size of the DCI format 0_0 (or the size of the frequency domain resource assignment field included in the DCI format) is applied to another active UL BWP (the activated UL BWP other than the initial UL BWP). Here, the CSS is a CSS associated with the CORESET other than CORESET#0 and the additional common CORESET configured for the initial DL BWP. In other words, the CSS is a CSS associated with the CORESET configured for the DL BWP other than the initial DL BWP. Here, the DCI format 0_0 may be scrambled with TC-RNTI. In other words, the method in FIG. 12(B) may be applied to the case in which although the DCI format is derived from the size of the initial UL BWP, the UL BWP to which the DCI format is applied is another active UL BWP, and the search space set in the DCI format is the common search space set associated with the CORESET configured for the BWP other than the initial DL BWP or the UE-specific search space set.

As described above, the number of bits in the frequency domain resource assignment field included in the DCI format 0_0 is provided by $N^{UL,BWP}_{RB}$ indicating the bandwidth of the initial UL BWP. The number of bits of $N_{UL,hop}$ hopping bits included in the frequency domain resource assignment field may be provided by 1 bit or 2 bits based on whether or not $N^{UL,BWP}_{RB}$ has exceeded the predetermined value Y of the number of resource blocks. The number of bits of $N_{UL,hop}$ hopping bits included in the frequency domain resource assignment field may be provided by 1 bit or 2 bits based on whether or not $N^{size}_{BWP}$ has exceeded the predetermined value Y of the number of resource blocks. Here, $N^{size}_{BWP}$ is the number of resource blocks indicating the bandwidth of the UL BWP to which the frequency domain resource assignment field is applied. In other words, in a case that $N^{size}_{BWP}$ is smaller than the predetermined value Y of the number of resource blocks, $N_{UL,hop}$ hopping bits may be provided as 1 bit. The second hop frequency offset for the PUSCH transmission of the message 3 is Floor($N^{size}_{BWP}/2$) or Floor($N^{size}_{BWP}/4$). In a case that $N^{size}_{BWP}$ is equal to or greater than the predetermined value Y of the number of resource blocks, $N_{UL,hop}$ hopping bits may be provided as 2 bits. The second hop frequency offset for the PUSCH transmission of the message 3 is Floor($N^{size}_{BWP}/2$), Floor($N^{size}_{BWP}/4$), or −Floor($N^{size}_{BWP}/4$).

Retransmission of Message 3 (S803b)

In S803a, in a case that the DCI format 0_0 to which the CRC parity bit scrambled with TC-RNTI is added is detected, then the terminal apparatus 1 performs PUSCH retransmission of the transport block transmitted in S803.

Message 4 (S804)

In order to respond to the PUSCH transmission of the message 3, the terminal apparatus 1 for which the C-RNTI is not indicated monitors the DCI format 1_0 scheduling the PDSCH including UE collision resolution identity (UE contention resolution identity). Here, a CRC parity bit scrambled with corresponding TC-RNTI is added to the DCI format 1_0. In order to respond to the PDSCH reception with UE collision resolution identity, the terminal apparatus 1 transmits HARQ-ACK information in the PUCCH. The PUCCH transmission may be performed by an active UL BWP to which the message 3 is transmitted.

In this manner, the terminal apparatus 1 that performs the random access procedure can perform uplink data transmission to the base station apparatus 3.

Hereinafter, configurations of apparatuses according to the present embodiment will be described.

Figure 15:
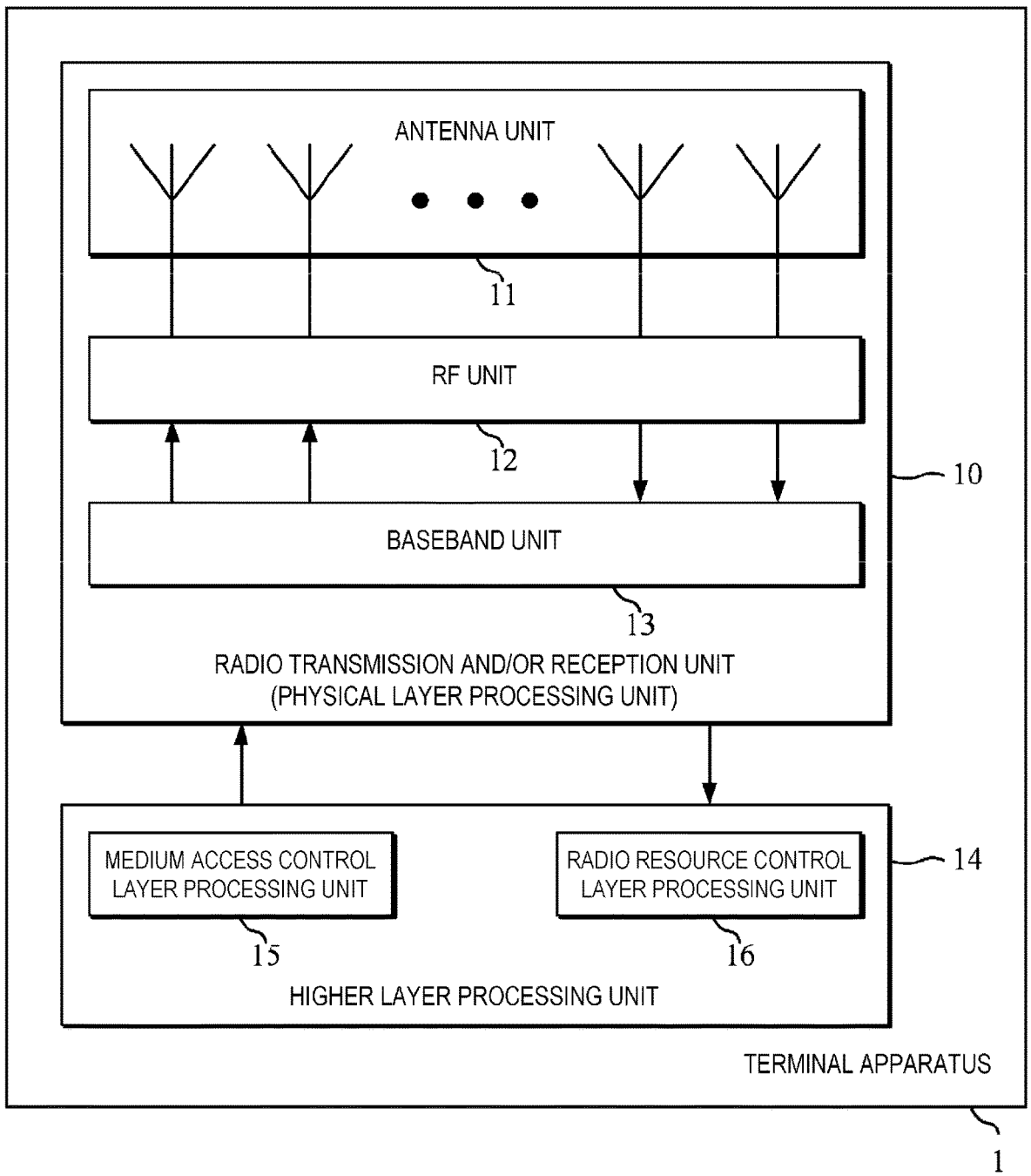
FIG. 15 is an overview block diagram illustrating a configuration of the terminal apparatus 1 according to the embodiment of the present invention.

FIG. 15 is an overview block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a radio frequency (RF) unit 12, and a baseband unit 13. The higher layer processing unit 14 is configured to include a medium access control layer processing unit 15 and a radio resource control layer processing unit 16. The radio transmission and/or reception unit 10 will also be referred to as a transmission unit, a reception unit, a monitoring unit, or a physical layer processing unit. The higher layer processing unit 14 will also be referred to as a measurement unit, a selection unit, or a control unit 14.

The higher layer processing unit 14 outputs uplink data (which may also be referred to as a transport block) generated through a user operation or the like to the radio transmission and/or reception unit 10. The higher layer processing unit 14 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 14 may have a function of selecting one reference signal from one or a plurality of reference signals based on measurement values of the reference signals. The higher layer processing unit 14 may have the function of selecting a PRACH occasion associated with the selected one reference signals from one or a plurality of PRACH occasions. The higher layer processing unit 14 may have a function of specifying one index from one or a plurality of indexes configured in a higher layer (for example, an RRC layer) and sets the specified index as a preamble index in a case that bit information included in information received by the radio transmission and/or reception unit 10 and indicating an initiation of the random access procedure is a predetermined value. The higher layer processing unit 14 may have a function of specifying an index associated with the selected reference signal and setting the specified index to the preamble index among one or a plurality of indexes configured in the RRC. The higher layer processing unit 14 may have a function of determining a next available PRACH occasion based on the received information (for example, SSB index information and/or mask index information). The higher layer processing unit 14 may have a function of selecting an SS/PBCH block based on the received information (for example, SSB index information).

The medium access control layer processing unit 15 included in the higher layer processing unit 14 performs processing for the medium access control layer (MAC layer). The medium access control layer processing unit 15 controls transmission of a scheduling request based on various types of configuration information/parameters managed by the radio resource control layer processing unit 16.

The radio resource control layer processing unit 16 included in the higher layer processing unit 14 performs processing for the radio resource control layer (RRC layer). The radio resource control layer processing unit 16 manages various types of configuration information/parameters of the terminal apparatus 1 itself. The radio resource control layer processing unit 16 sets various types of configuration information/parameters based on a higher layer signal received from the base station apparatus 3. In other words, the radio resource control layer processing unit 16 sets the various types of configuration information/parameters based on information indicating various types of configuration information/parameters received from the base station apparatus 3. The radio resource control layer processing unit 16 controls (specifies) resource allocation based on downlink control information received from the base station apparatus 3.

The radio transmission and/or reception unit 10 performs processing, such as modulation, demodulation, coding, and decoding, for the physical layer. The radio transmission and/or reception unit 10 separates, demodulates, and decodes a signal received from the base station apparatus 3 and outputs the decoded information to the higher layer processing unit 14. The radio transmission and/or reception unit 10 generates a transmission signal by modulating and coding data and transmits the transmission signal to the base station apparatus 3. The radio transmission and/or reception unit 10 may have a function of receiving one or a plurality of reference signals in a certain cell. The radio transmission and/or reception unit 10 may have a function of receiving information specifying one or a plurality of PRACH occasions (for example, SSB index information and/or mask index information). The radio transmission and/or reception unit 10 may have a function of receiving a signal including indication information indicating an initiation of a random access procedure. The radio transmission and/or reception unit 10 may have a function of receiving information for receiving information specifying a predetermined index. The radio transmission and/or reception unit 10 may have a function of receiving information specifying an index of the random access preamble. The radio transmission and/or reception unit 10 may have a function of transmitting the random access preamble on the PRACH occasion determined by the higher layer processing unit 14.

The RF unit 12 converts (down-converts) a signal received via the antenna unit 11 into a baseband signal through orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 generates an OFDM symbol by performing Inverse Fast Fourier Transform (IFFT) on data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 using a low-pass filter, up-converts the analog signal into a signal with a carrier frequency, and transmits the up-converted signal via the antenna unit 11. Also, the RF unit 12 amplifies a power. In addition, the RF unit 12 may include a function to determine a transmission power of an uplink signal and/or an uplink channel transmitted in a serving cell. The RF unit 12 will also be referred to as a transmit power control unit.

Figure 16:
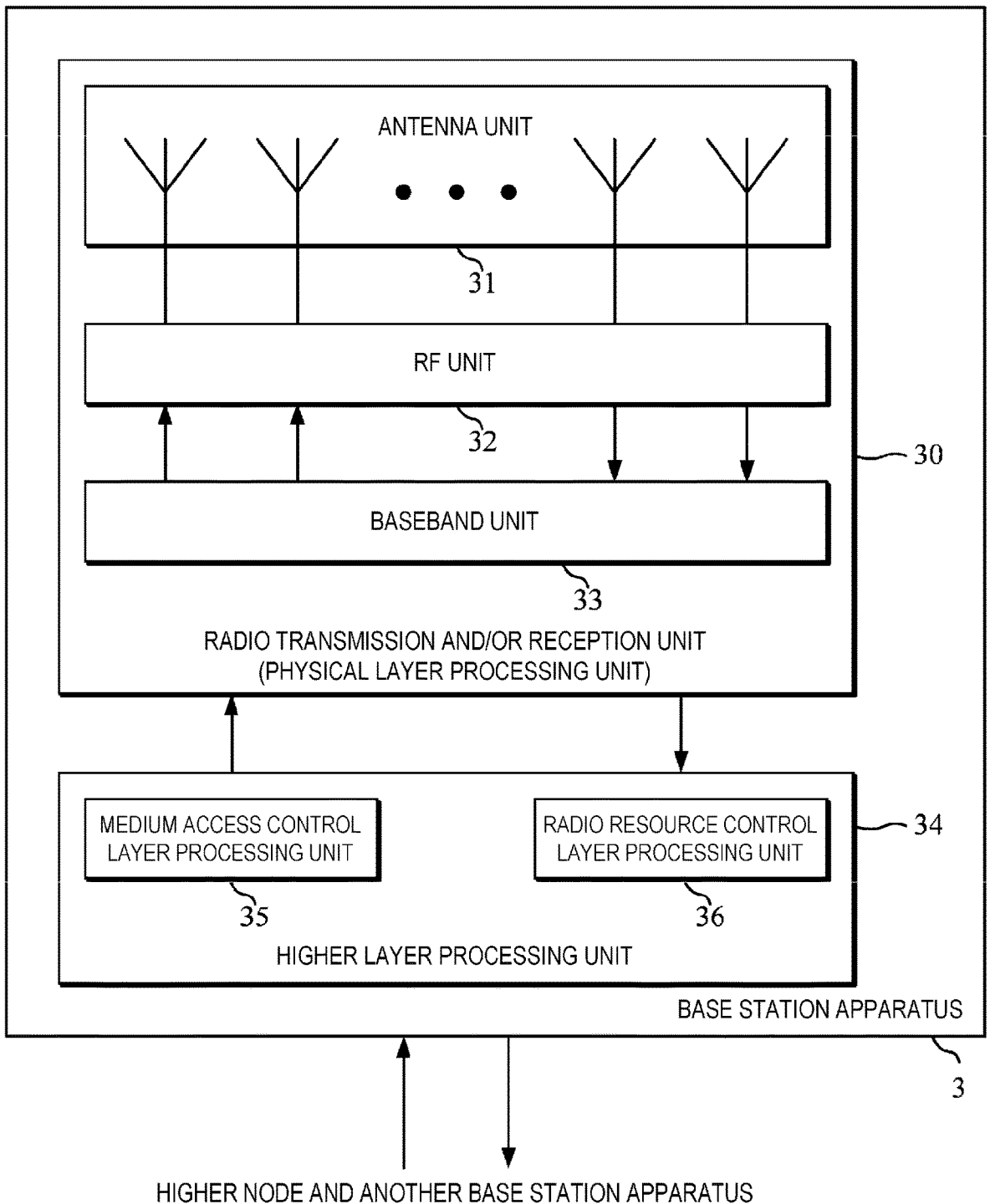
FIG. 16 is an overview block diagram illustrating a configuration of a base station apparatus 3 according to the embodiment of the present invention.

FIG. 16 is an overview block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 will also be referred to as a transmission unit, a reception unit, a monitoring unit, or a physical layer processing unit. A control unit configured to control operations of each component based on various conditions may separately be provided. The higher layer processing unit 34 will also be referred to as a control unit 34.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 may have a function of specifying one reference signal from one or a plurality of reference signals based on random access preamble received by the radio transmission and/or reception unit 30. The higher layer processing unit 34 may specify a PRACH occasion of monitoring the random access preamble at least from SSB index information and mask index information.

The medium access control layer processing unit 35 included in the higher layer processing unit 34 performs processing for the MAC layer. The medium access control layer processing unit 35 performs processing associated with a scheduling request based on various types of configuration information/parameters managed by the radio resource control layer processing unit 36.

The radio resource control layer processing unit 36 included in the higher layer processing unit 34 performs processing for the RRC layer. The radio resource control layer processing unit 36 generates downlink control information (an uplink grant and a downlink grant) including resource allocation information in the terminal apparatus 1. The radio resource control layer processing unit 36 generates or acquires, from a higher node, downlink control information, downlink data (a transport block and a random access response) allocated in a physical downlink shared channel, system information, an RRC message, MAC Control Element (CE), and the like and outputs them to the radio transmission and/or reception unit 30. Also, the radio resource control layer processing unit 36 manages various types of configuration information/parameters for each terminal apparatus 1. The radio resource control layer processing unit 36 may set various types of configuration information/parameters for each terminal apparatus 1 via a higher layer signal. In other words, the radio resource control layer processing unit 36 transmits/broadcasts information indicating the various types of configuration information/parameters. The radio resource control layer processing unit 36 may transmit/broadcast information for specifying configuration of one or a plurality of reference signals in a certain cell.

In a case that an RRC message, a MAC CE, and/or a PDCCH is transmitted from the base station apparatus 3 to the terminal apparatus 1, and the terminal apparatus 1 performs processing based on the reception, the base station apparatus 3 performs processing (control of the terminal apparatus 1 and the system) on the assumption that the terminal apparatus is performing the processing. In other words, the base station apparatus 3 sends the terminal apparatus 1 such an RRC message, a MAC CE, and/or a PDCCH that causes the terminal apparatus to perform processing based on the reception thereof.

The radio transmission and/or reception unit 30 has a function of transmitting one or a plurality of reference signals. The radio transmission and/or reception unit 30 may have a function of receiving a signal including a beam failure recovery request transmitted from the terminal apparatus 1. The radio transmission and/or reception unit 30 may have a function of transmitting information specifying one or a plurality of PRACH occasions (for example, SSB index information and/or mask index information) to the terminal apparatus 1. The radio transmission and/or reception unit 30 may have a function of transmitting information specifying a predetermined index. The radio transmission and/or reception unit 30 may have a function of transmitting information specifying an index of the random access preamble. The radio transmission and/or reception unit 30 may have a function of monitoring the random access preamble in the PRACH occasion identified by the higher layer processing unit 34. Since some of other functions of the radio transmission and/or reception unit 30 are similar to those of the radio transmission and/or reception unit 10, description will be omitted. Note that in a case that the base station apparatus 3 is connected to one or a plurality of transmission reception points 4, some or all of the functions of the radio transmission and/or reception unit 30 may be included in each of the transmission reception points 4.

Also, the higher layer processing unit 34 transmits (transfers) or receives control messages or user data between the base station apparatuses 3 or between a higher network apparatus (MME, Serving-GW (S-GW)) and the base station apparatus 3. Although the other components of the base station apparatus 3 and transmission path of data (control information) among the components are omitted in FIG. 16, it is obvious that the base station apparatus 3 has a plurality of blocks that have other functions needed to operate as the base station apparatus 3 as components. For example, a radio resource management layer processing unit and an application layer processing unit are present in the higher layer processing unit 34. Also, the higher layer processing unit 34 may have a function of configuring a plurality of scheduling request resources that correspond to the plurality of reference signals transmitted form the radio transmission and/or reception unit 30, respectively.

Note that "units" in the drawings are elements that realize the functions and each procedure of the terminal apparatus 1 and the base station apparatus 3, which are also expressed with terms such as sections, circuits, configuring apparatuses, devices, units, and the like.

Each of the units with the reference signs 10 to 16 applied thereto included in the terminal apparatus 1 may be configured as a circuit. Each of the units with the reference signs 30 to 36 applied thereto included in the base station apparatus 3 may be configured as a circuit.

(1) More specifically, a terminal apparatus 1 according to a first aspect of the present invention includes: a receiving unit 10 configured to receive a PDSCH including an RAR message; and a control unit 16 configured to control resource allocation based on a first field indicating Msg3 PUSCH frequency resource assignment indicated by a first UL grant included in the RAR message, wherein the control unit truncates X bits from a least significant bit to bits of the first field in a case that the number of first resource blocks is smaller than or equal to a value of a predetermined number of resource blocks or inserts Y most significant bits that are set to a value '0' after a hopping bit in the bits of the first field in a case that the number of first resource blocks is greater than the value of the predetermined number of resource blocks, and the number of the first resource blocks is provided based on a type of a random access procedure.

(2) In the first aspect of the present invention, the number of first resource blocks is a number of resource blocks that indicate an active UL BWP bandwidth in a case that the type of the random access procedure is a non-contention-based random access procedure.

(3) In the first aspect of the present invention, the number of first resource blocks is a number of resource blocks that indicate an initial UL BWP bandwidth in a case that the type of the random access procedure is a contention-based random access procedure.

(4) A base station apparatus 3 according to a second aspect of the present invention includes: a control unit 36 configured to generate a first UL grant including a first field indicating Msg3 PUSCH frequency resource assignment indicating resource allocation; and a transmission unit 30 configured to transmit a PDSCH including an RAR message including the first UL grant, wherein the control unit truncates X bits from a least significant bit to bits of the first field in a case that the number of first resource blocks is smaller than or equal to a value of a predetermined number of resource blocks and inserts Y most significant bits that are set to a value '0' after a hopping bit in the bits of the first field in a case that the number of first resource blocks is greater than the value of the predetermined number of resource blocks, and the number of first resource blocks is provided based on a type of a random access procedure.

(5) In the second aspect of the present invention, the number of first resource blocks is a number of resource blocks that indicate an active UL BWP bandwidth in a case that the type of the random access procedure is a non-contention-based random access procedure.

(6) In the second aspect of the present invention, the number of first resource blocks is a number of resource blocks that indicate an initial UL BWP bandwidth in a case that the type of the random access procedure is a contention-based random access procedure.

(7) A terminal apparatus 1 that performs a contention-based random access procedure according to a third aspect of the present invention includes: a reception unit 10 configured to receive a PDSCH including an RAR message; and a control unit 16 configured to control resource allocation based on a first field indicating Msg3 PUSCH frequency resource assignment indicated by a first UL grant included in the RAR message, wherein the control unit truncates X bits from a least significant bit to bits of the first field in a case that the number of first resource blocks is smaller than or equal to a value of a predetermined number of resource blocks and inserts Y most significant bits that are set to a value '0' after a hopping bit in bits of the first field in a case that the number of first resource blocks is greater than the value of the predetermined number of resource blocks, the number of first resource blocks is a number of resource blocks indicating a UL BWP bandwidth that has the same BWP identifier as a DL BWP for which CORESET configuration information indicated by a type1-PDCCH common search space set is configured, the type1-PDCCH common search space set is a search space set used for a random access procedure, and the CORESET is time and frequency resources for searching for downlink control information.

(8) A base station apparatus 3 that communicates with a terminal apparatus 1 that performs a contention-based random access procedure according to a fourth aspect of the present invention includes: a control unit 36 configured to generate a first UL grant including a first field indicating Msg3 PUSCH frequency resource assignment indicating resource allocation; and a transmission unit 30 configured to transmit a PDSCH including an RAR message, wherein the first UL grant is included in the RAR message, the control unit truncates X bits from a least significant bit to bits of the first field in a case that the number of first resource blocks is smaller than or equal to a value of a predetermined number of resource blocks and inserts Y most significant bits that are set to a value '0' after a hopping bit in the bits of the first field in a case that the number of first resource blocks is greater than the value of the predetermined number of resource blocks, the number of first resource blocks is the number of resource blocks indicating a UL BWP bandwidth having the same BWP identifier as a DL BWP for which CORESET configuration information indicated by a type1-PDCCH common search space set is configured, the type1-PDCCH common search space set is a search space set used for a random access procedure, and the CORESET is time and frequency resources for searching for downlink control information.

(9) A terminal apparatus 1 according to a fifth aspect of the present invention includes: a reception unit 10 configured to receive a first DCI format scrambled with TC-RNTI in a search space set; and a control unit 16 configured to specify resource allocation of a PUSCH based on a second field indicating frequency domain resource assignment included in the first DCI format, wherein bits of a first field indicating Msg3 PUSCH frequency resource assignment indicated by a first UL grant included in an RAR message are truncated from a least significant bit and/or a most significant bit is inserted thereinto, based on the number of first resource blocks indicating a first UL BWP bandwidth, the size of the second field is derived from an initial UL BWP bandwidth, and the control unit specifies resource block allocation in a frequency direction to be applied to the first UL BWP based on a value of RIV indicated by the second field.

(10) In the fifth aspect of the present invention, in a case that the first UL BWP is an active UL BWP other than an initial UL BWP, and the search space set is a common search space associated with CORESET configured for a BWP other than an initial DL BWP or a UE-specific search space, the control unit identifies a first start position of resource allocation and the number of continuously allocated first resource blocks based on the initial UL BWP from the value of the RIV indicated by the second field, applies to the physical resource blocks of the active UL BWP a second start position and the number of second resource blocks obtained by scaling the first start position and the number of first resource blocks with a coefficient K, and specifies resource allocation of a PUSCH, and the CORESET is time and frequency resources for searching for downlink control information.

(11) In the fifth aspect of the present invention, in a case that the first UL BWP is an active UL BWP other than an initial UL BWP, and the search space set is a common search space associated with CORESET configured for an initial DL BWP, the control unit identifies a first start position of resource allocation and the number of continuously allocated first resource blocks based on the initial UL BWP from the value of the RIV indicated by the second field, applies the identified first start position and the number of first resource blocks to a physical resource block of the initial UL BWP, and specifies resource allocation of a PUSCH.

(12) In a fifth aspect of the present invention, in a case that the first UL BWP is an initial UL BWP, a first start position of resource allocation and the number of continuously allocated first resource blocks are identified based on the initial UL BWP from the value of the RIV indicated by the second field, the identified first start position and the number of first resource blocks are applied to a physical resource block of the initial UL BWP, and resource allocation of a PUSCH is specified.

(13) In a fifth aspect of the present invention, the coefficient K is provided by a value rounded down to a closest exponent of 2 at a ratio between a bandwidth of the active UL BWP and the initial UL BWP in a case that the bandwidth of the active UL BWP is greater than the bandwidth of the initial UL BWP and is provided by 1 otherwise.

(14) A base station apparatus 3 according to a sixth aspect of the present invention includes: a control unit 36 configured to generate a first DCI format including a second field indicating frequency domain resource assignment indicating resource allocation information; and a transmission unit 30 configured to transmit the first DCI format in a type1-PDCCH common search space set, wherein the first DCI format is scrambled with TC-RNTI, bits in a case that a first field indicating Msg3 PUSCH frequency resource assignment indicated by a first UL grant included in an RAR message are truncated from a least significant bit, and/or a most significant bit is inserted thereinto, based on the number of first resource blocks indicating the bandwidth of the first UL BWP, the size of the second field is derived from a bandwidth of an initial UL BWP, and the control unit specifies resource block allocation in a frequency direction of a PUSCH of the first UL BWP to be applied to the terminal apparatus and generates a value of RIV indicated by the second field.

(15) In the sixth aspect of the present invention, in a case that the first UL BWP is an active UL BWP other than an initial UL BWP, and CORESET associated with the common search space set is CORESET configured for a BWP other than an initial DL BWP, the control unit identifies a first start position of resource allocation and the number of continuously allocated first resource blocks based on the initial UL BWP from the generated value of the RIV indicated by the second field, applies a second start position and the number of second resource blocks obtained by scaling the first start position and the number of first resource blocks with a coefficient K to a physical resource block of the active UL BWP, and specifies resource allocation of a PUSCH to be applied to the terminal apparatus, and the CORESET is time and frequency resources for searching for downlink control information.

(16) In the sixth aspect of the present invention, in a case that the first UL BWP is an active UL BWP other than an initial UL BWP, and CORESET associated with the common search space set is CORESET configured for an initial DL BWP, the control unit identifies a first start position of resource allocation and the number of continuously allocated first resource blocks based on the initial UL BWP from the generated value of the RIV indicated by the second field, applies the identified first start position and the number of first resource blocks to a physical resource block of the initial UL BWP, and specifies resource allocation of a PUSCH to be applied to the terminal apparatus, and the CORESET is time and frequency resources for searching for downlink control information.

(17) In the sixth aspect of the present invention, in a case that the first UL BWP is an initial UL BWP, the control unit identifies a first start position of resource allocation and the number of continuously allocated first resource blocks based on the initial UL BWP from the generated value of the RIV indicated by the second field, applies the identified first start position and the number of first resource blocks to a physical resource block of the initial UL BWP, and specifies resource allocation of a PUSCH to be applied to the terminal apparatus.

(18) In the sixth aspect of the present invention, in a case that the bandwidth of the active UL BPW is larger than the bandwidth of the initial UL BWP, the coefficient K is provided by a value rounded down to a closest exponent of 2 with a ratio between the bandwidth of the active UL BWP and the initial UL BWP and is provided by 1 otherwise.

In this manner, the terminal apparatus 1 can efficiently communicate with the base station apparatus 3.

A program running on an apparatus according to the present invention may be a program that controls a central processing unit (CPU) or the like to cause a computer to function to realize the functions of the embodiment according to the present invention. The program or information handled by the program is temporarily stored in a volatile memory such as a random access memory (RAM), a non-volatile memory such as a flash memory, a hard disk drive (HDD), or other storage device system.

Note that the program for realizing the functions in the embodiment according to the present invention may be recorded in a computer readable recording medium. The functions may be realized by causing the computer system to read and execute the program recorded in the recording medium. The "computer system" described here is a computer system incorporated in an apparatus and is assumed to include an operating system and hardware such as a peripheral device. Also, the "computer readable recording medium" may be a semiconductor recording medium, an optical recording medium, a magnetic recording medium, a medium that dynamically retains the program for a short period of time, or other computer readable recording medium.

Also, each functional block or various features of the apparatuses used in the aforementioned embodiment may be implemented or executed on an electric circuit, for example, an integrated circuit or a plurality of integrated circuits. An electric circuit designed to execute the functions described in the specification may include a general-purpose processor, a digital signal processor (DSP), an application specific integrated circuit (ASIC), a field programmable gate array (FPGA), or other programmable logic devices, discrete gates or transistor logics, discrete hardware components, or a combination thereof. The general-purpose processor may be a microprocessor or may be a processor of a known type, a controller, a micro-controller, or a state machine. The aforementioned electric circuit may be configured using a digital circuit, or may be configured using an analog circuit. Also, in a case that a technology for an integrated circuit that can replace a current integrated circuit appears with advances in semiconductor technologies, one or a plurality of aspects of the present invention can use a new integrated circuit according to the technology.

Note that although the example in which the embodiment according to the present invention is applied to the communication system including the base station apparatus and the terminal apparatus has been described, the embodiment can also be applied to a system in which terminals perform communication therebetween, such as Device to Device (D2D).

Note that the invention of the present application is not limited to the aforementioned embodiments. Although an example of the apparatuses has been described in the embodiments, the invention of the present application is not limited thereto and can be applied to a terminal apparatus or a communication apparatus for a stationary type or a non-movable type electronic device placed indoors or outdoors, for example, an AV apparatus, a kitchen apparatus, a cleaning or washing apparatus, an air conditioning apparatus, an office apparatus, automatic vending machine, or other household apparatuses.

Although the embodiments of the present invention have been described in detail with reference to drawings, specific configurations are not limited to the embodiments and include modifications in design and the like without departing from the gist of the present invention. Also, various modifications can be added to the present invention within the scope indicated by the claims, and embodiments that can be obtained by appropriately combining technical means disclosed in different embodiments are also included in the technical scope of the present invention. Moreover, configurations achieved by replacing elements that are described in the aforementioned embodiments and exhibit similar effects are also included in the technical scope of the present invention.

The invention claimed is:

1. A terminal device configured to communicate with a base station device, the terminal device comprising:
   a receiver configured to
     receive, from the base station device, a configuration for an initial UpLink (UL) Band Width Part (BWP) and a configuration for an additional UL BWP via a Radio Resource Control (RRC) message, and
     receive, from the base station device, a Random Access Response (RAR) message including a RAR UL grant;
   processing circuitry configured to switch an active UL BWP between the initial UL BWP and the additional UL BWP; and
   a transmitter configured to transmit, to the base station device, a Physical Uplink Shared CHannel (PUSCH) in the active UL BWP,
   wherein: one of the initial UL BWP and the additional UL BWP is activated as the active UL BWP,
   the PUSCH is scheduled by using the RAR UL grant,
   a first field with a fixed bit size included in the RAR UL grant is used to indicate frequency resource allocation of the PUSCH,
   the processing circuitry is further configured to truncate bits from the first field or insert bits into the first field and to interpret the truncated first field or the expanded first field as a field indicating the frequency resource allocation of the PUSCH,
   in a case that the initial UL BWP is the active UL BWP, to truncate bits from the first field or to insert bits into the first field is done by using a size of the initial UL BWP, and
   in a case that the additional UL BWP is the active UL BWP, to truncate bits from the first field or to insert bits into the first field is done by using the size of the initial UL BWP.

2. A communication method for a terminal device configured to communicate with a base station device, the communication method comprising:
   receiving, from the base station, a configuration for an initial UpLink (UL) Band Width Part (BWP) and a configuration for an additional UL BWP via a Radio Resource Control (RRC) message;
   receiving, from the base station, a Random Access Response (RAR) message including a RAR UL grant;
   switching, by a processing circuitry, an active UL BWP between the initial UL BWP and the additional UL BWP;
   truncating bits from a first field or inserting bits into the first field, the first field being with a fixed bit size included in the RAR UL grant and being used to indicate frequency resource allocation of a Physical Uplink Shared CHannel (PUSCH);
   interpreting the truncated first field or the expanded first field as a field indicating frequency resource allocation of the PUSCH; and
   transmitting, to the base station, the PUSCH in the active UL BWP,
   wherein: one of the initial UL BWP and the additional UL BWP is activated as the active UL BWP,
   the PUSCH is scheduled by using the RAR UL grant,
   in a case that the initial UL BWP is the active UL BWP, truncating bits from the first field or inserting bits into the first field is done by using a size of the initial UL BWP, and
   in a case that the additional UL BWP is the active UL BWP, truncating bits from the first field or inserting bits into the first field is done by using the size of the initial UL BWP.

* * * * *